(12) United States Patent
Westby et al.

(10) Patent No.: US 9,171,300 B2
(45) Date of Patent: Oct. 27, 2015

(54) RETAIL CONVENIENCE MARKET TECHNOLOGY WITH ENHANCED VENDOR ADMINISTRATION AND USER MOBILE APP FUNCTIONALITY

(71) Applicants: Todd Westby, Woodbury, MN (US); Sam Bengstone, River Falls, WI (US); Ben Halberg, River Falls, WI (US); Eric Bloms, River Falls, WI (US)

(72) Inventors: Todd Westby, Woodbury, MN (US); Sam Bengstone, River Falls, WI (US); Ben Halberg, River Falls, WI (US); Eric Bloms, River Falls, WI (US)

(73) Assignee: TW Vending, Inc., Hudson, WI (US)

( * ) Notice: Subject to any disclaimer, the term of this patent is extended or adjusted under 35 U.S.C. 154(b) by 0 days.

(21) Appl. No.: 14/332,008

(22) Filed: Jul. 15, 2014

(65) Prior Publication Data

US 2015/0127478 A1 May 7, 2015

Related U.S. Application Data

(63) Continuation-in-part of application No. 14/207,392, filed on Mar. 12, 2014.

(60) Provisional application No. 61/962,177, filed on Nov. 1, 2013.

(51) Int. Cl.

| G06Q 20/00 | (2012.01) |
|---|---|
| G06Q 20/18 | (2012.01) |
| G06Q 30/06 | (2012.01) |
| G06Q 20/20 | (2012.01) |
| G06Q 10/08 | (2012.01) |
| G07G 1/14 | (2006.01) |
| G06Q 20/32 | (2012.01) |
| G06Q 20/34 | (2012.01) |
| G06Q 20/40 | (2012.01) |
| G07F 7/04 | (2006.01) |
| G07F 7/08 | (2006.01) |
| G07F 9/02 | (2006.01) |

(52) U.S. Cl.
CPC .............. *G06Q 20/18* (2013.01); *G06Q 10/087* (2013.01); *G06Q 20/20* (2013.01); *G06Q 20/203* (2013.01); *G06Q 20/204* (2013.01); *G06Q 20/206* (2013.01); *G06Q 20/208* (2013.01); *G06Q 20/322* (2013.01); *G06Q 20/3274* (2013.01); *G06Q 20/34* (2013.01); *G06Q 20/4012* (2013.01); *G06Q 20/40145* (2013.01); *G06Q 30/0601* (2013.01); *G07F 7/04* (2013.01); *G07F 7/08* (2013.01); *G07F 9/023* (2013.01); *G07G 1/14* (2013.01)

(58) Field of Classification Search
CPC .................................................. G06Q 20/202
USPC .................................. 706/16, 21; 705/16, 21
See application file for complete search history.

(56) References Cited

U.S. PATENT DOCUMENTS

| 2011/0173549 | A1 * | 7/2011 | Hipskind | 705/43 |
| 2013/0332271 | A1 * | 12/2013 | Hay | 705/14.51 |

*Primary Examiner* — Hunter Wilder
(74) *Attorney, Agent, or Firm* — Skinner and Associates; Joel Skinner

(57) ABSTRACT

A self-service, self-checkout micro-market retail shopping system for disposition and use in an private or public office, factory or other workspace for use by employees, workers and the like. The micro-market may supply snacks, candies, beverages, other food items and various convenience items such as toiletries for use by employees, workers and other during the work day, lunch and break time. The micro-market may also supply work related items such as uniforms and apparel, tools, office supplies, travel accessories and the like. The devices and process also include enhanced vendor administration tools and functionality. The devices and process also include enhanced user ability to use mobile devices and apps, and on-line tools for creating and managing accounts and for purchasing items.

1 Claim, 113 Drawing Sheets

Tax Collected

TKC Demo Tax Collected 9/01/2013 - 9/18/2013

| Store Name | Tax Rate | Store Tax Amount Total | Transaction Count |
|---|---|---|---|
| Demo Store | 0 | $0.00 | 4 |
| Charlotte #1 | 0.055 | $0.65 | 6 |
| Lieberman Demo | 0 | $0.00 | 12 |
| HA Franz Demo | 0.0825 | $0.83 | 7 |
| HA Franz Demo | 0 | $0.00 | 16 |
| TechniVend Demo | 0 | $0.00 | 11 |
| TechniVend Demo | 0.055 | $0.00 | 0 |

Total Tax Collected: $1.48

FIG. 72

Cashbox Reconciliation History

Select a Warehouse: ▼

Start Date: 07-01-2013  End Date: 09-30-2013  [Run Report]

| Transaction Id | Store Name | Date | Reconciled Amount |
|---|---|---|---|
| 356287 | | 8/8/2013 | $1,185.00 |
| 359512 | | 8/16/2013 | $172.00 |

BALANCE SHEET

8/22/2013 - 8/24/2013

ASSETS

| | |
|---|---|
| STORE CREDIT CARD TRANSACTION | $27.99 |
| UNDEPOSITED FUNDS ACCOUNT | $80.00 |
| ADJUSTING ENTRY CREDIT | |

LIABILITIES

| | |
|---|---|
| CASHTILL | $113.00 |
| STORE MARKET ACCOUNT LIABILITY | ($14.86) |
| PAYROLL DEDUCTION ACCOUNT LIABILITY | |
| SOLD STORE PRODUCT | $44.90 |
| UNCLAIMED FUNDS ACCOUNT | $1.23 |
| ADJUSTING ENTRY DEBIT | |

TOTALS

| ASSETS | LIABILITIES |
|---|---|
| $107.99 | $144.27 |

FIG. 113

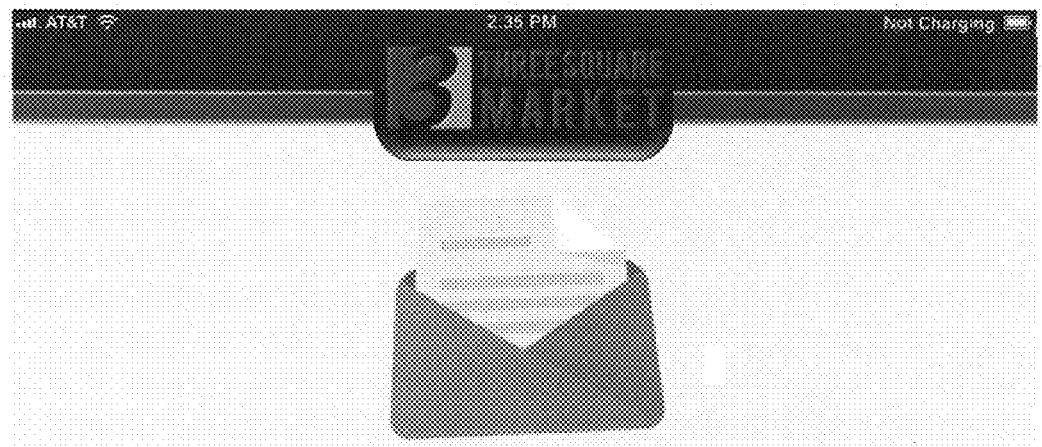
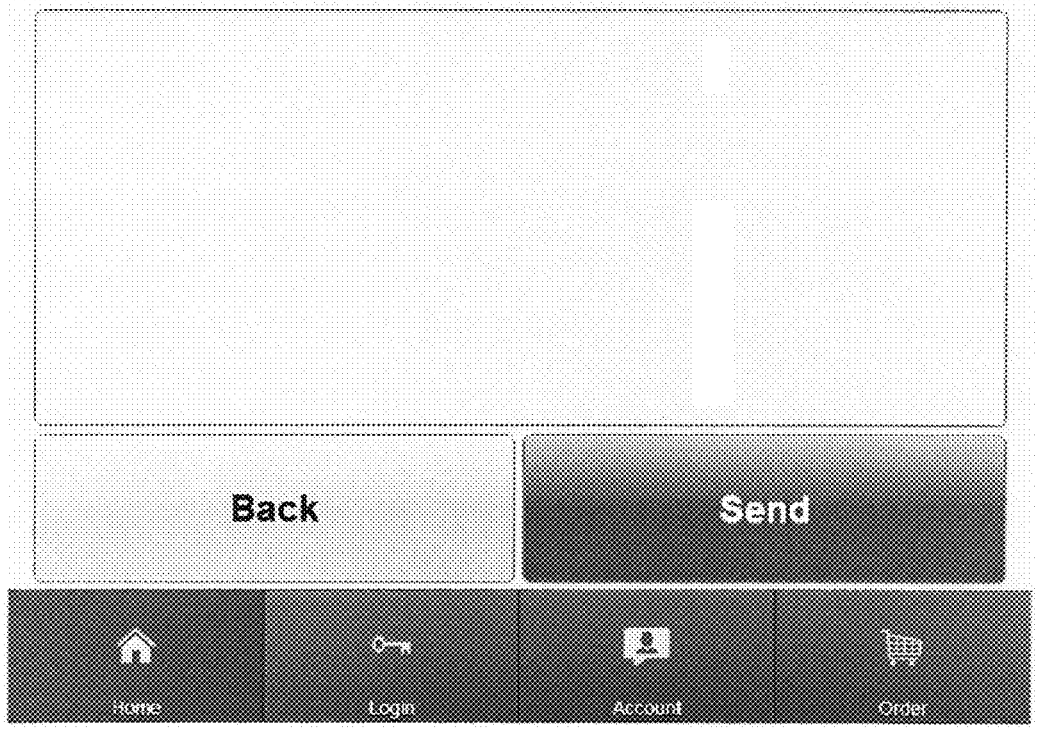
FIG. 117

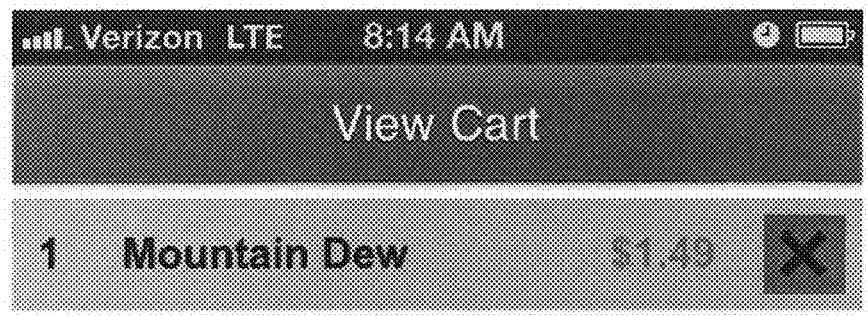
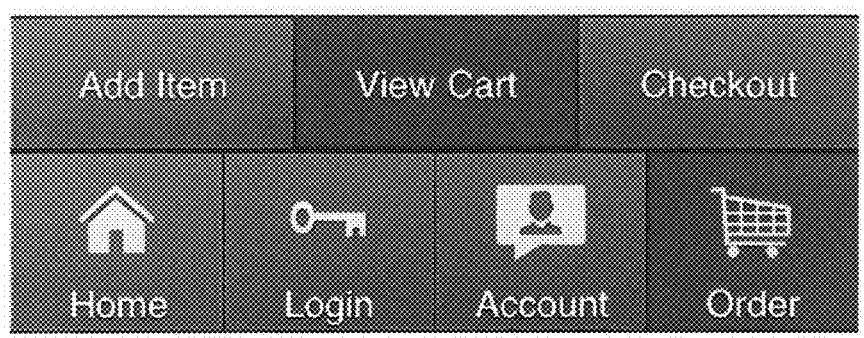
FIG. 121

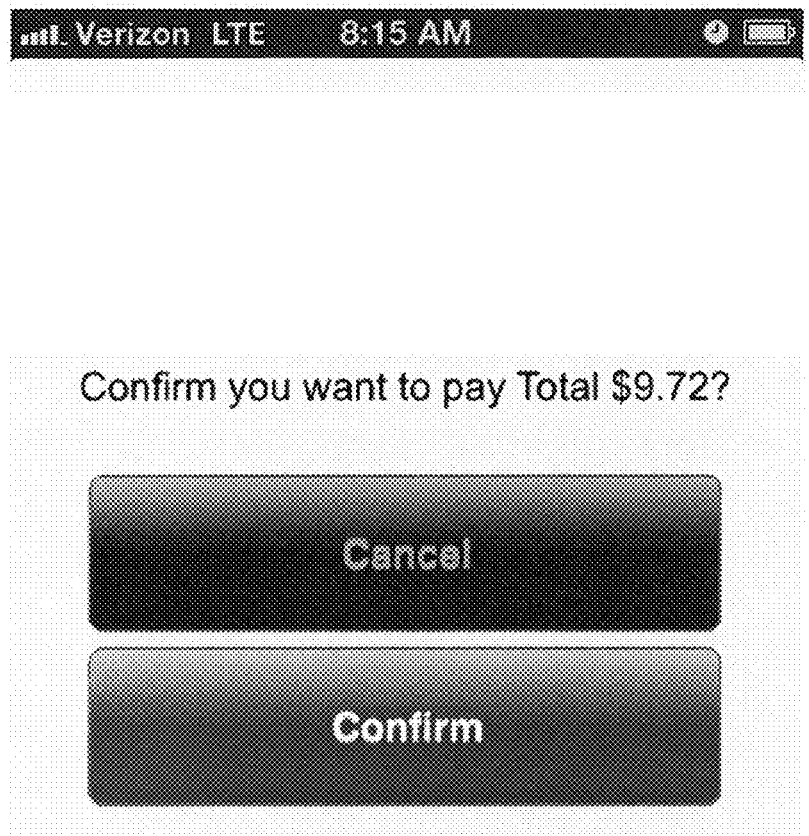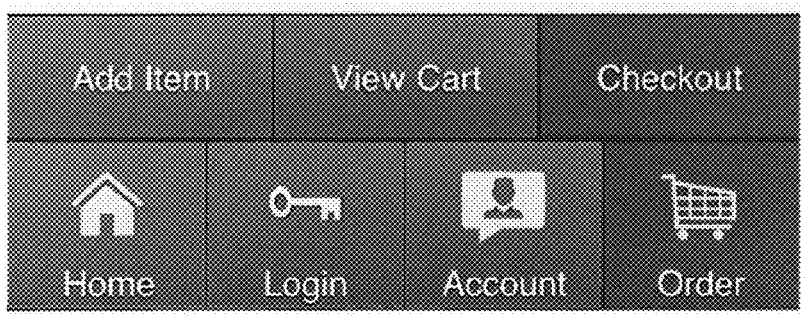
FIG. 124

RETAIL CONVENIENCE MARKET TECHNOLOGY WITH ENHANCED VENDOR ADMINISTRATION AND USER MOBILE APP FUNCTIONALITY

CROSS REFERENCE TO RELATED APPLICATIONS, IF ANY

This application is a continuation-in-part and claims the benefit under 35 U.S.C. §119(e) of co-pending U.S. patent application Ser. No. 14/207,392, filed Mar. 12, 2014, which further claims the benefit of Provisional Patent Application Ser. No. 61/777,906 filed Mar. 12, 2013, entitled Retail Convenience Market Technology, and Ser. No. 61/962,177 filed Nov. 1, 2013 entitled Retail Convenience Market Technology with Enhanced Vendor Administration and User Mobile App Functionality, which are both hereby incorporated by reference.

37 C.F.R. §1.71(E) AUTHORIZATION

A portion of the disclosure of this patent document contains material which is subject to copyright protection. The copyright owner has no objection to the facsimile reproduction by anyone of the patent document or the patent disclosure, as it appears in the US Patent and Trademark Office patent file or records, but otherwise reserves all copyright rights whatsoever.

STATEMENT REGARDING FEDERALLY SPONSORED RESEARCH OR DEVELOPMENT

Not applicable.

REFERENCE TO A MICROFICHE APPENDIX, IF ANY

Not applicable.

BACKGROUND OF THE INVENTION

1. Field of the Invention

The present invention relates, generally, retail merchandise and vending systems, apparatus and methods. Particularly, the invention relates to a self service, self-checkout, micro to small retail market system, apparatus and methods. Most particularly, the invention relates to a self-service, self-checkout micro-market retail shopping system for disposition and use in an private or public office, factory or other workspace for use by employees, workers and the like. The micro-market may supply snacks, beverages, other food items and various convenience items for use by employees, workers and other during the work day, lunch and break time.

2. Background Information

Existing technology in this field is believed to have significant limitations and shortcomings.

All US patents and patent applications, and all other published documents mentioned anywhere in this application are incorporated by reference in their entirety.

BRIEF SUMMARY OF THE INVENTION

The present invention provides a self-service, self-checkout micro market system, apparatus and methods which are practical, reliable, accurate and efficient, and which are believed to constitute an improvement over the background technology.

The invention provides a self-service, self-checkout micro-market retail shopping system for disposition and use in an private or public office, factory or other workspace for use by employees, workers and the like. The micro-market may supply snacks, candies, beverages, other food items and various convenience items such as toiletries for use by employees, workers and other during the work day, lunch and break time. The micro-market may also supply work related items such as uniforms and apparel, tools, office supplies, travel accessories and the like.

The invention provides a means for the customer user to order various services in addition to products. Such services may include, but are not limited to dry cleaning services, postal services, financial services, and the like.

The invention provides various hardware items for use in the micro-market including, rack, shelving and related merchandise displays; kitchenette facilities and systems; checkout kiosk and other apparatus; security systems and apparatus; and merchandise and account management systems, apparatus and methods.

The invention provides enhanced vendor administration tools and functionality.

The invention provides enhanced user ability to use mobile devices and apps, and on-line tools for creating and managing accounts and for purchasing items.

The invention also provides a small market for selling articles comprising, at least one display for storing and displaying articles for sale and a kiosk for checking out articles which are purchased by a user, the kiosk being communicatively connected to a control server via the Internet, and wherein a user and an administrator can access the control server via the Internet to establish, view and edit user and administrator accounts stored at the control server associated with the market.

The present invention is believed to involve novel elements, combined in novel ways to yield more than predictable results. The problems solved by the invention were not fully recognized in the prior art.

The aspects, features, advantages, benefits and objects of the invention will become clear to those skilled in the art by reference to the following description, claims and drawings.

BRIEF DESCRIPTION OF THE SEVERAL VIEWS OF THE DRAWING

Figures 48, 49:
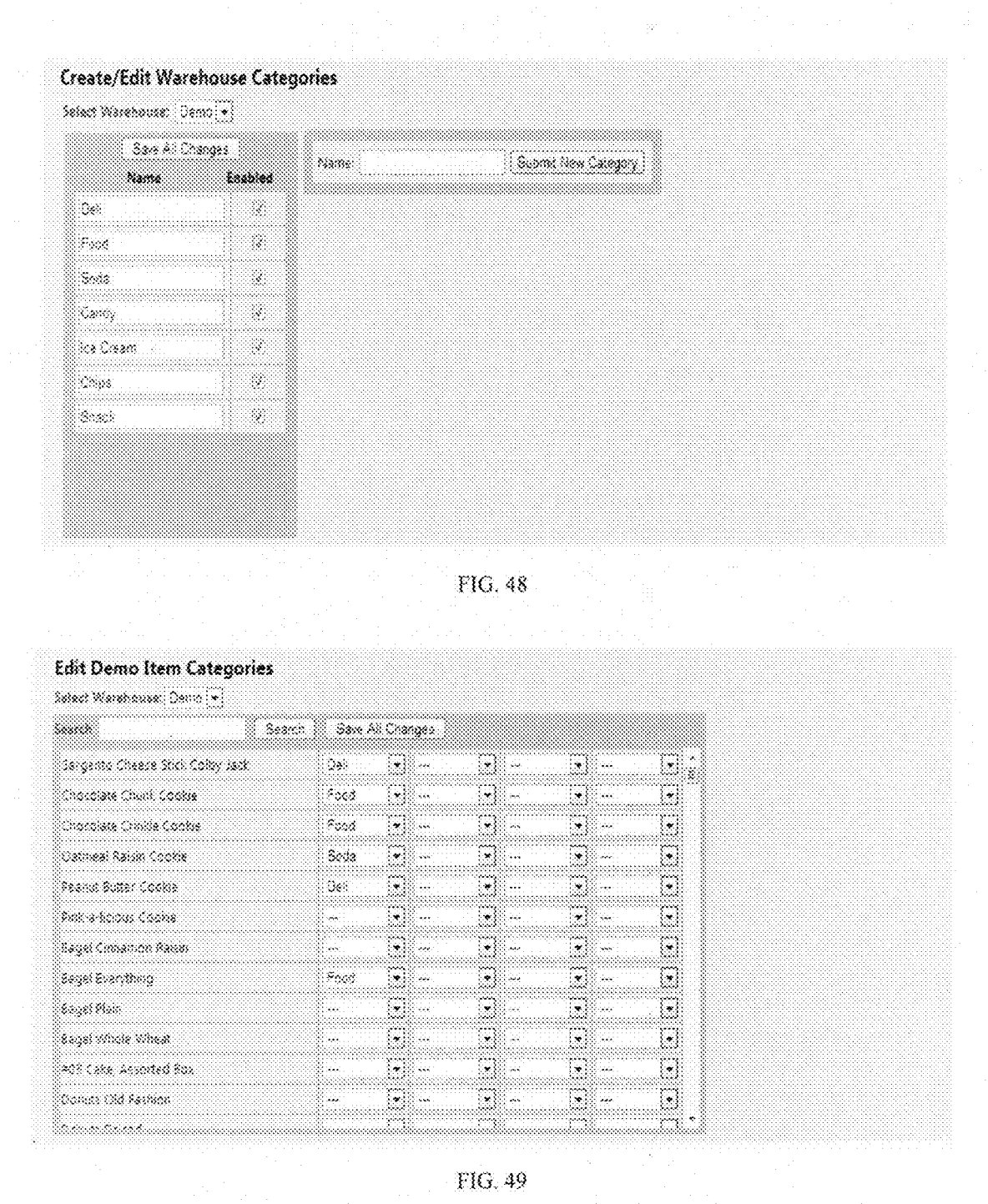

FIG. 48 shows an embodiment of a Create/Edit Warehouse Categories dialog box therefor.

FIG. 49 shows an embodiment of an Edit Demo Item Categories dialog box therefor.

Figures 50, 51:
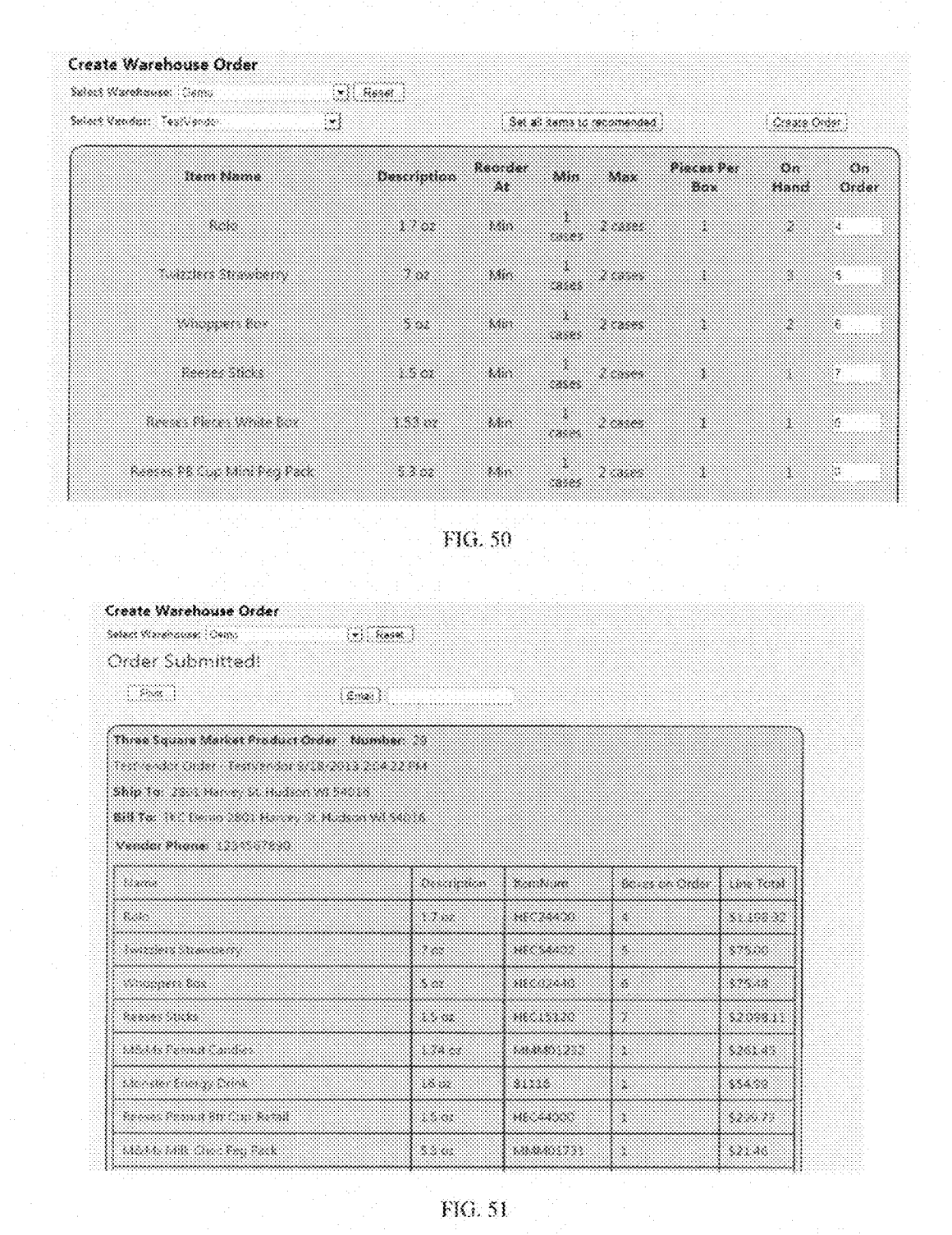

FIG. 50 shows an embodiment of a Warehouse—Create Warehouse Order page.

FIG. 51 shows an embodiment of an Order Submitted Confirmation page therefor.

Figures 52, 53:
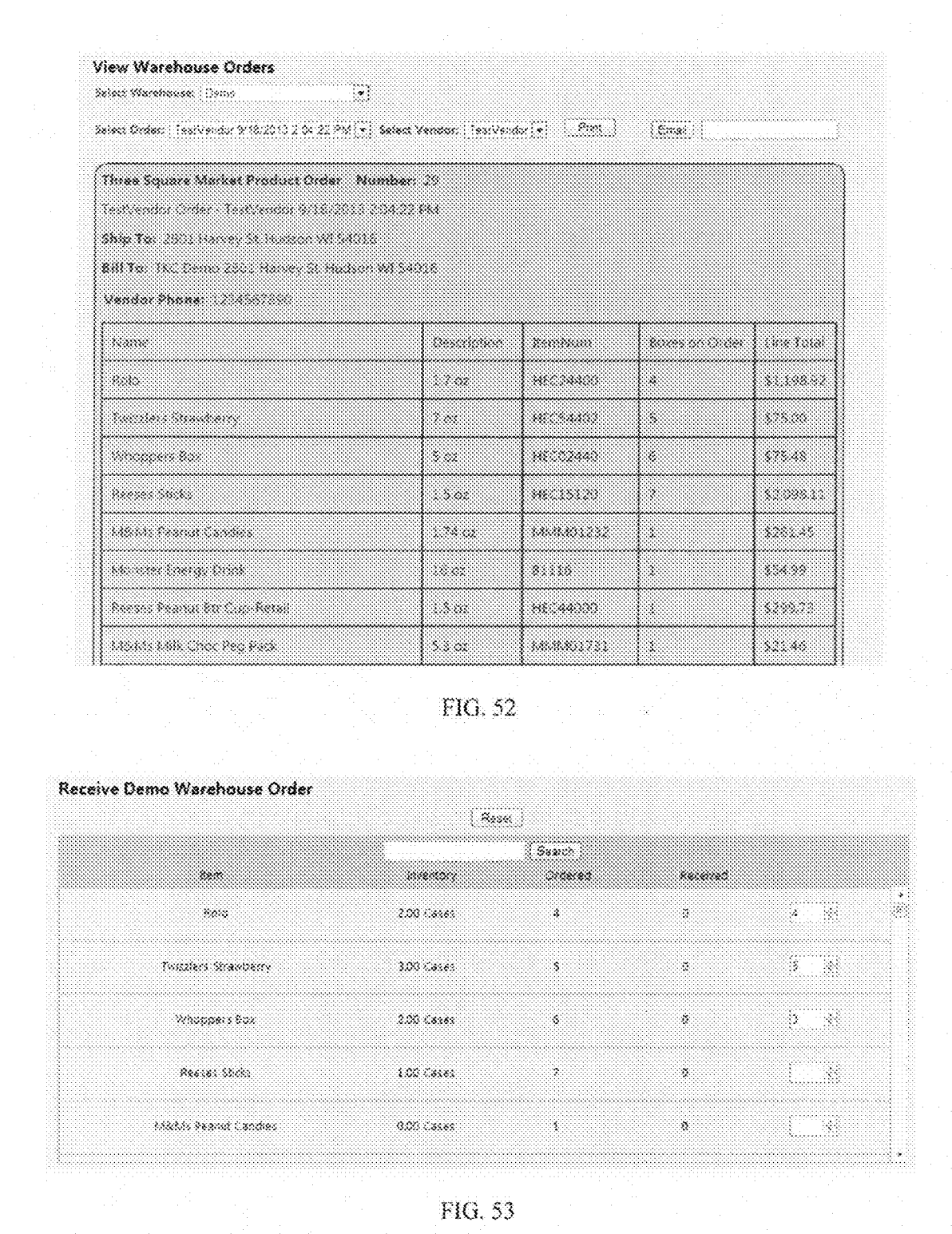

FIG. 52 shows an embodiment of a Warehouse—View Warehouse Orders page.

FIG. 53 shows an embodiment of a Warehouse—Receive "Demo" (Store) Warehouse Order page.

Figures 54, 55:
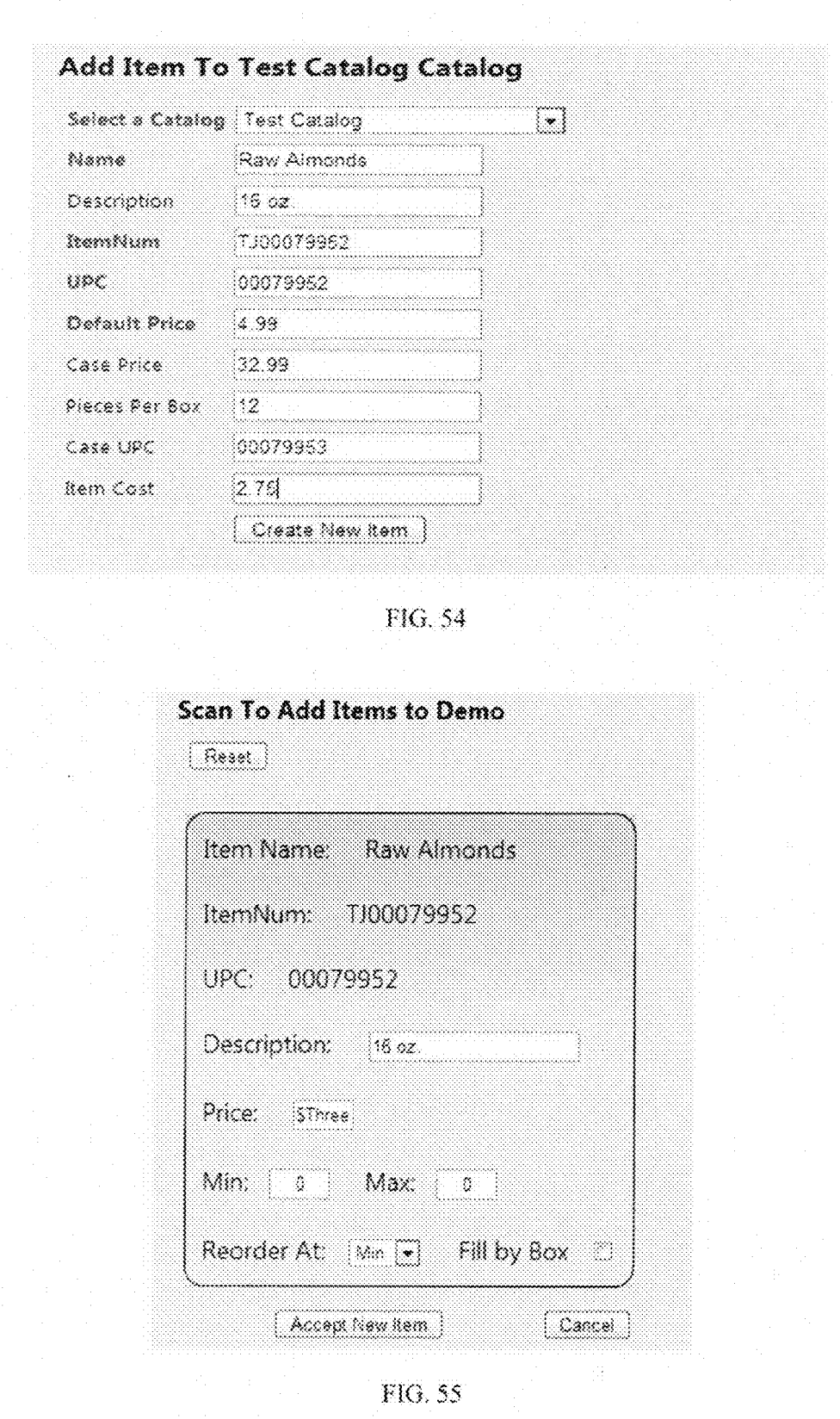

FIG. 54 shows an embodiment of a Catalog—Add Item To Test Catalog page.

FIG. 55 shows an embodiment of a Scan To Add Items to "Demo" store page.

Figures 56, 57:
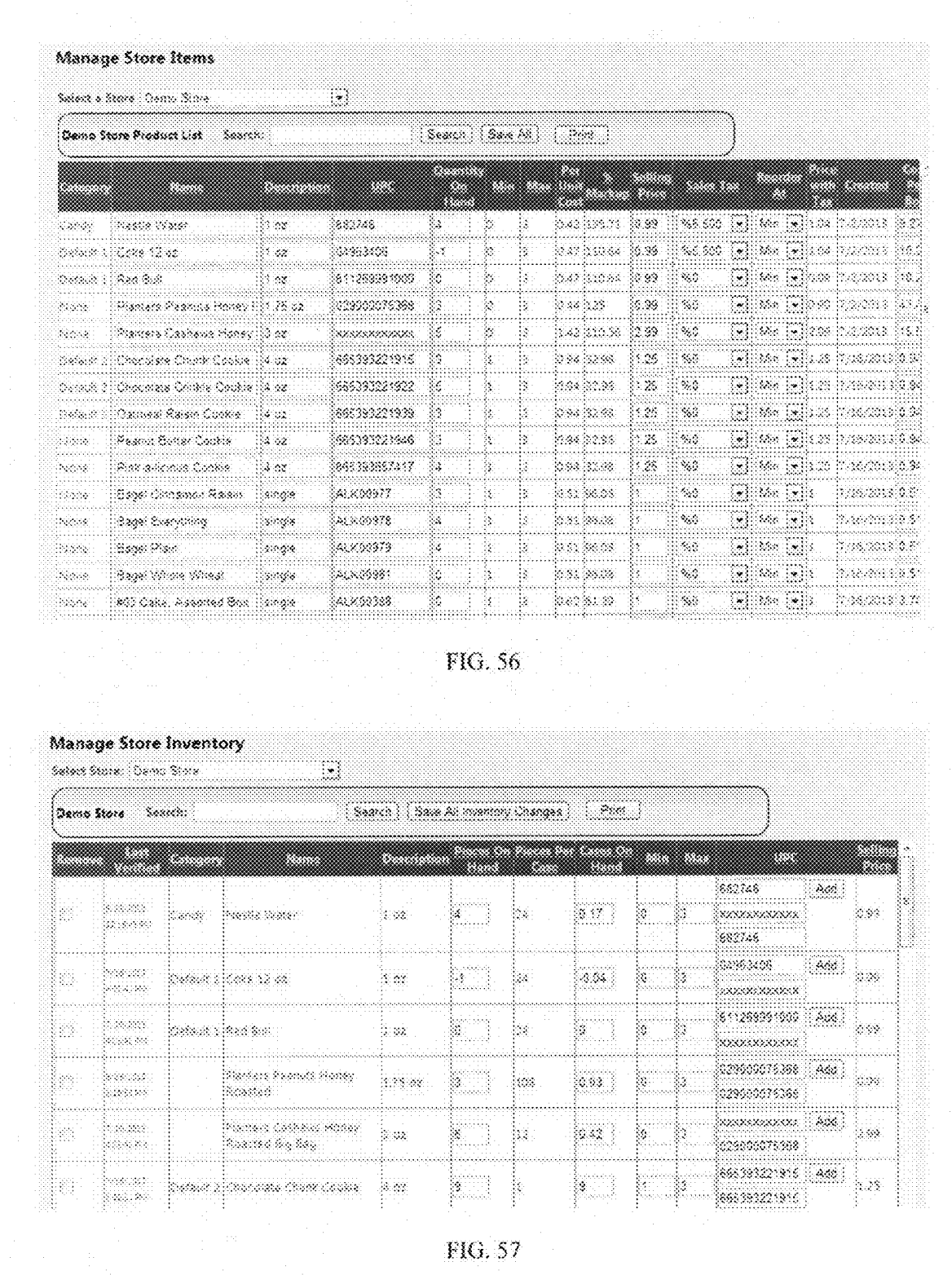

FIG. 56 shows an embodiment of a Store—Manage Store Items page.

FIG. 57 shows an embodiment of a Store—Manage Store Inventory page.

Figures 58, 59:
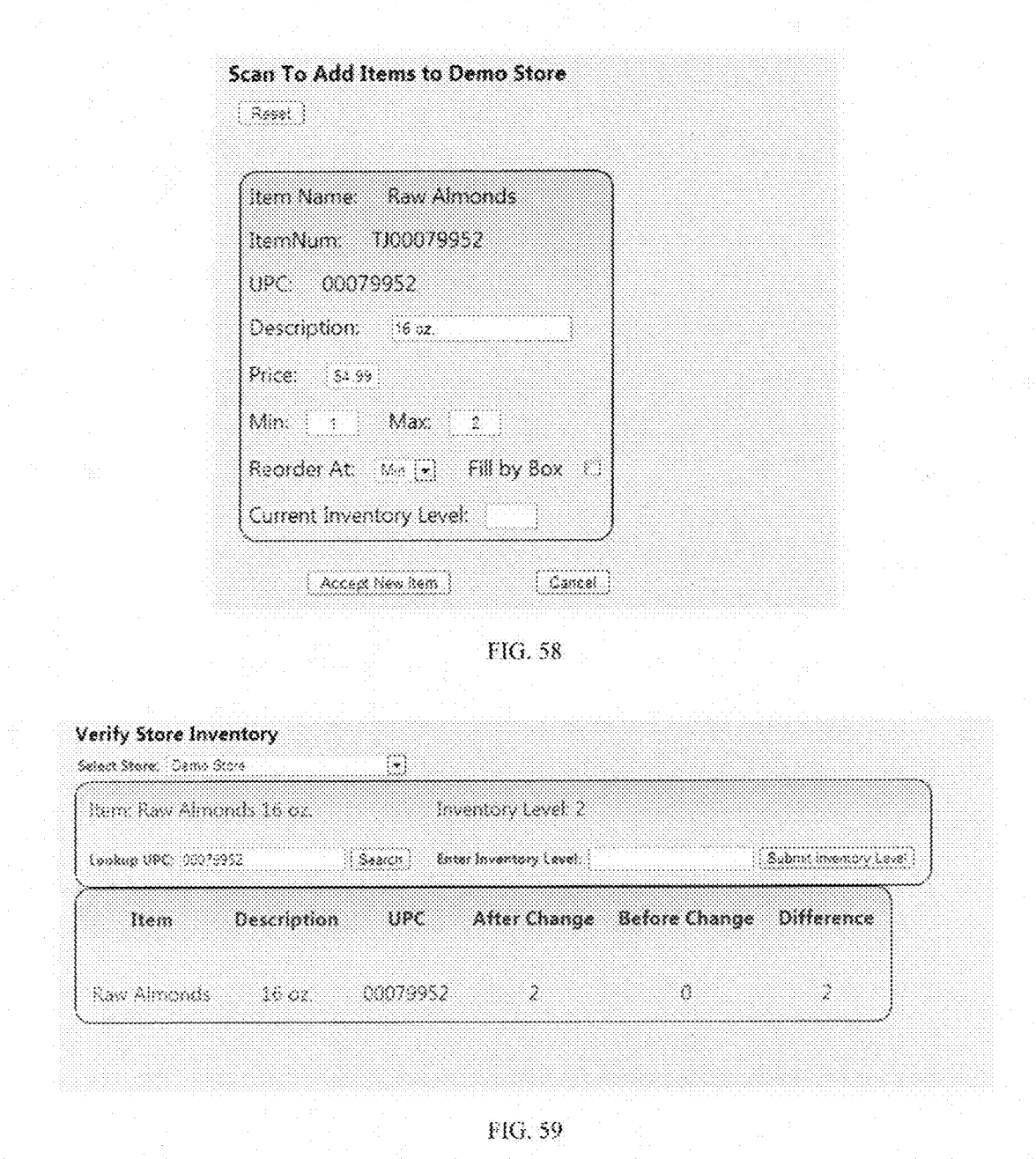

FIG. 58 shows an embodiment of a Store—Scan To Add Items to Demo Store page.

FIG. 59 shows a Store—Verify Store Inventory page.

Figures 60, 61:
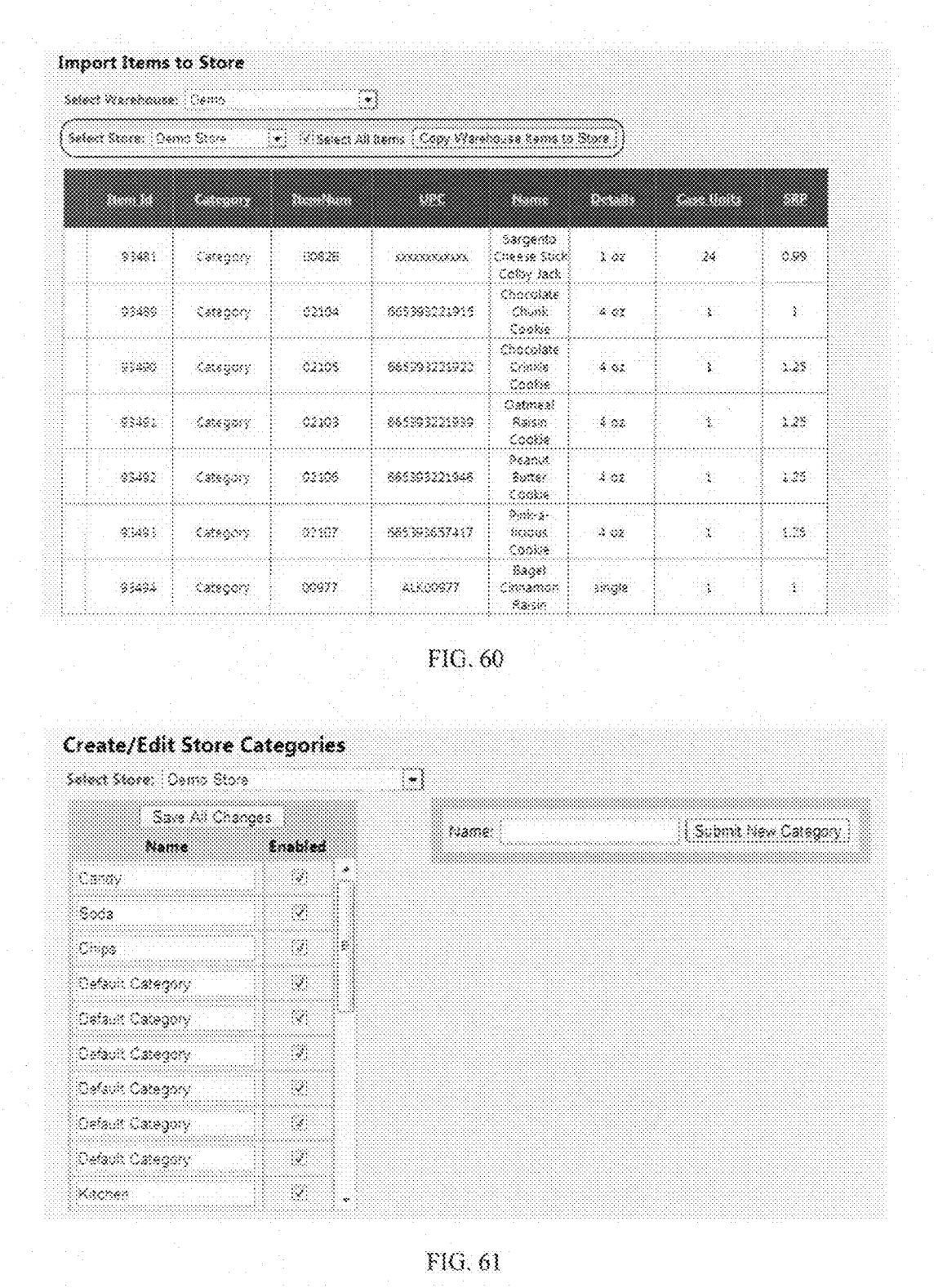

FIG. 60 shows an embodiment of a Store—Import Items to Store page.

FIG. 61 shows an embodiment of a Store—Create/Edit Store Categories page.

Figures 62, 63:
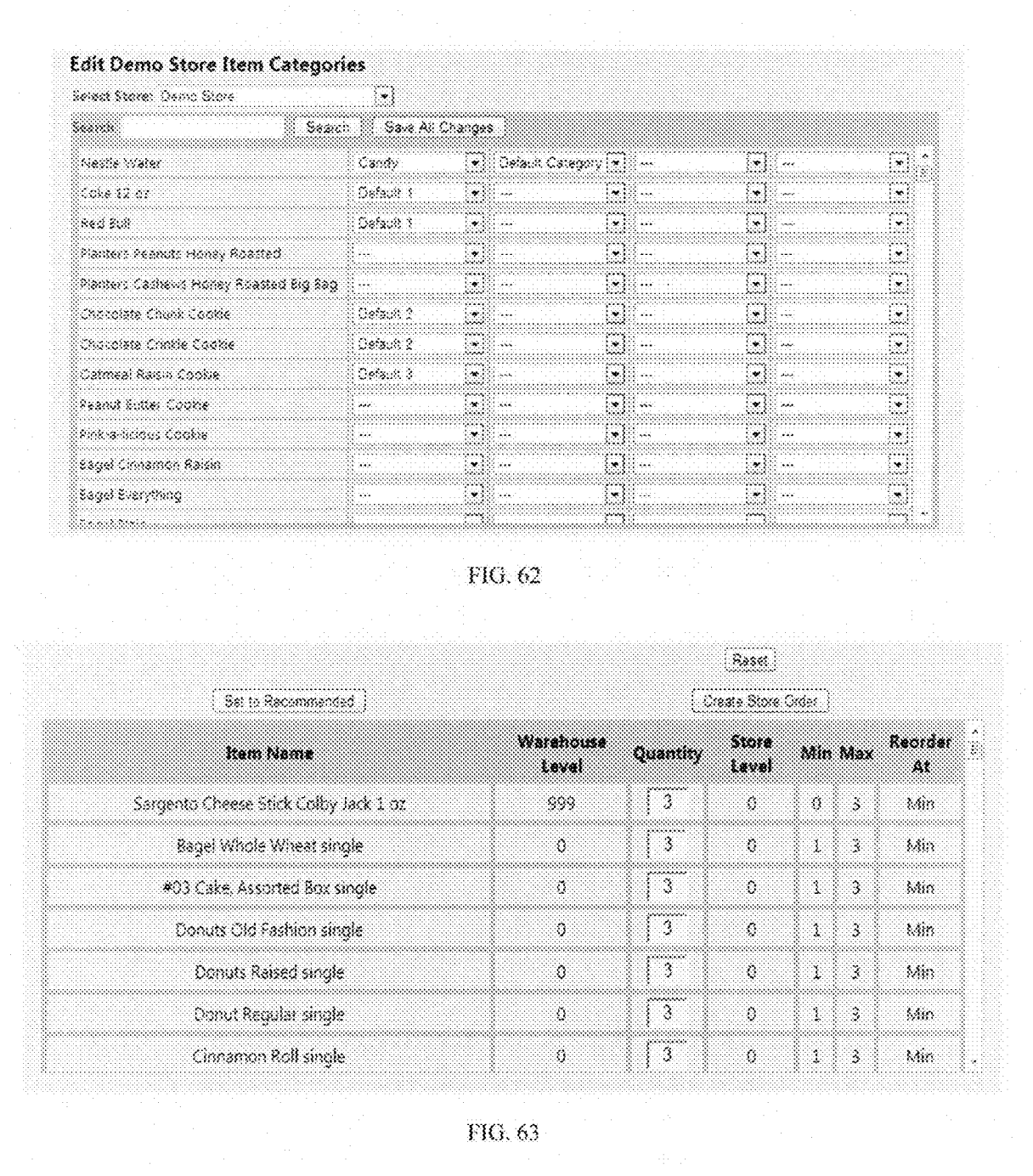

FIG. 62 shows an embodiment of a Store—Edit Demo Store Item Categories page.

FIG. 63 shows an embodiment of a Store—Create Store Order page.

Figures 64, 65:
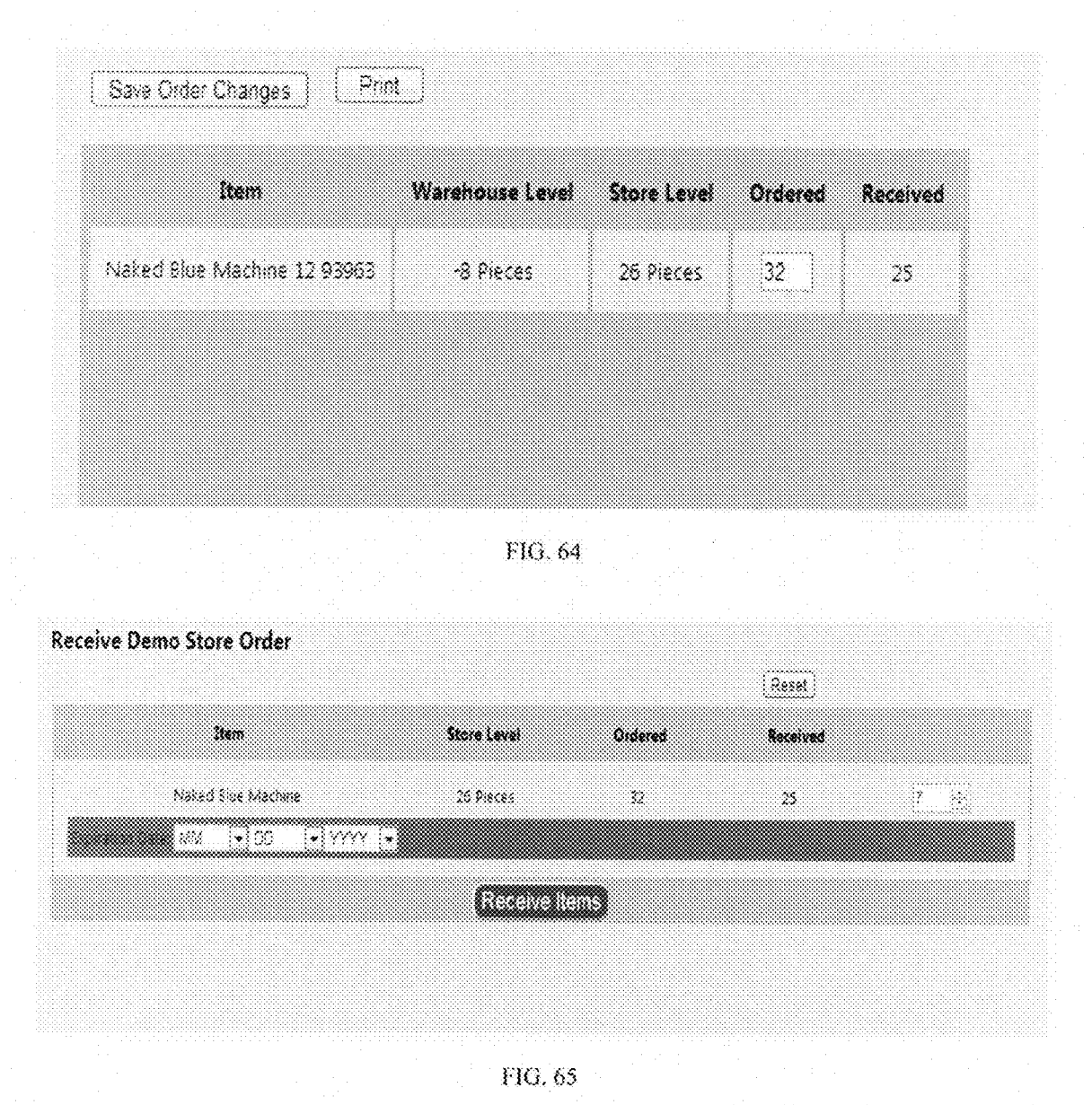

FIG. 64 shows an embodiment of a Store—Change Existing Order page/dialog box.

FIG. 65 shows an embodiment of a Store—Receive Demo Store Order page.

Figures 66, 67:
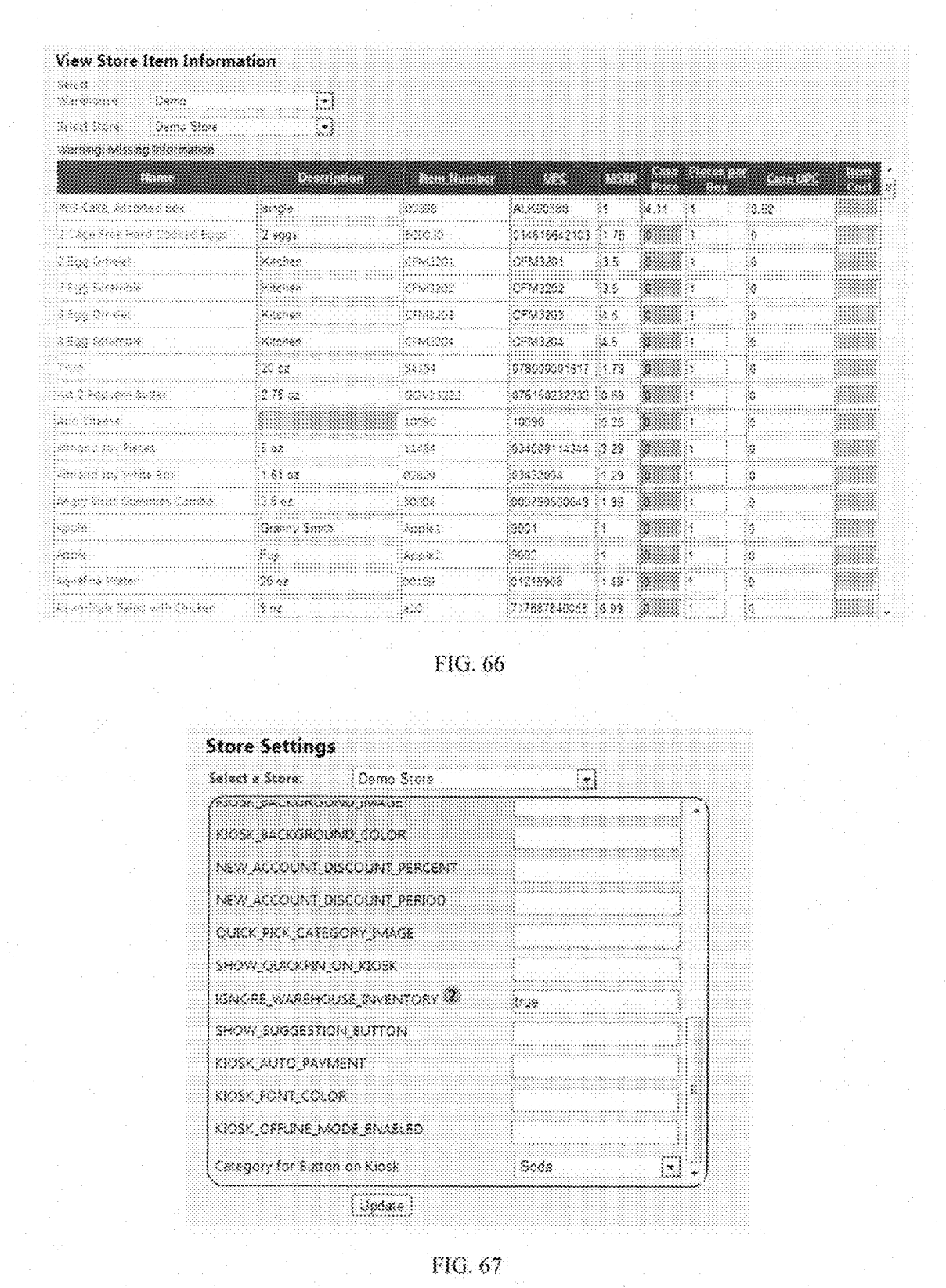

FIG. 66 shows an embodiment of a Store—View Store Item Information page.

FIG. 67 shows an embodiment of a Store—Store Settings page.

FIG. 70 shows an Accounting—Account Credit/Reimbursement page.

FIG. 71 shows an Accounting—Cashbox Reconciliation page.

FIG. 72 shows an embodiment of a Trust Accounting—Tax Collected page.

FIG. 73 shows an embodiment of a Reports—Cashbox Reconciliation History page.

FIG. 74 shows an embodiment of a Reports—Cash Transactions page.

FIG. 75 shows an embodiment of a Reports—Credit Card Transactions page.

FIG. 76 shows an embodiment of a Reports—User Transactions page.

FIG. 77 shows an embodiment of a Reports—Market Account Deposits by Date page.

FIG. 78 shows an embodiment of a Reports—All Transactions page.

FIG. 79 shows an embodiment of a Reports—Average Customer Transactions page.

FIG. 80 shows an embodiment of a Reports—Sales By Item page.

FIG. 113 shows an example balance sheet for a market.

FIGS. 115 to 118 are views of select mobile app interfaces for an Apple iPad.

FIGS. 119 to 125 are views of select mobile app user interfaces for an iPhone 5.

Figures 148, 149:
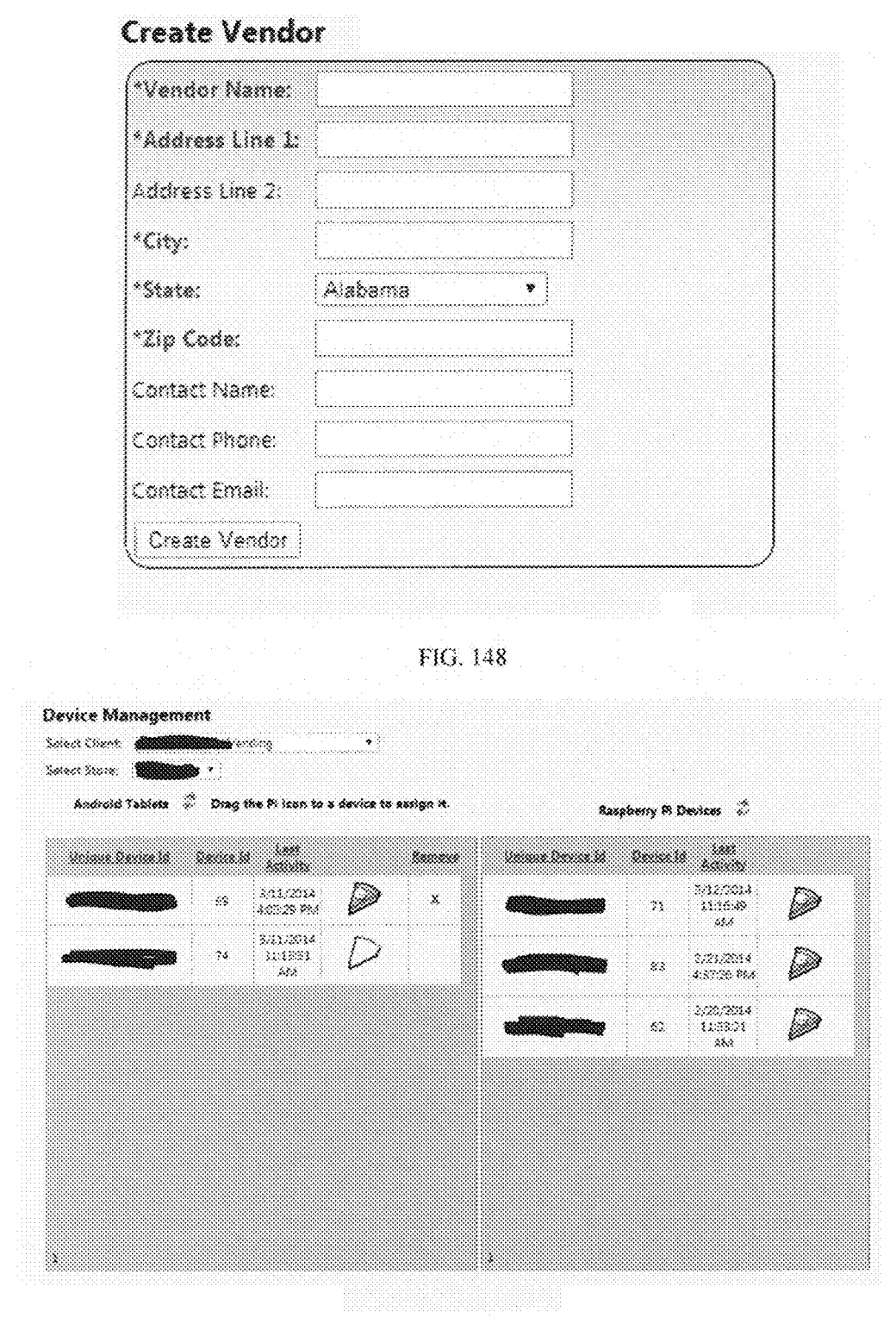

FIGS. 144 to 153 are view of select website administrator interfaces.

FIG. 162 shows an embodiment of a credit card selection screen following the screen of FIG. 161, including plural sample credit card accounts to be selected from.

DETAILED DESCRIPTION

The invention provides a self-service, self-checkout micro-market retail shopping system for disposition and use in an private or public office, factory or other workspace for use by employees, workers and the like. The micro-market may supply items or articles such as snacks, candies, beverages, other food items and various convenience items such as toiletries for use by employees, workers and other during the work day, lunch and break time. The micro-market may also supply work related items such as uniforms and apparel, tools, office supplies, travel accessories and the like.

The invention provides a means for the customer user to order various services in addition to products. Such services may include, but are not limited to dry cleaning services, postal services, financial services, and the like.

The invention provides various hardware items for use in the micro-market including, rack, shelving and related merchandise displays; kitchenette facilities and systems; checkout kiosk and other apparatus; security systems and apparatus; and merchandise and account management systems, apparatus and methods.

The system provides enhanced vendor administration tools and functionality. The system also provides enhanced user ability to use mobile devices and apps, and on-line tools for creating and managing accounts and for purchasing items.

The system, apparatus and methods of the invention permits users such as employees, building and facilities staff, and organization members to quickly and conveniently shop for and purchase a variety of necessary or useful items, without having to leave the place of employment or other facility. The system permits the user to make purchases by a variety of means including cash or cash-less such as credit or debit cards, special accounts, payroll deduction and the like. Cash-less card swiping permit faster checkout. A mobile device app permits faster login and account settlement. The system of the invention is beneficial to employers because the employees do not have to leave the premises and can checkout faster, thus increasing business and organizational productivity. Also, because the system is self-service, an additional employee or employees are not necessary to staff the market. The system is automated to facilitate easier financial transaction processing and merchandise stocking and control.

Figure 1:
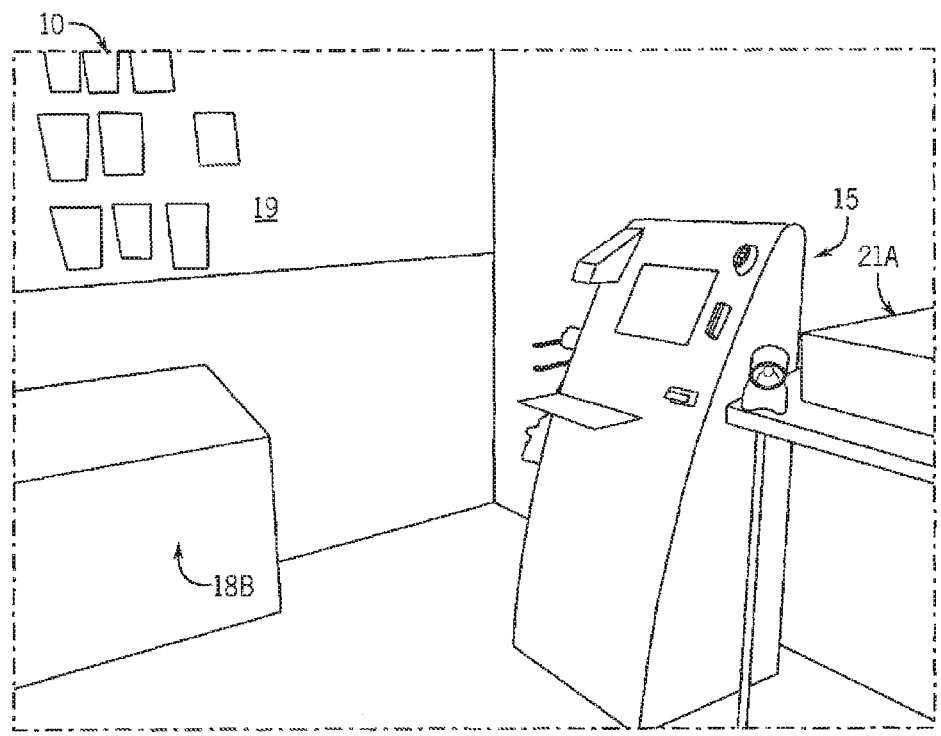
FIG. 1 shows an embodiment of the checkout area of an embodiment of the micro-market of the present invention, including an embodiment of a checkout kiosk for use in the micro-market.
Figure 2:
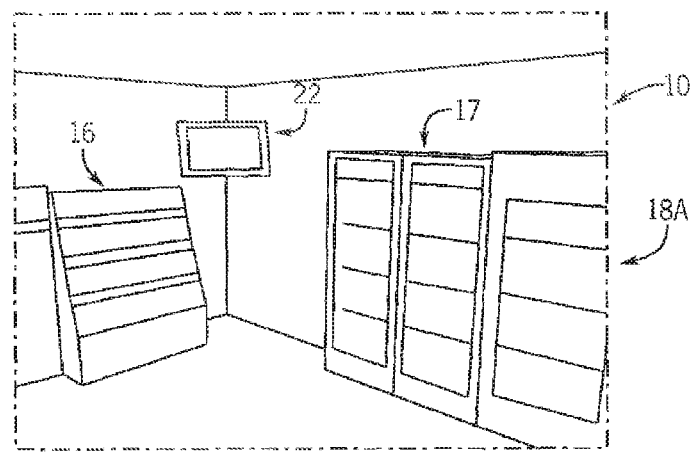
FIG. 2 shows an embodiment of rack and display systems for merchandise for use in the micro-market, including bulk item bins, refrigerator cooler, freezer cooler and various other systems. Also shown is a audio-visual display apparatus.
Figure 3:
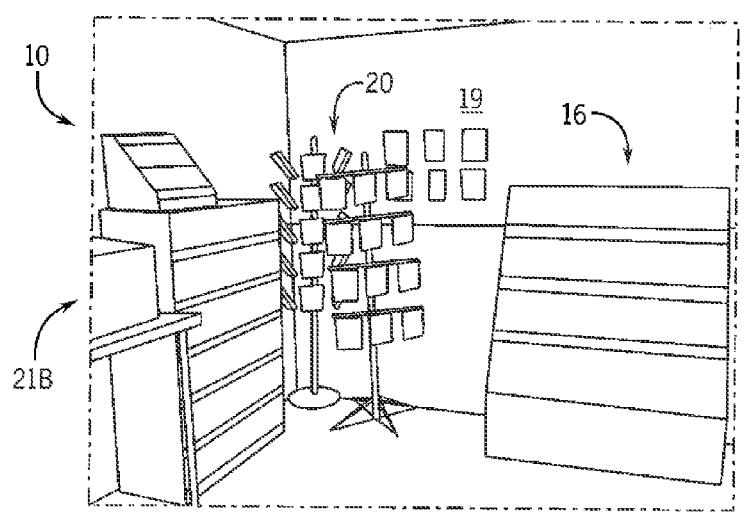
FIG. 3 shows further embodiments of the merchandise rack and display systems, including wall hanging systems, weight measurement means, and various floor standing hangers and displays.
Figure 4:
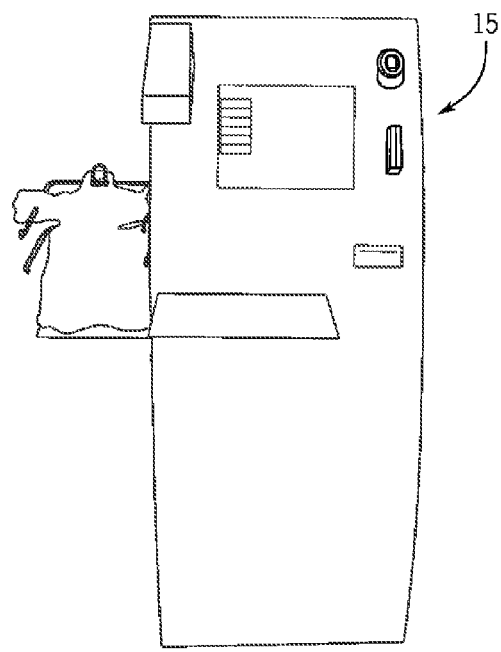
FIG. 4 is a front view of an embodiment of a checkout kiosk of the present invention.
Figure 5:
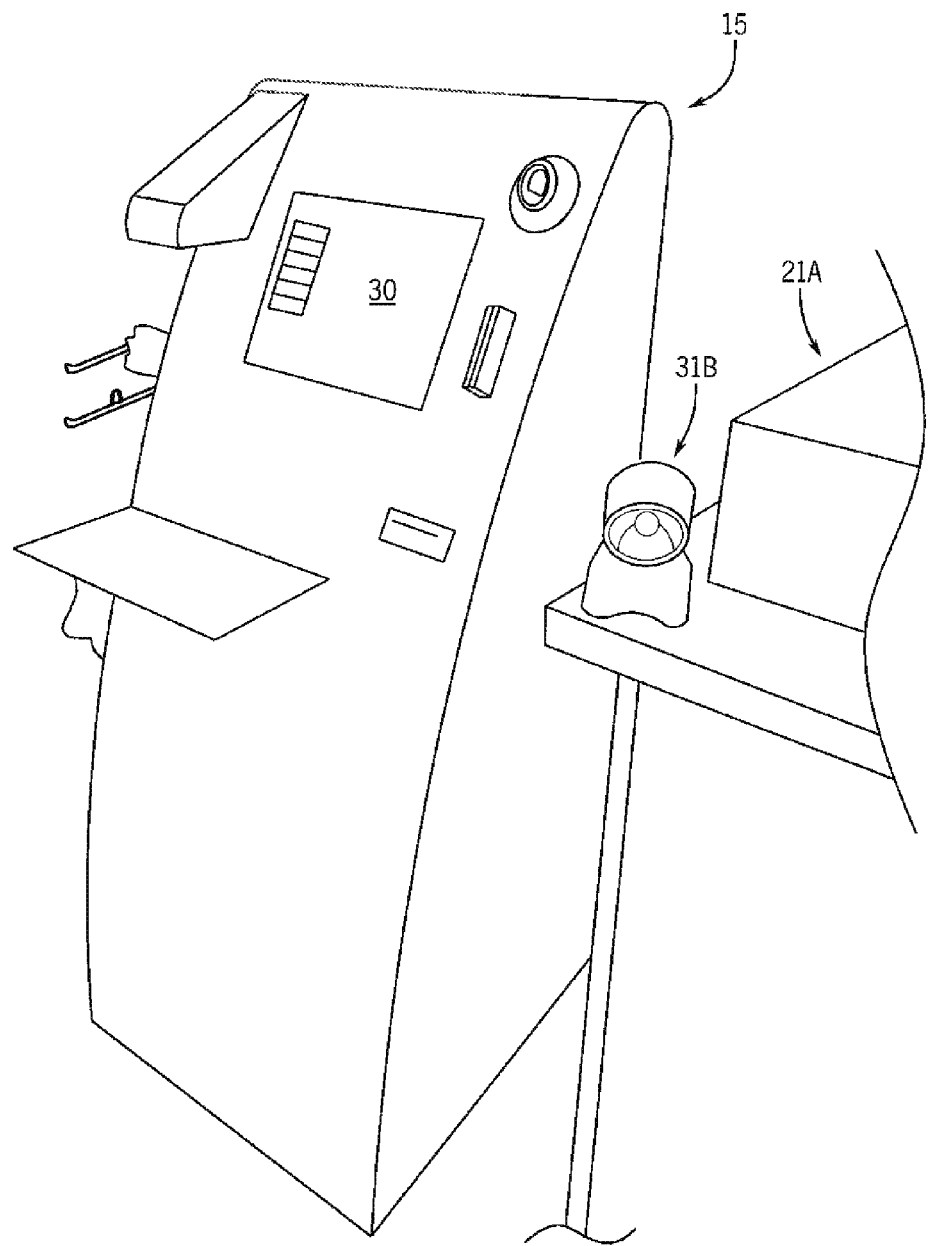
FIG. 5 is a perspective view (from the right side) of the checkout kiosk.
Figure 6:
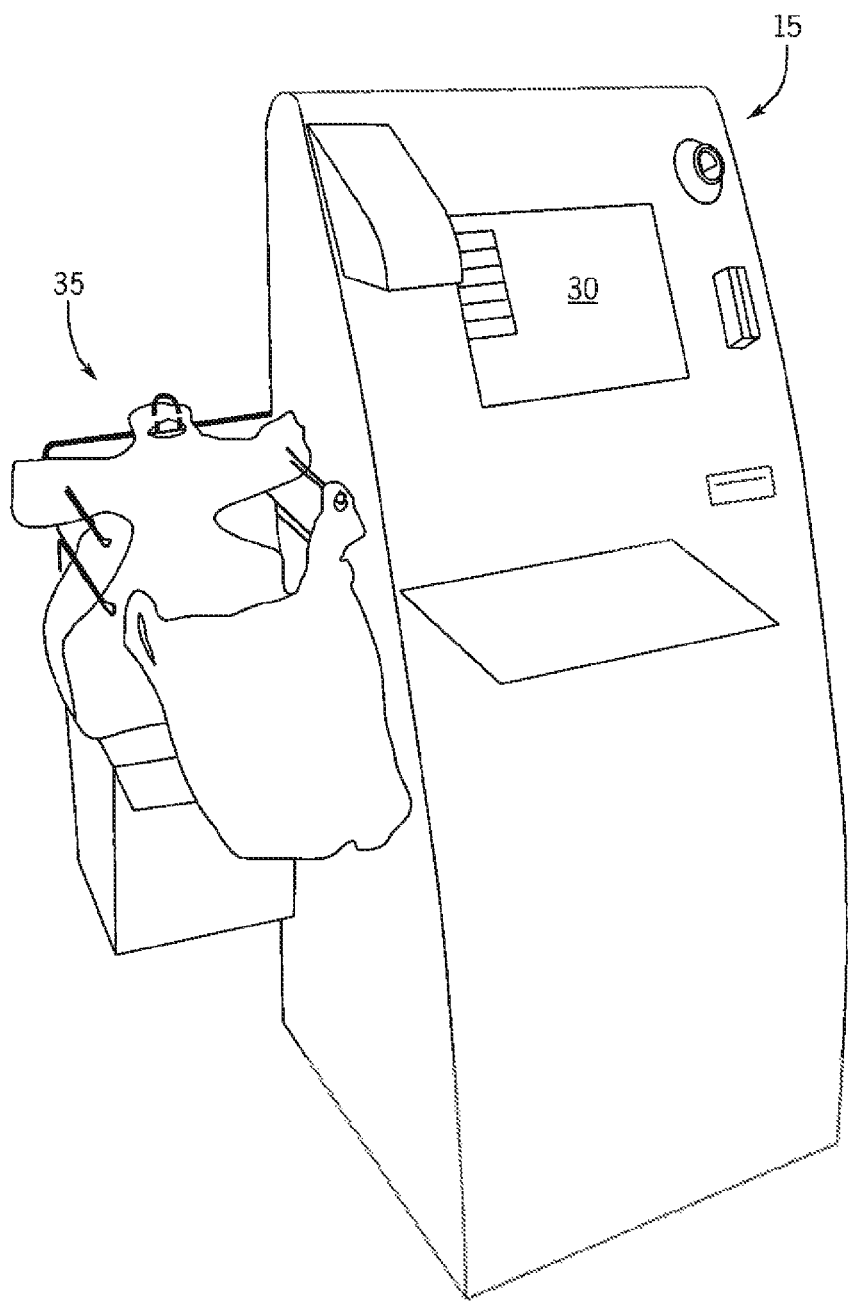
FIG. 6 is a perspective view (from the left side) of the checkout kiosk.
Figure 7:
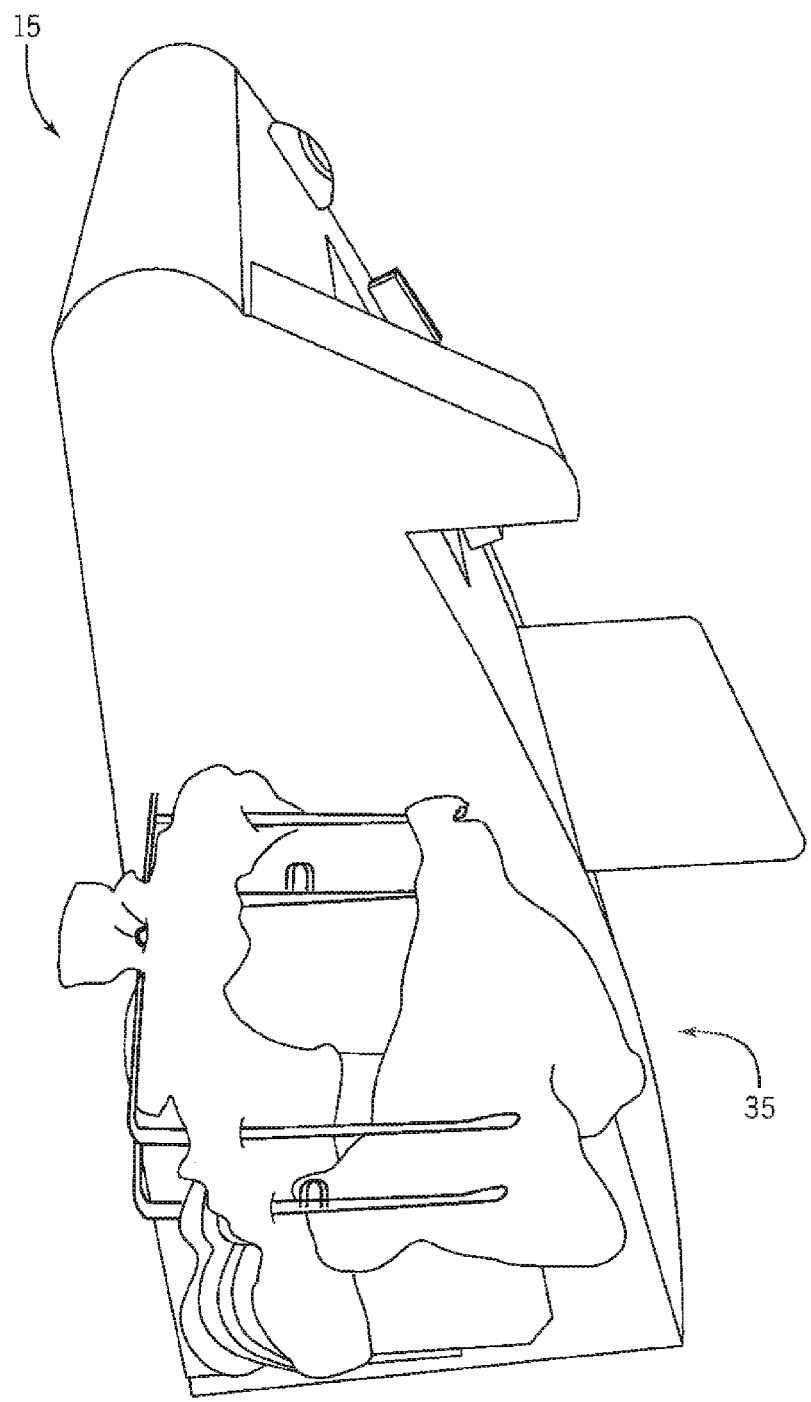
FIG. 7 is a left side view of the checkout kiosk.

FIGS. 1-9 show an embodiment of a micro-market 10 of the present invention, including an embodiment of a checkout kiosk 15 for use in the micro-market. FIGS. 2 and 3 show an embodiment of rack and display systems for merchandise for use in the micro-market, including bulk item bins 16, refrigerator cooler 17, freezer cooler 18 and various other systems. Also shown is a audio-visual display apparatus. The market may also include merchandise rack and display systems, including wall hanging systems 19, weight measurement means, and various floor standing hangers and displays 20. The market may have a toaster, oven 21A and/or microwave oven 21B. The market may have a TV/monitor 22, music system or other AV devices.

Figure 8:
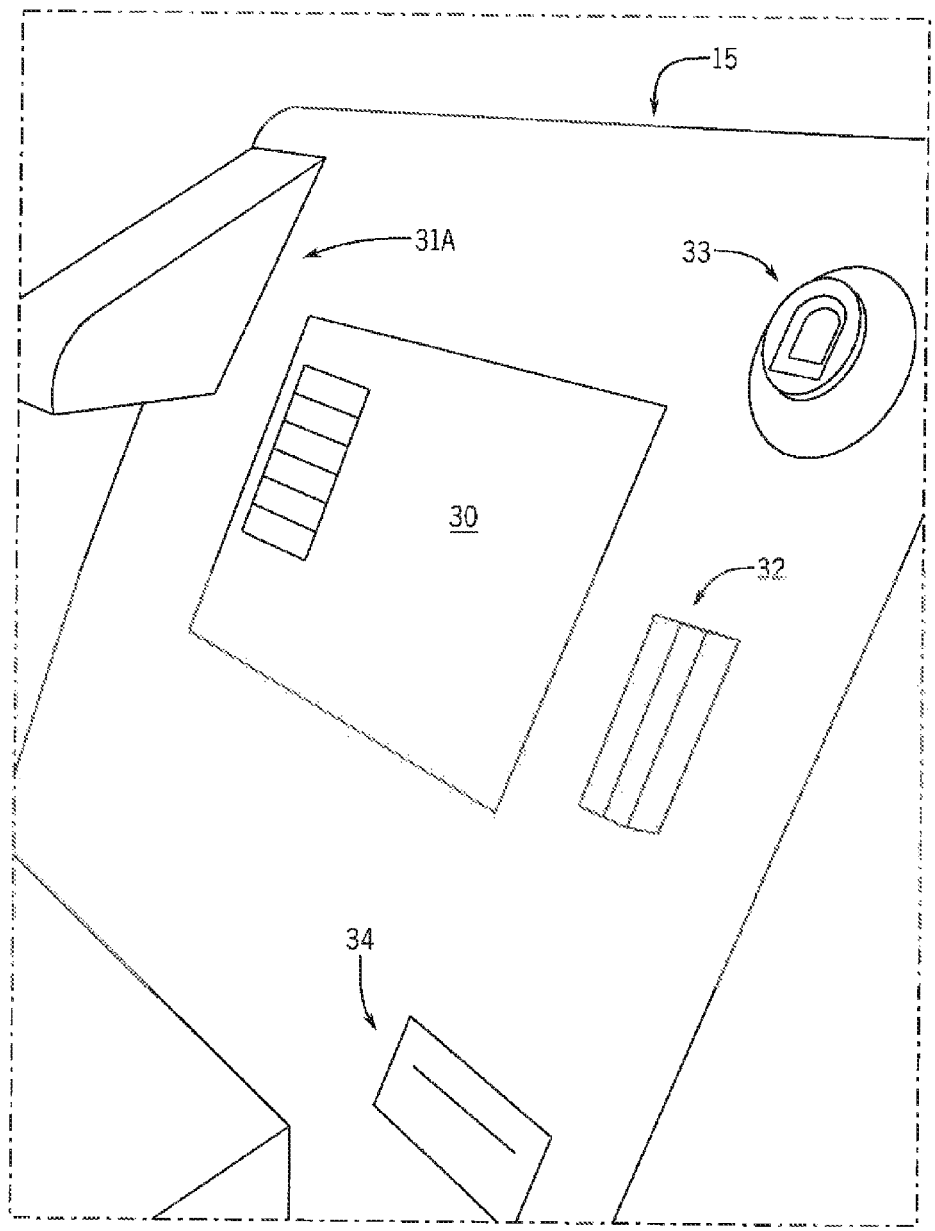
FIG. 8 is a detail view of the customer interface elements of the kiosk.
Figure 9:
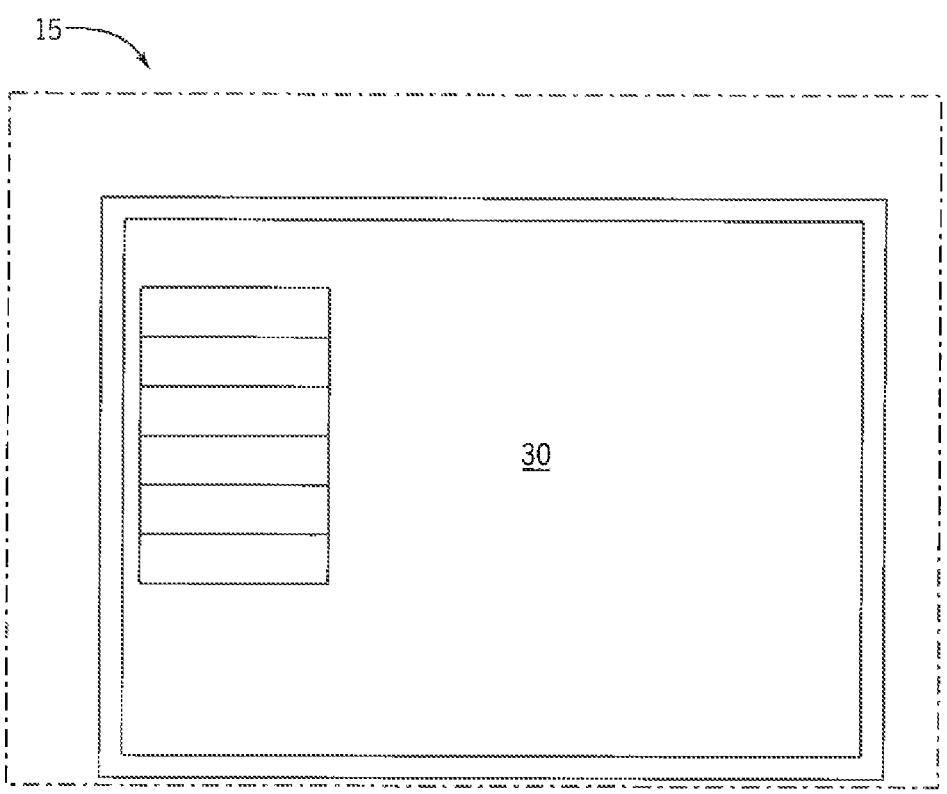
FIG. 9 is a detail view of the touch-screen interface of the kiosk.

FIGS. 4-9 show an embodiment of a checkout kiosk 15 of the present invention. FIG. 8 is a detail view of the customer interface elements of the kiosk, including a touch screen interface 30, bar code scanner(s) 31, a card reader 32, a thumb print reader 33 and a cash deposit mechanism 34. A bagging station 35 is shown disposed on the side of the kiosk 15. FIG. 9 is a detail view of the touch-screen interface 30 of the kiosk.

Figure 10:
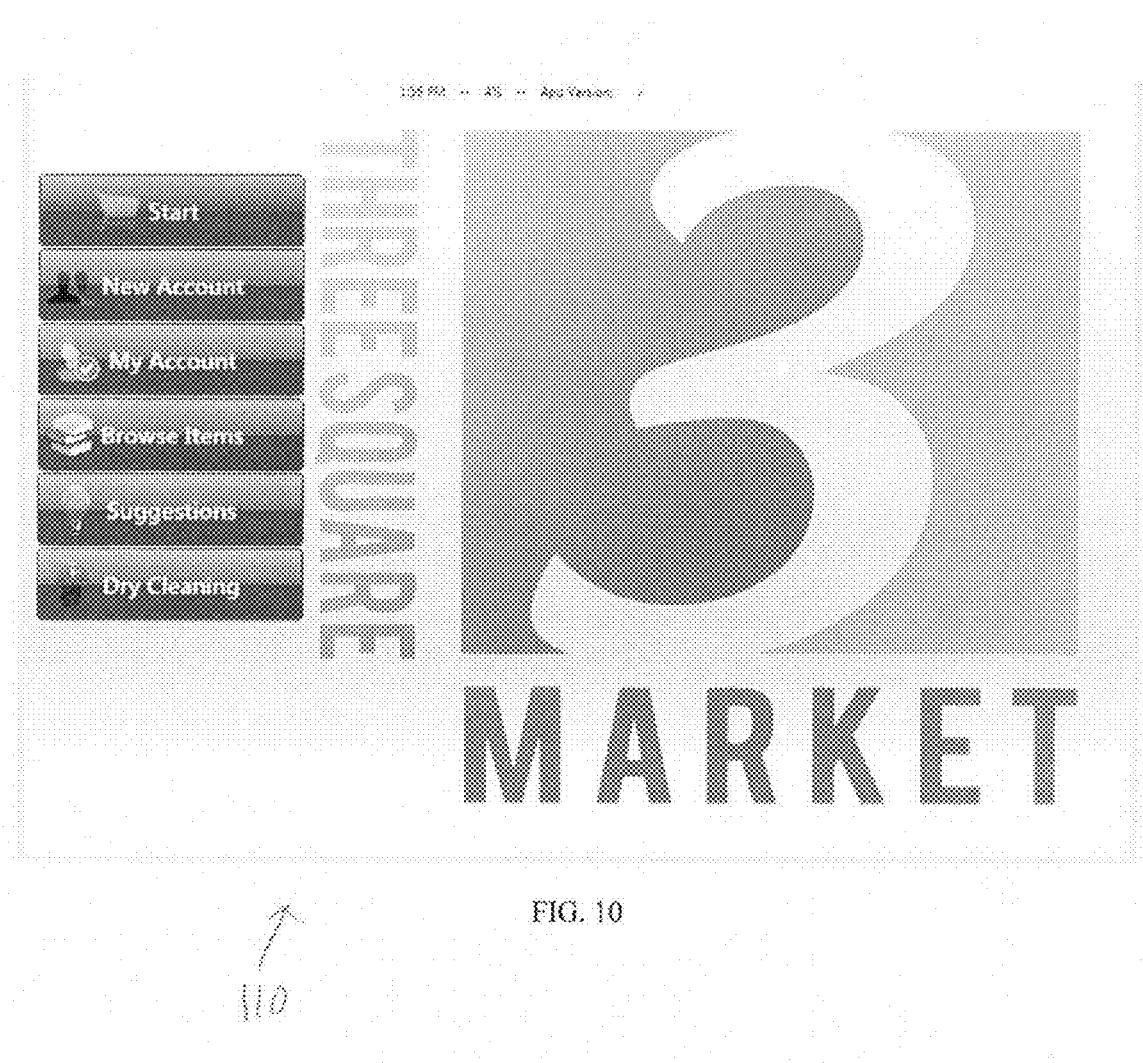
FIG. 10 shows an embodiment of the control interface of the kiosk, including an introductory or welcome screen with means to start shopping, create a new account, access an existing account, browse or search for items, review suggestions, and order services such as dry cleaning.
Figure 11:
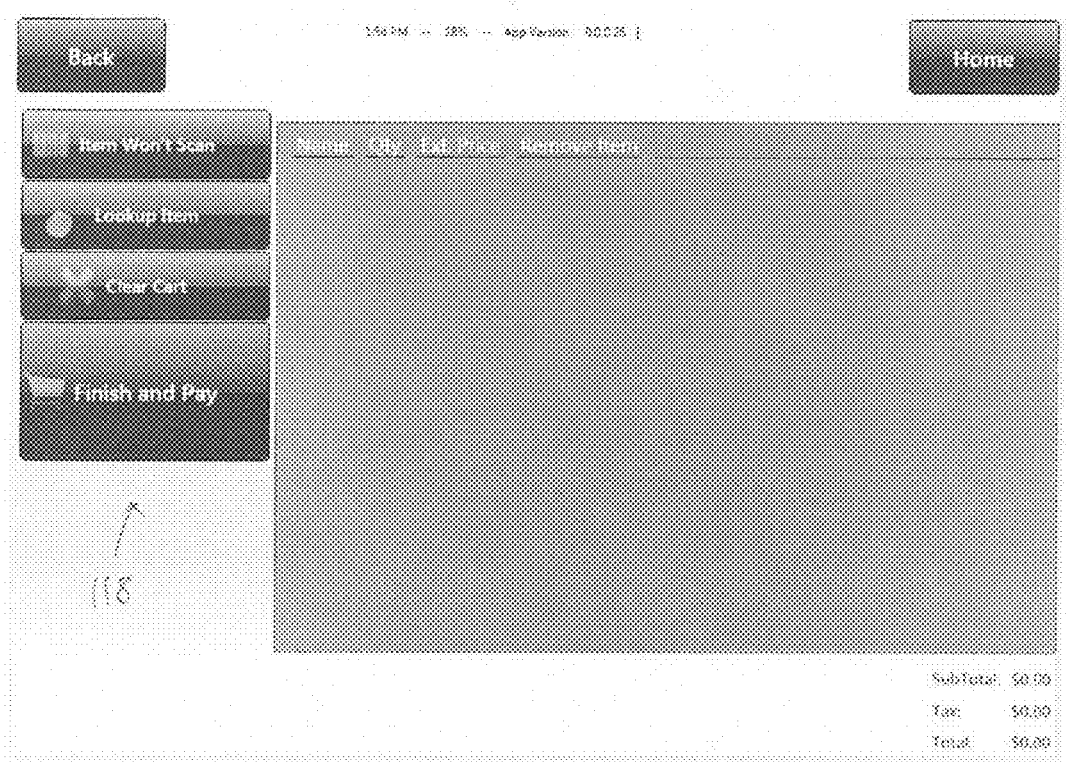
FIG. 11 shows an embodiment of a checkout screen.
Figure 12:
FIG. 12 shows an embodiment of a look up screen for finding various products for checkout.
Figure 13:
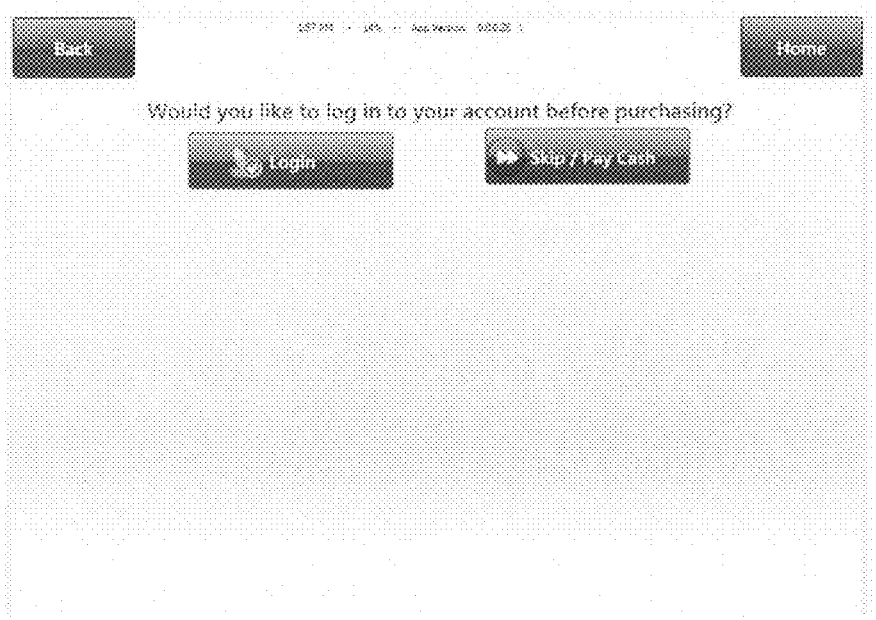
FIG. 13 shows an embodiment of a payment inquiry screen.
Figure 14:
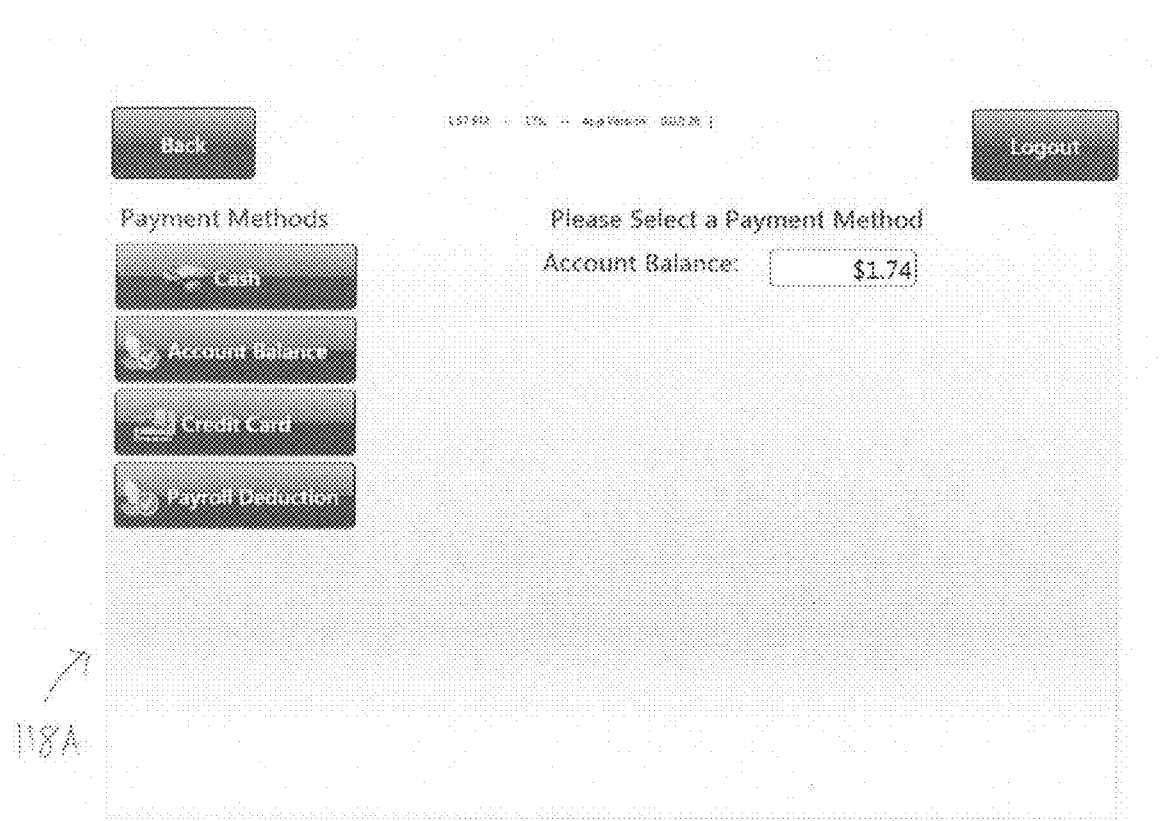
FIG. 14 shows an embodiment of a payment method selection screen.
Figure 15:
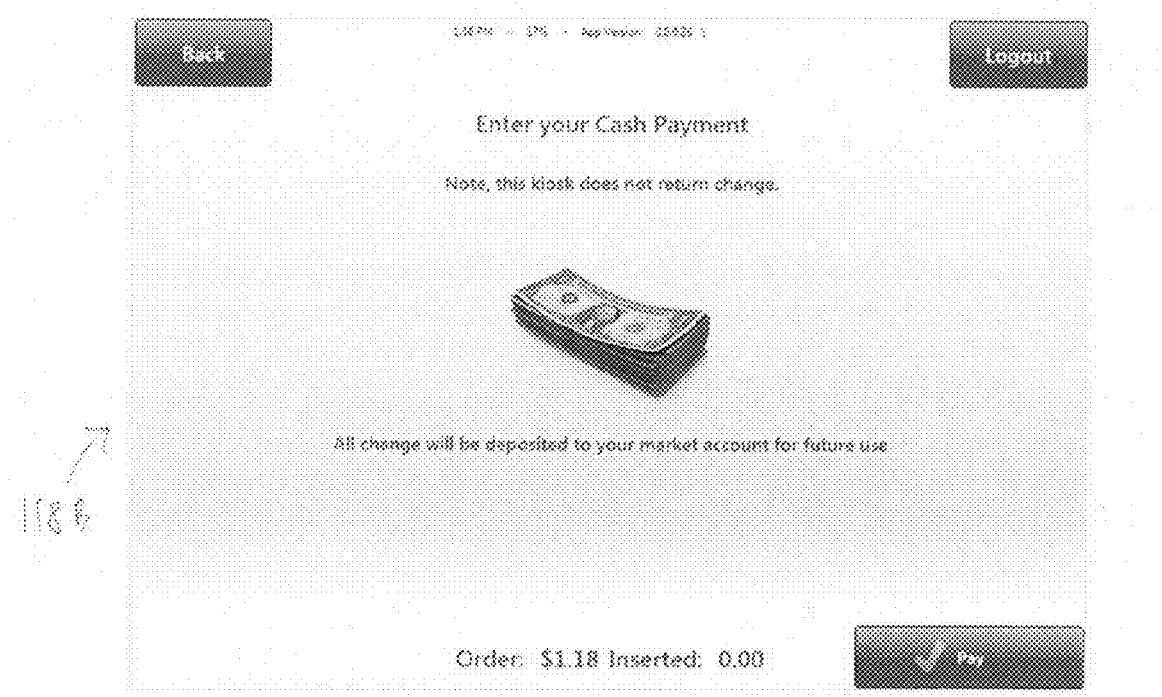
FIG. 15 shows an embodiment of a cash payment screen.
Figure 16:
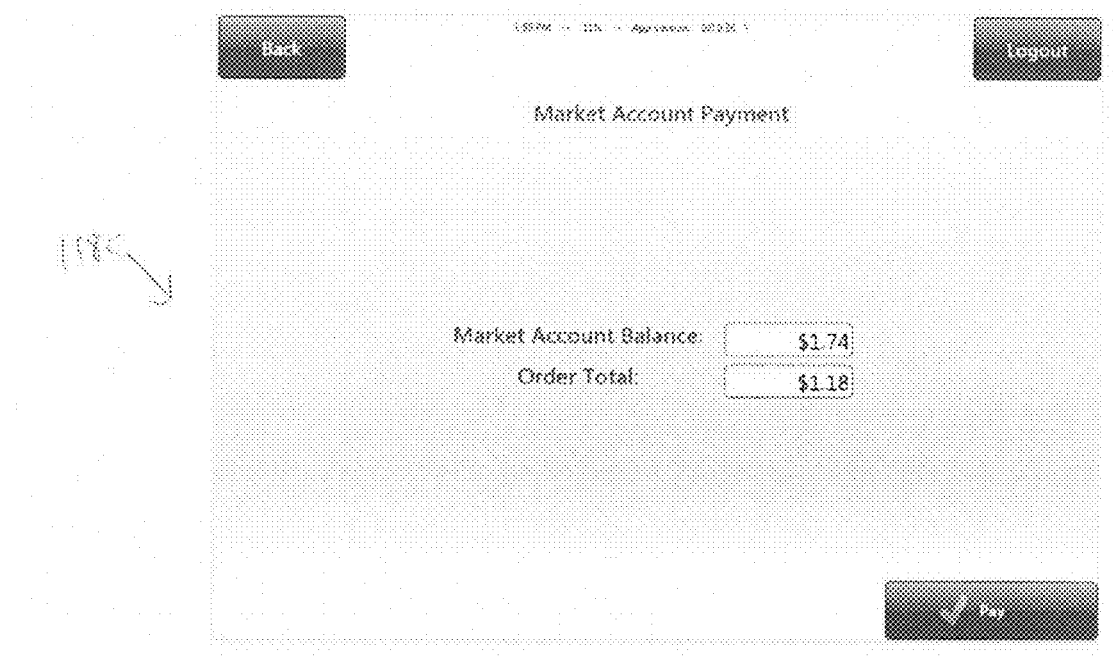
FIG. 16 shows an embodiment of an account balance screen.
Figure 17:
FIG. 17 shows an embodiment of a credit card payment input screen.
Figure 18:
FIG. 18 shows an embodiment of credit card payment finalization screen.
Figure 19:
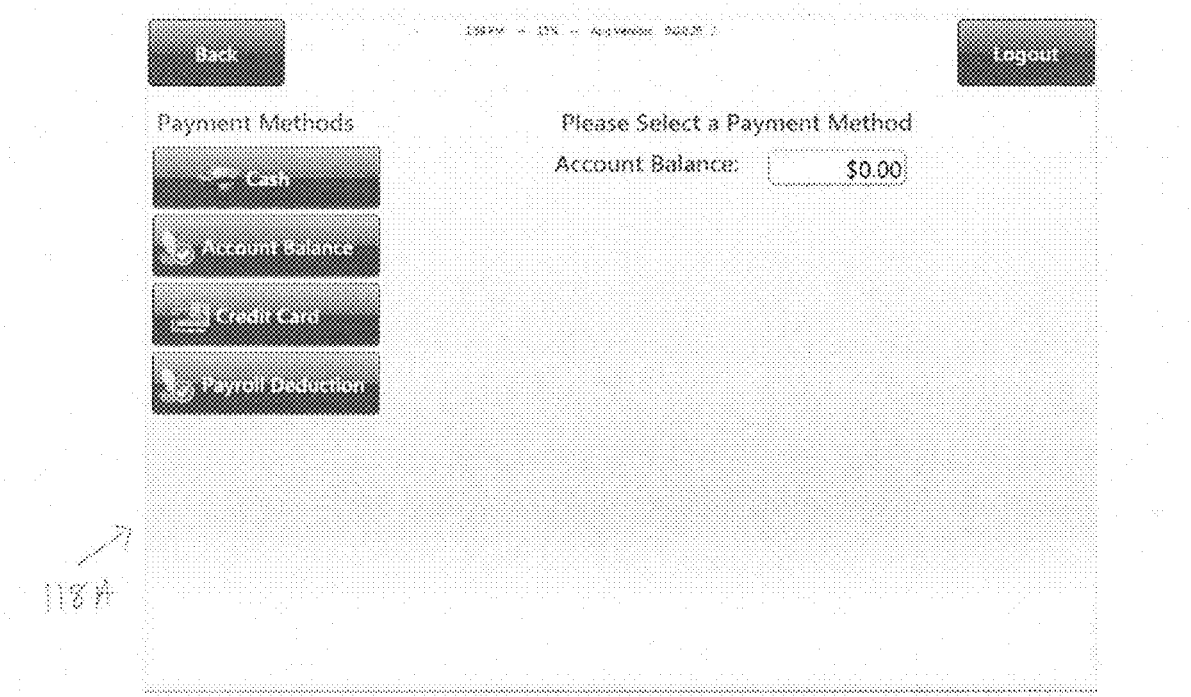
FIG. 19 shows an embodiment of a payment means selection screen.
Figure 20:
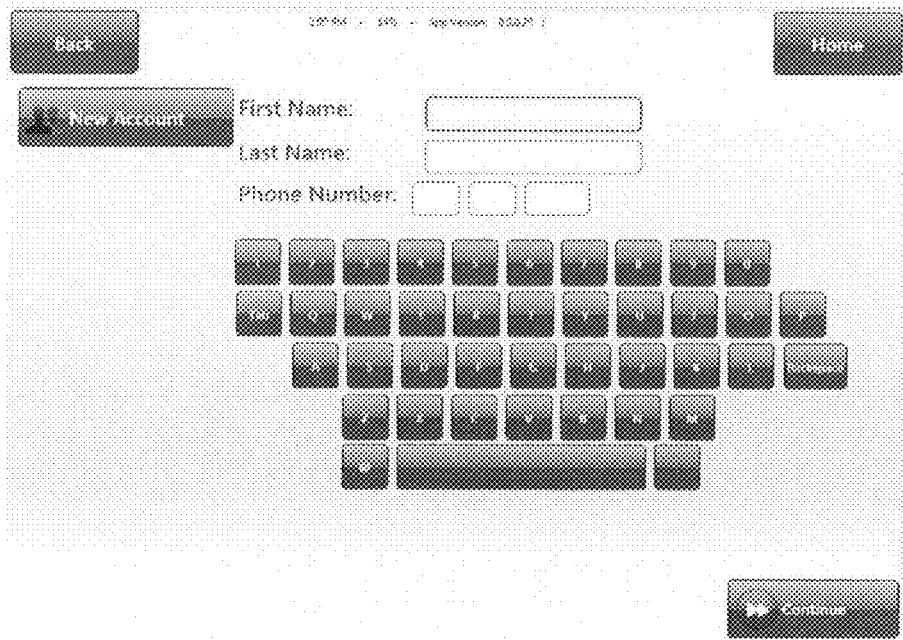
FIG. 20 shows an embodiment of new account data input screen.
Figure 21:
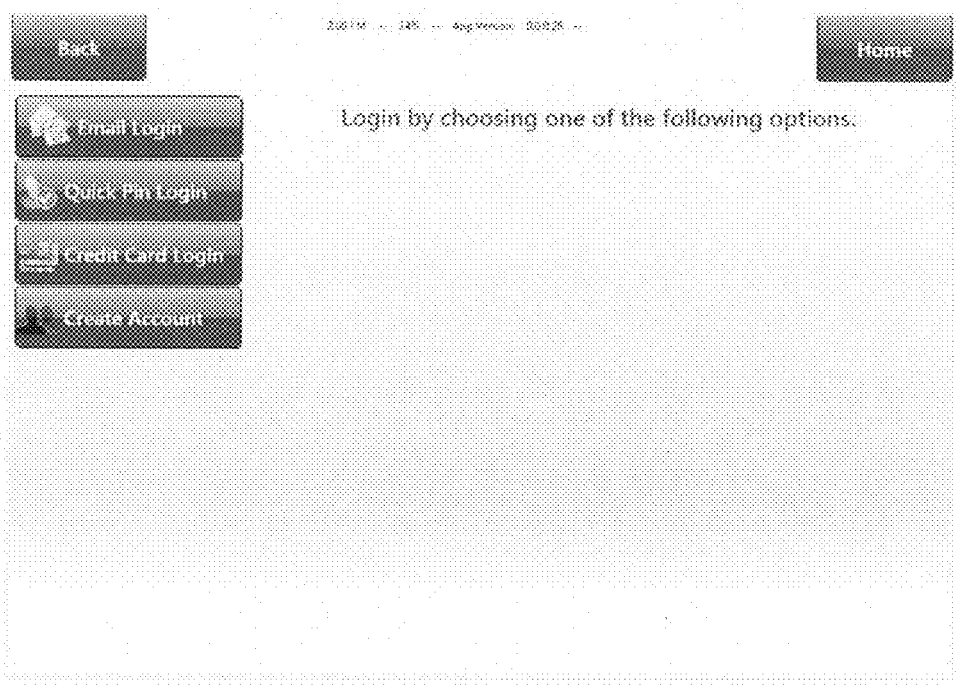
FIG. 21 shows an embodiment of a login-type screen.
Figure 22:
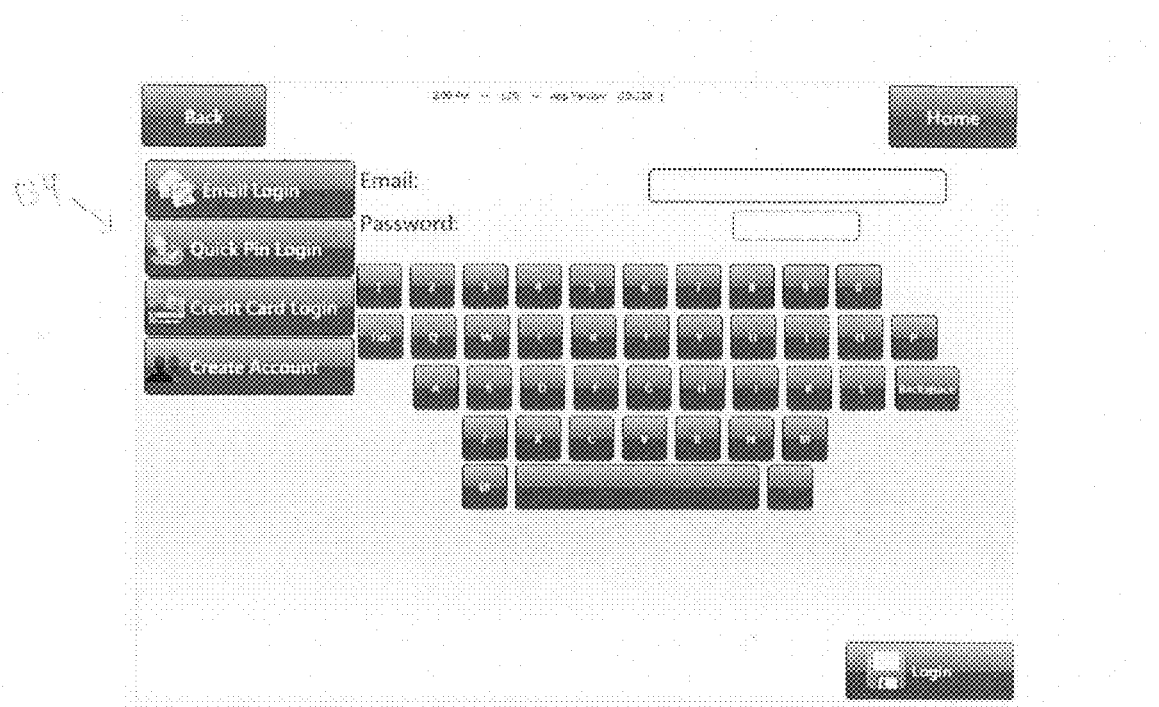
FIG. 22 shows an embodiment of an email login screen.
Figure 23:
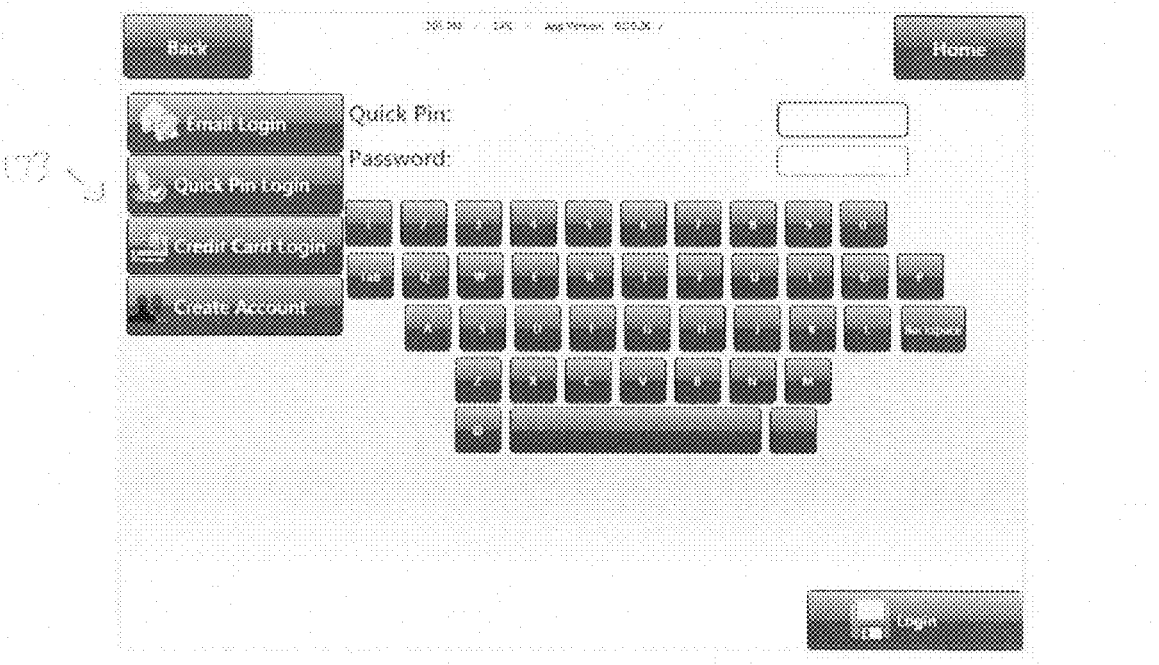
FIG. 23 shows an embodiment of a quick-pin login screen.
Figure 24:
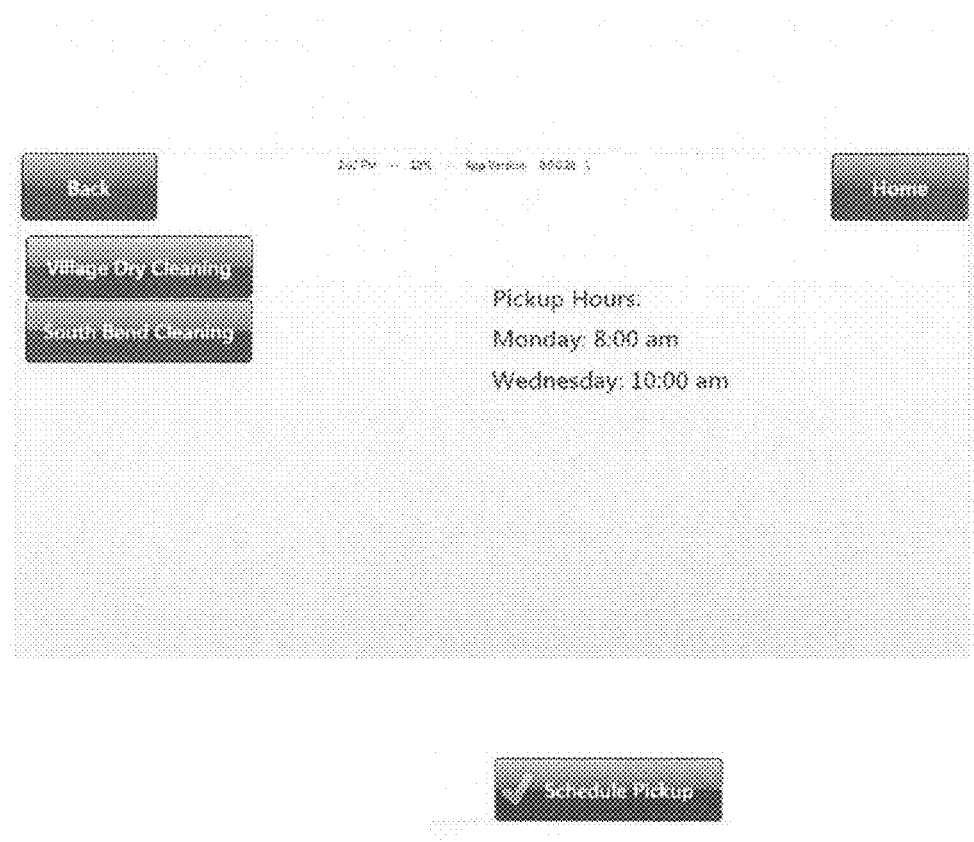
FIG. 24 shows an embodiment of services ordering screen, for example dry-cleaning pickup scheduling.

FIGS. 10-24 show an embodiment of the control interface of the kiosk 15 which is used by the user/shopper to check out, including an introductory or welcome screen with means to start shopping, create a new account, access an existing account, browse or search for items, review suggestions, and order services such as dry cleaning. FIG. 10 shows the home or login screen 110 of the kiosk. FIG. 11 shows an embodiment of a checkout screen 118. FIG. 12 shows an embodiment of a look up screen 114 for finding various products for checkout. FIG. 13 shows an embodiment of a login prior to payment inquiry screen 118A. FIG. 14 shows an embodiment of a payment method selection screen 118A. FIG. 15 shows an embodiment of a cash payment screen 118B. FIG. 16 shows an embodiment of an account balance screen 118C. FIG. 17 shows an embodiment of a credit card payment input screen 118D. FIG. 18 shows an embodiment of payroll deduction payment screen 118E. FIG. 19 shows another payment means selection screen 118A. FIG. 20 shows an embodiment of new account data input screen 112. FIG. 21 shows an embodiment of a login-type screen 113. FIG. 22 shows an embodiment of an email login screen 134. FIG. 23 shows an embodiment of a quick-pin login screen 133. FIG. 24 shows an embodiment of services ordering screen, for example dry-cleaning pickup scheduling.

Figure 25:
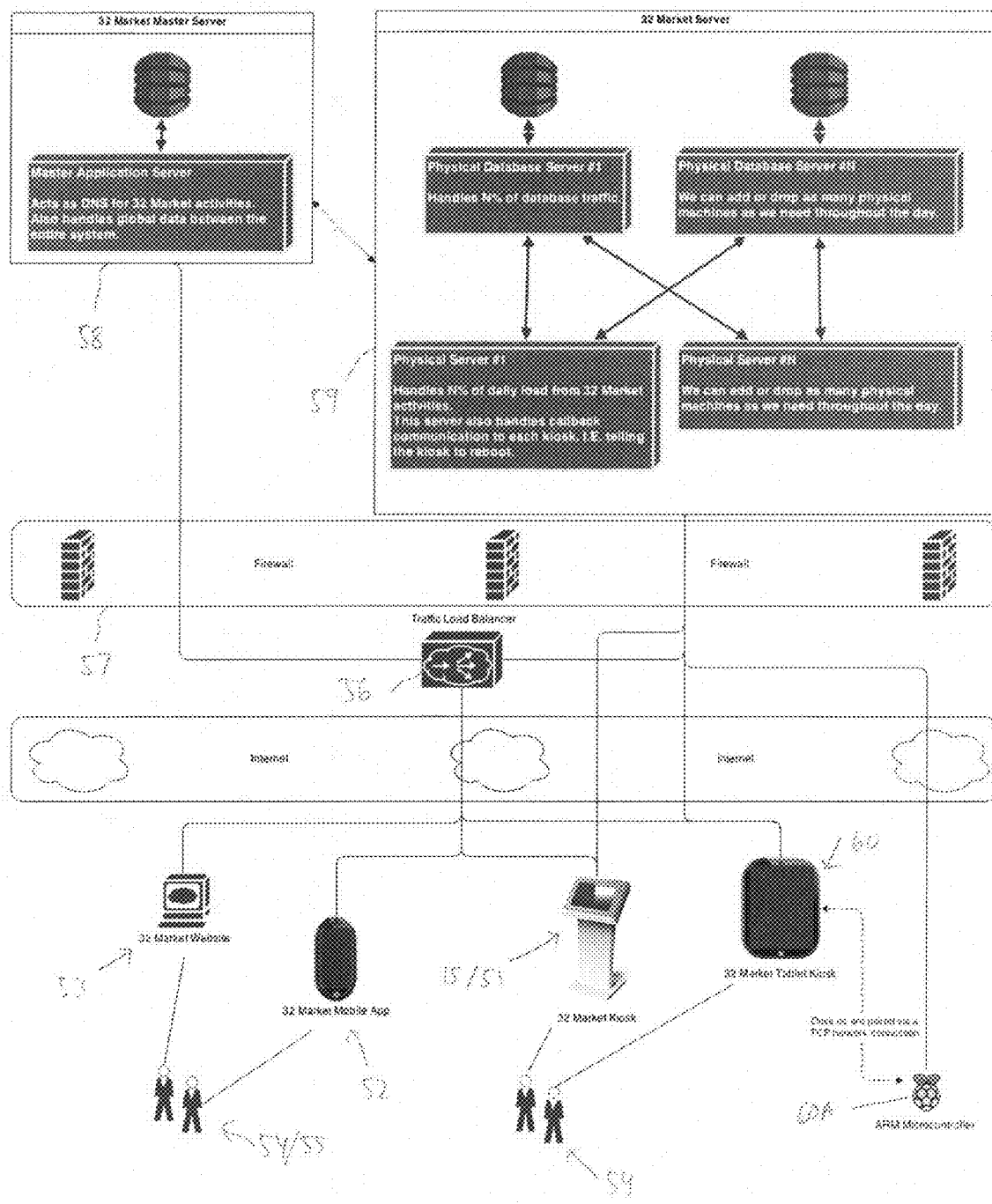
FIG. 25 is a network and hardware diagram of an embodiment of the retail convenience market system of the invention comprising kiosk, mobile device app, and website use (shopping) and management tools for use by the user (shopper) and administrators.

Referring to the network and hardware diagram of FIG. 25, one embodiment of the retail convenience market system 50 of the invention comprises kiosk 51, mobile device app 52, and website 53 use (shopping) and management tools for use by the user (shopper) 54 and administrators 55. One or more kiosks 51, preferably android OS based devices) are disposed at the market and are used by shoppers 54 to checkout at the conclusion of shopping. The users 54 may have a mobile device 52 such as a smart phone (android, iOS based), iPod or iPad. A shopping app (described in further detail below) of the system 50 may be installed on the device 54 to permit shopping and other tasks in place of or in cooperation with the kiosk 51. Users 54 may also access the system to manage their accounts via a website available via a web browser 53 either on the premises of the market or remotely. The kiosk 51, mobile app 52 and browser 53 are communicatively connected to a traffic load balancer 56 via the Internet. The load balancer 56 is preferably a software load balancer and most preferably a cloud based system such as Amazon Web Services load balancer. These user interface components 51, 52 and 53 are communicatively connected through firewall 57 to a master server 58 and a server 59. The master server 58 is an application server that acts as DNS for market activities and also handles global data transfer over the entire system 50. The server 59 handles database activities and traffic, and communication between each kiosk 51. The server 59 may comprise a plurality of server machines that may be added and dropped as the need for server services changes. Referring also to FIGS. 111-114, the system 50 may also include tablet based kiosks 60 utilizing ARM microcontrollers 60A. An exemplary microcontroller is preferably a Raspberry Pi microcontroller.

Figure 26:
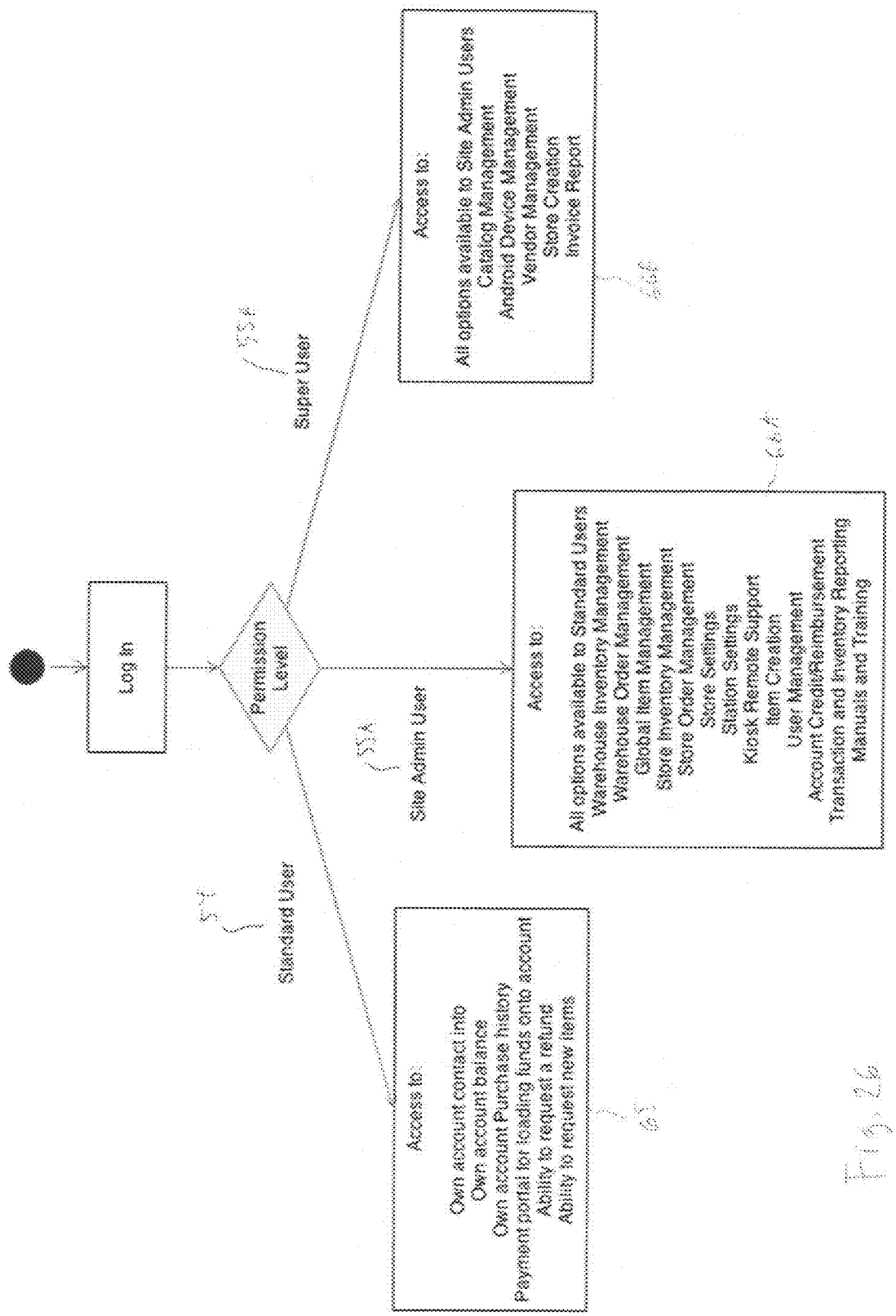
FIG. 26 is a logic diagram of an embodiment of the website management tool of the system.
Figure 27:
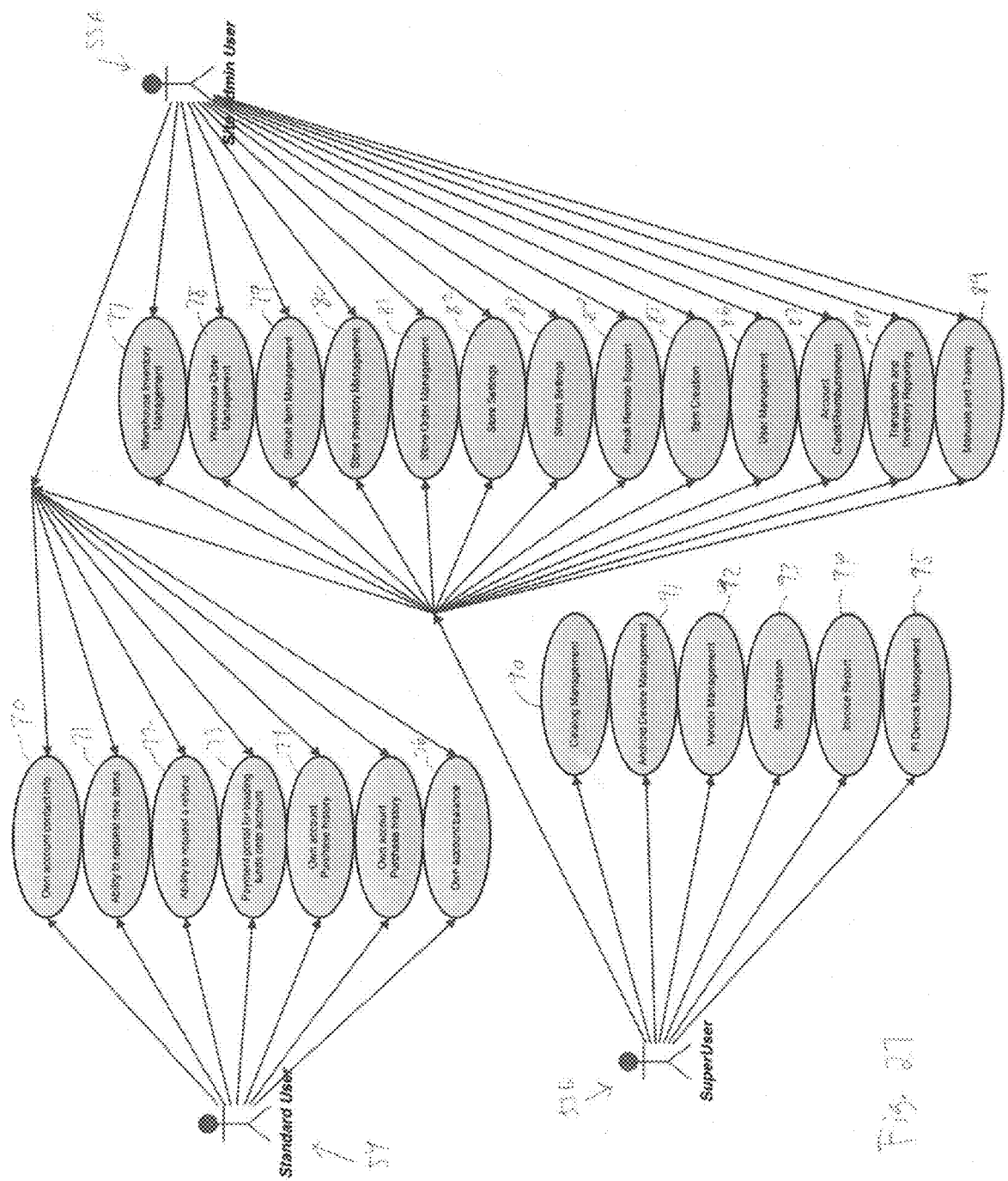
FIG. 27 is a use case diagram of the website.
Figure 28:
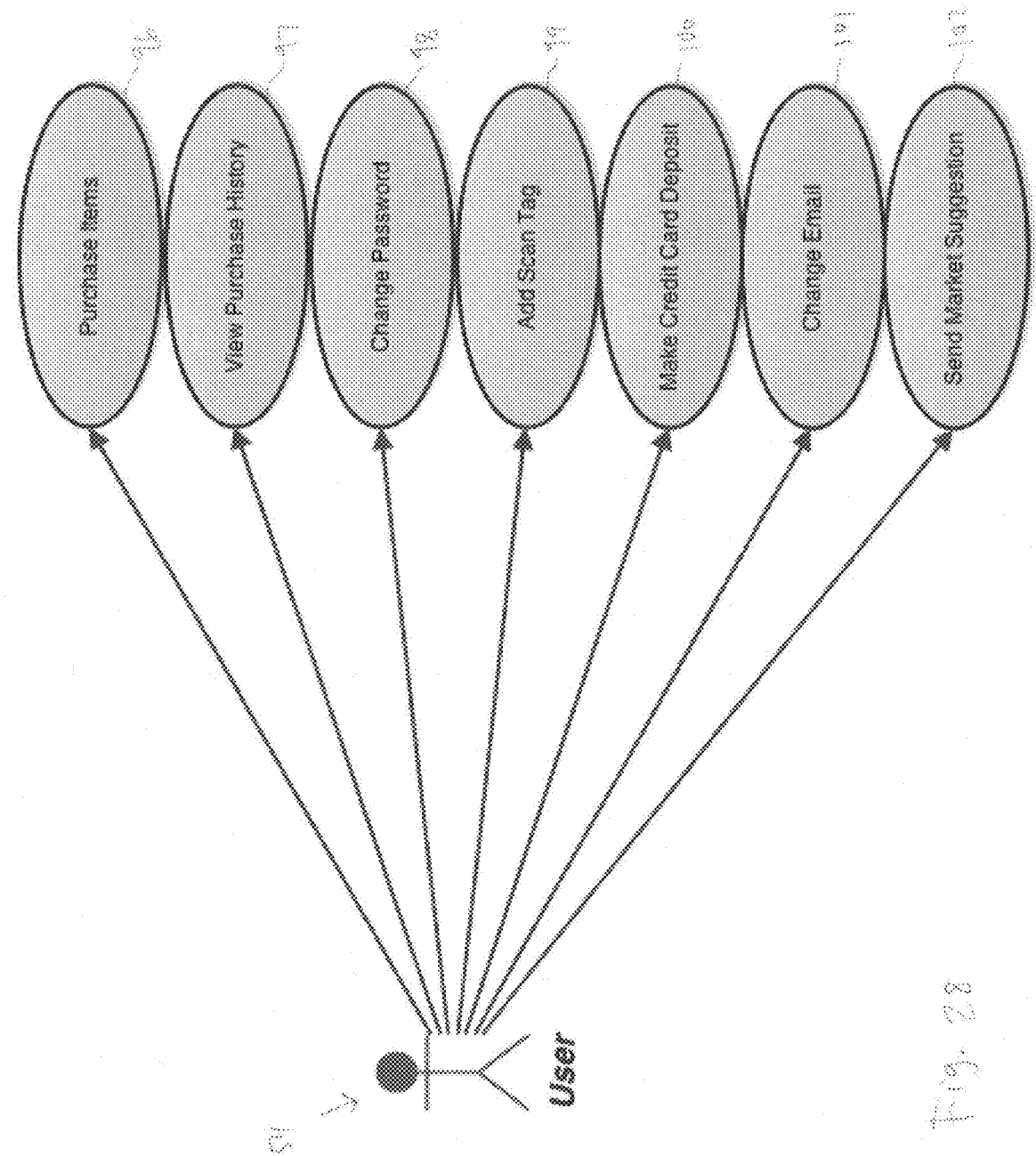
FIG. 28 is a use case diagram of an embodiment of the kiosk management tool of the system.
Figure 29:
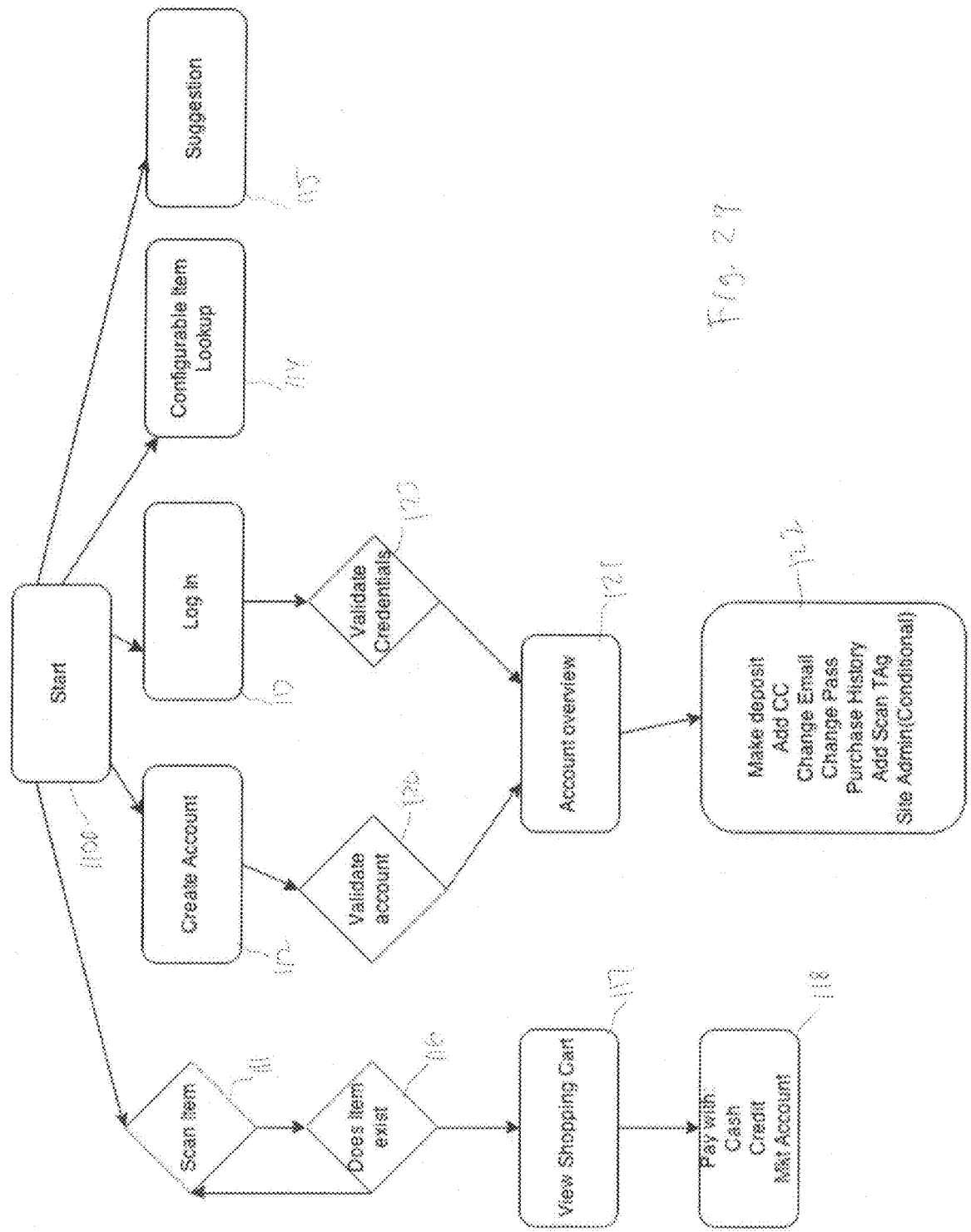
FIG. 29 is an activity diagram of the kiosk.
Figure 30:
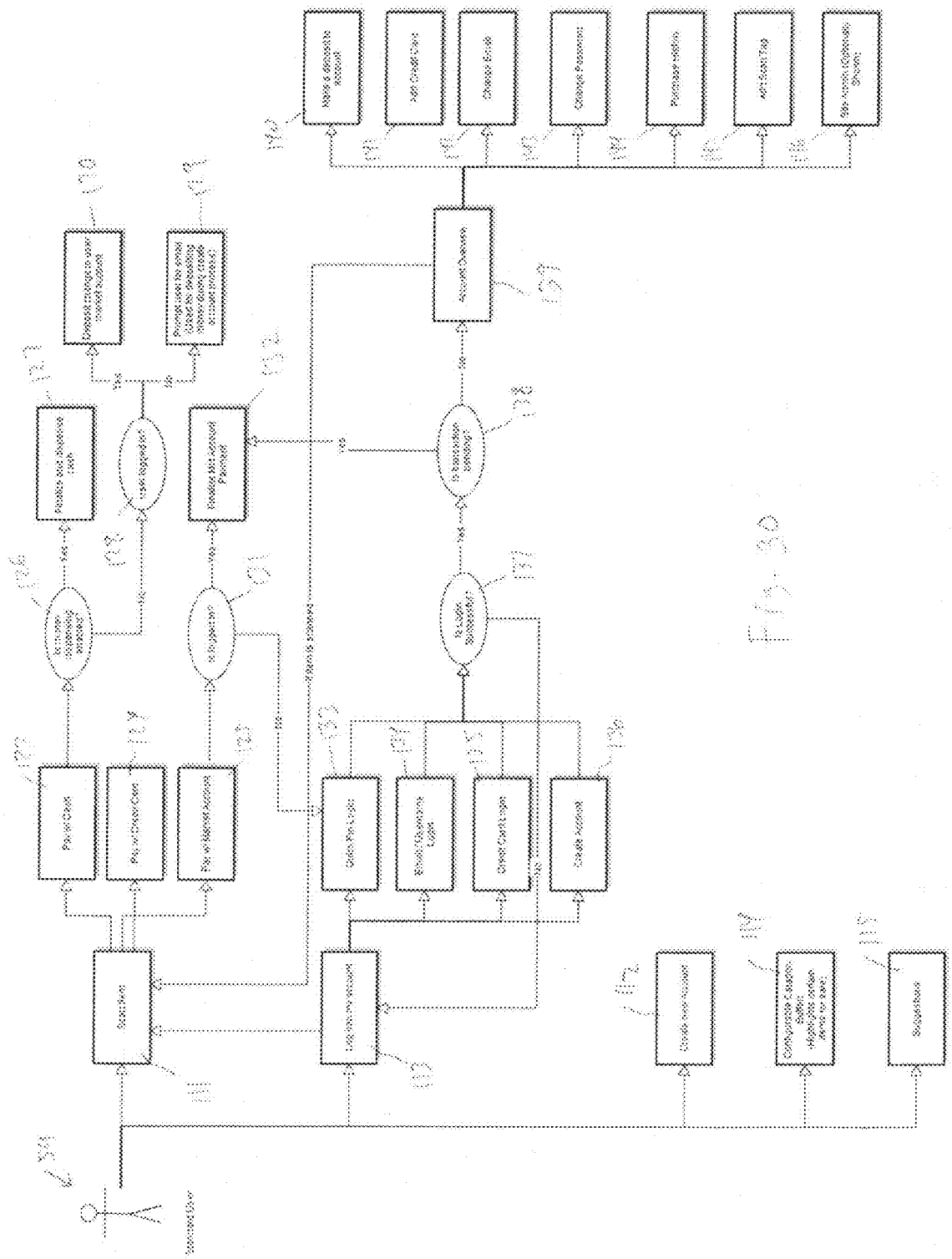
FIG. 30 is use case diagram of the kiosk.
Figure 37:
FIG. 37 shows an embodiment of an Account—Home/Account screen or user interface for use by a market user/customer, the screen or page including links to Credit Card Info, Contact Info, Change Password, Requests, History, Coupons, Rewards and Garage Sale screens or pages.
Figure 126:
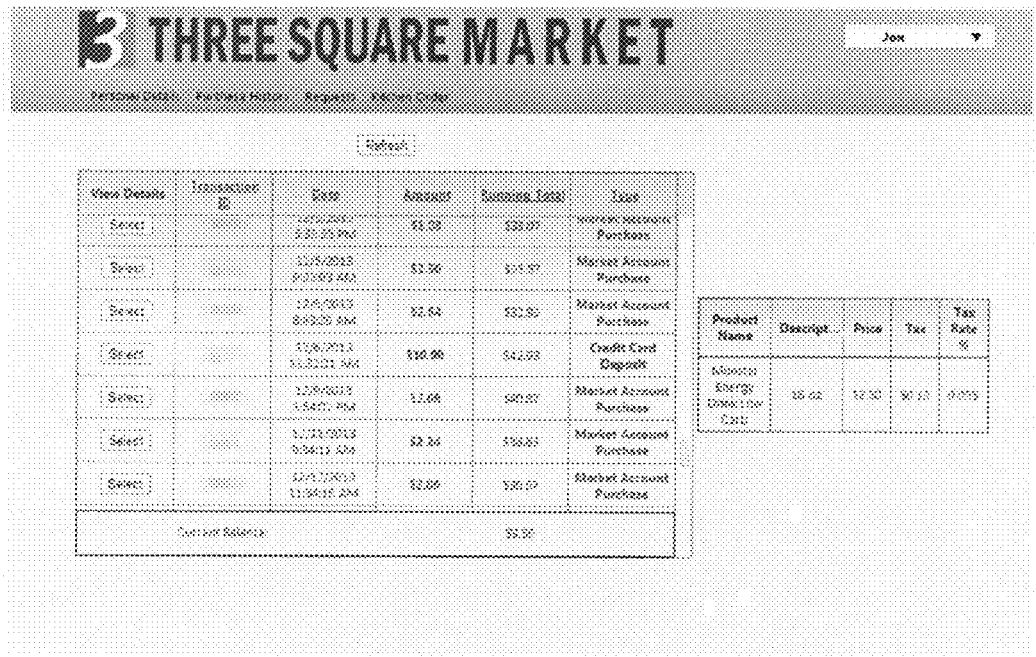
FIGS. 126 to 133 are view of select website user interfaces.
Figure 127:
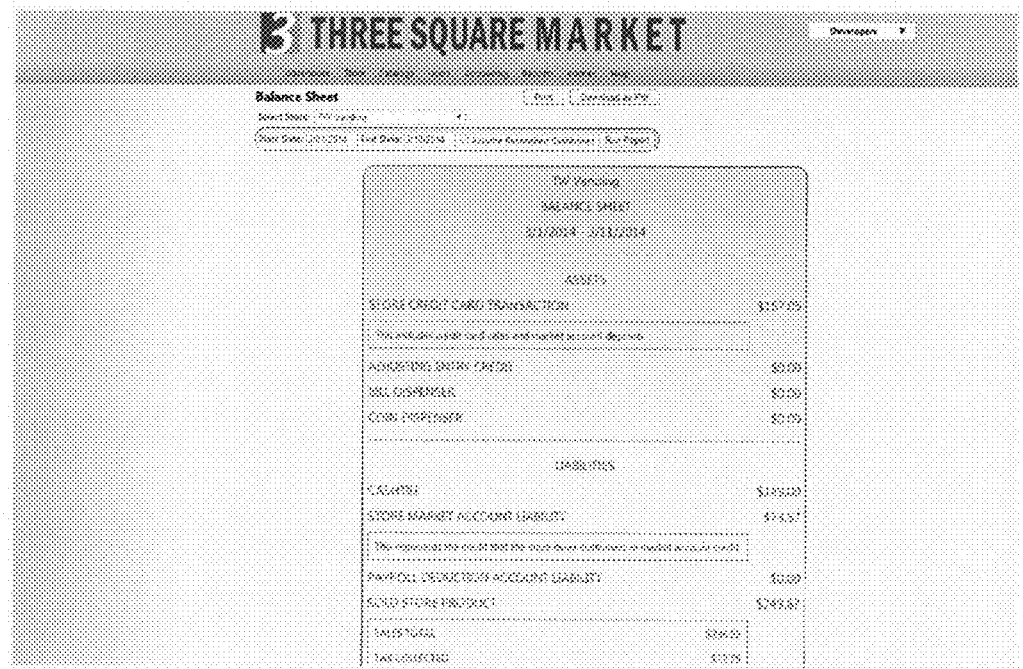
Figure 128:
Figure 129:
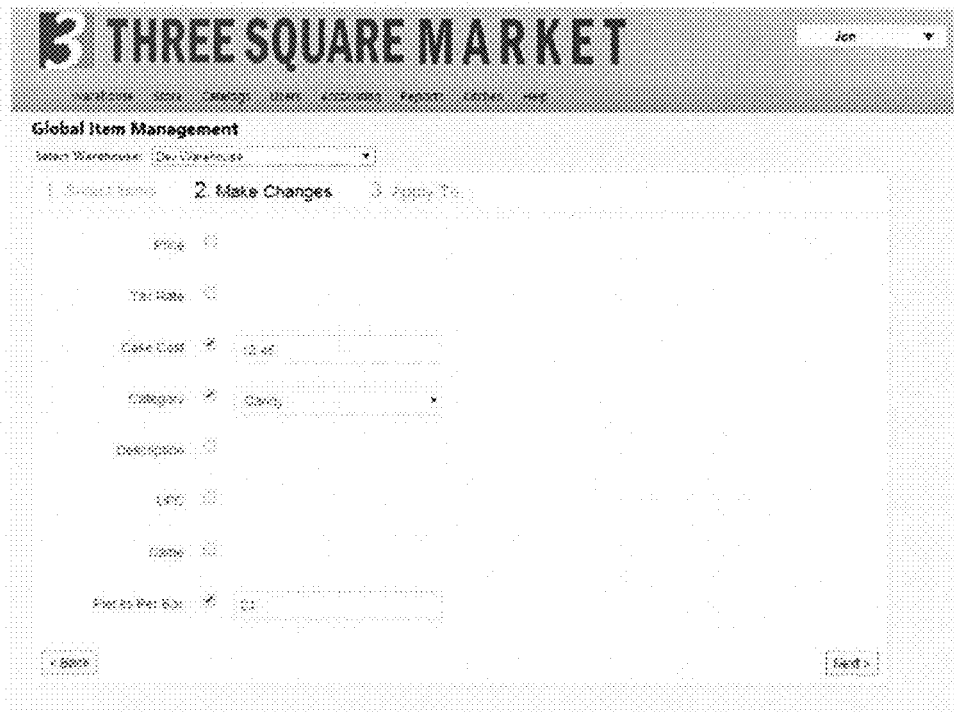
Figure 130:
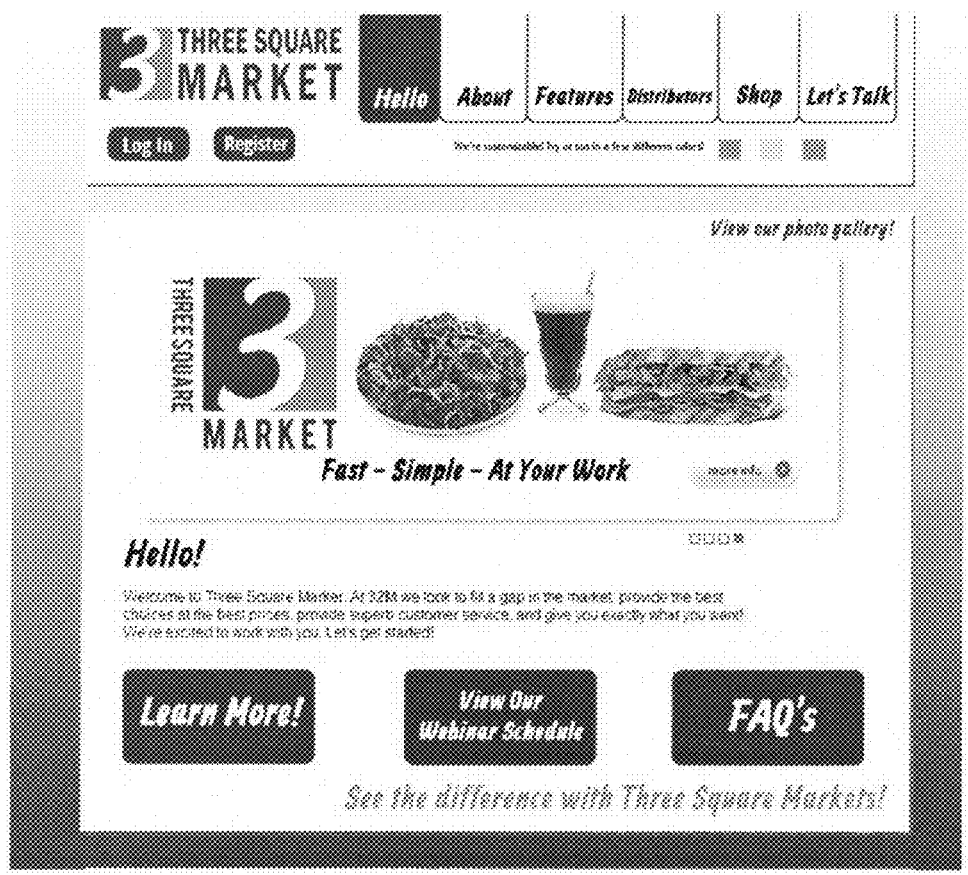
Figure 131:
Figure 132:
Figure 133:
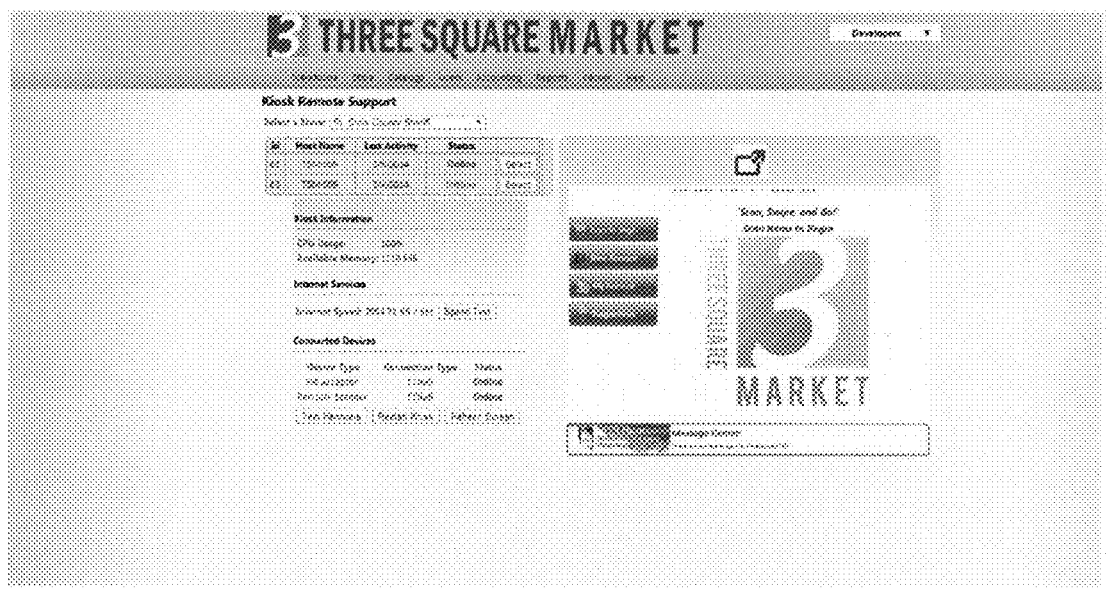

The means and method of users 54, site administrators 55A and super administrators 55B to access the system 50 via web access 53 is further shown in FIGS. 26 and 27 which show webs access features of the system 50. Referring to FIG. 26, the user 54 or administrator 55 logs in to the website for permission to access user 65, administrator 66A or super administrator 66B resources. FIG. 27 is a use case diagram of website 53 access. A standard user 54 may access the website to view or edit contact information 70 (See also FIG. 39) for their account, request new items 71 (See also FIG. 41), request a refund 72 (See also FIG. 42), deposit funds into their account 73 (payment portal function—See also FIG. 38), view purchase history 74 (See also FIG. 126), and view account balance 76 (See also FIG. 37). A site administrator (store vendor or owner) 55A has all of the tools available to the user, and can additionally manage warehouse inventory 77 (See also FIG. 45), manage warehouse orders 78 (See also FIGS. 50-53), perform global item management 79 (See also FIGS. 128 and 129), manage store inventory 80 (See also FIGS. 57-62 and 66), manage store orders 81 (See also FIGS. 63-65), view and edit store settings 82 (See also FIG. 67), view and edit station settings 83 (See also FIG. 68), remotely support kiosks 84 (See also FIG. 133), create items 85 (See also FIG. 144), manage users 86 (See also FIG. 69), credit and reimburse accounts 87 (FIG. 70), create reports for transactions and inventory 88 (See also FIG. 72-80) and access system user manuals and training resource 89 (See also FIGS. 151-153). A site super user (system administrator) 55B has all of aforementioned tools available to the site administrator 55A, and additionally can manage catalogs 90 (See also FIG. 146), manage android mobile devices 91 (See FIG. 145), manage vendors/administrators 92 (FIG. 148), create stores 93 (FIG. 147), create invoice reports 94 (FIG. 150) and manage tablet based kiosks 95 (FIG. 149).

Figure 31:
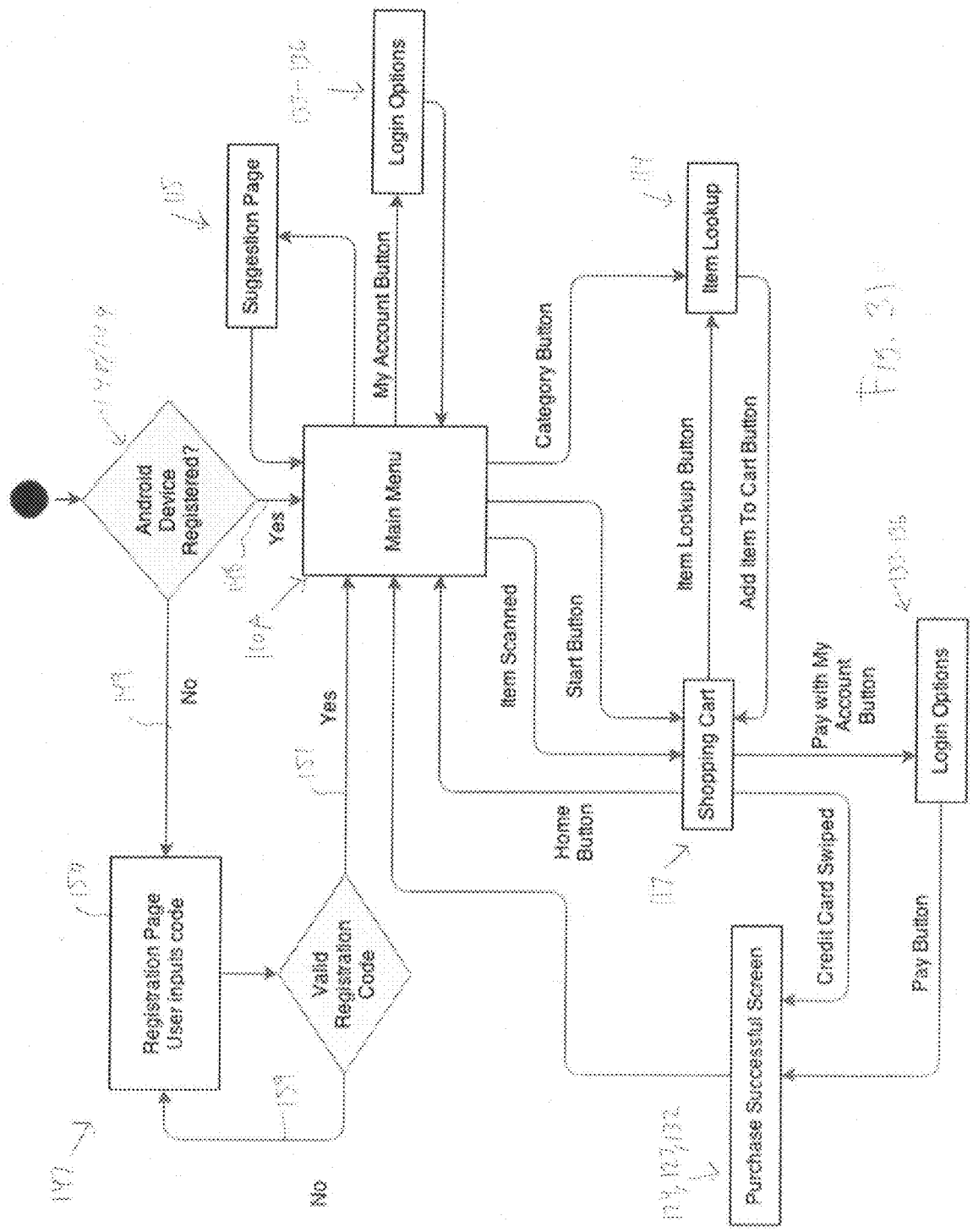
FIG. 31 is a logic flow diagram of the kiosk.

The means and method of users 54 to shop and access the system 50 for other purposes via kiosk access 51 is further shown in FIGS. 28-31 which show kiosk access features of the system 50. Referring first to the use case diagram of FIG. 28, the user 54 can checkout to purchase items 96, view purchase history 97, change their account password 98, add a scan tag 99, make a credit card deposit to their account 100, change their email contact information 101 and suggest 102 items or the like to be added, deleted or changed to the market. Referring to the activity and logic diagrams of FIGS. 29 and 31, a user 54 approaches the kiosk 51 and is presented with a home screen 110A including a start button option 110B. Clicking start provides preferably five option: scan item 111, create account 112, log in to existing account 113, look up item 114 (configurable) and make suggestion 115. Upon scanning an item 111, if the item exists 116, the user can view their shopping cart 117. If the item being scanned does not exist in the database, the user has the option to rescan 111. Upon filling the user's virtual shopping cart of items, the user may checkout 118 by paying with cash, credit card or the user's system account (market account). If create account 112 is selected, the account is validated 120, an overview is presented 121, and the account is finalized 122, whereupon deposits may be made, credit card information added, email added, password added, purchase history viewed, and scan tags added. If log in to existing account 113 is selected, validation is checked 123, the overview presented 121, and finalization 122 in the same way as for new accounts. Referring also to the use case diagram of FIG. 30, for item scanning, if a credit card is used 124, the card is processed and the transaction completed. If cash 123 is used, the system inquires whether cash change is enabled 126. If so, an cash change which may be due is dispensed and the transaction finalized 127. If cash dispense is not enabled, the system checks whether the user is logged in 128. If the user is not logged in, the use is prompted for an email 129 and a match to the account email results in a deposit to the user's account. If yes, change is deposited in directly in the account 130. For payment by account 125, the system checks for log in 131 and if affirmative, payment via account is finalized 132. If not logged in, the system permits log in via a predetermined quick PIN code 133. For log-in 113 prior to scanning, the user may choose item scanning 111 or options of logging in via quick PIN 133, email or user name 134, credit card 135 or create account 136. Upon selection of one of these options, the system checks for log in success and returns to log in home if not. If successful, the system checks to see if a transaction is pending 138. If so, market account payment is finalized 132. If not pending, an account overview 139 is provided. If an item is scanned, the system routes to scan item home 111. If no item is scanned, the following options are made available to the user 54: make deposit to account 140, add credit card 141, change email 142, change password 143, display purchase history 144, add scan tag 145, and an optional site administrator log in 146. As is shown in FIG. 31, a mobile device such as an android mobile device may be registered 147 for use using the kiosk. An account barcode 149/149 is presented by the mobile device and scanned at the kiosk. If it is registered already 148, the main menu 110A is presented. If not registered, a registration page 150 is presented, at which the user can input a code for registration. If the code is valid 151, the home page 110A is presented. If not 159, the registration page 150 is presented once again. Examples of user interface screens for select kiosk elements and steps are shown in FIGS. 9-24.

Figure 32:
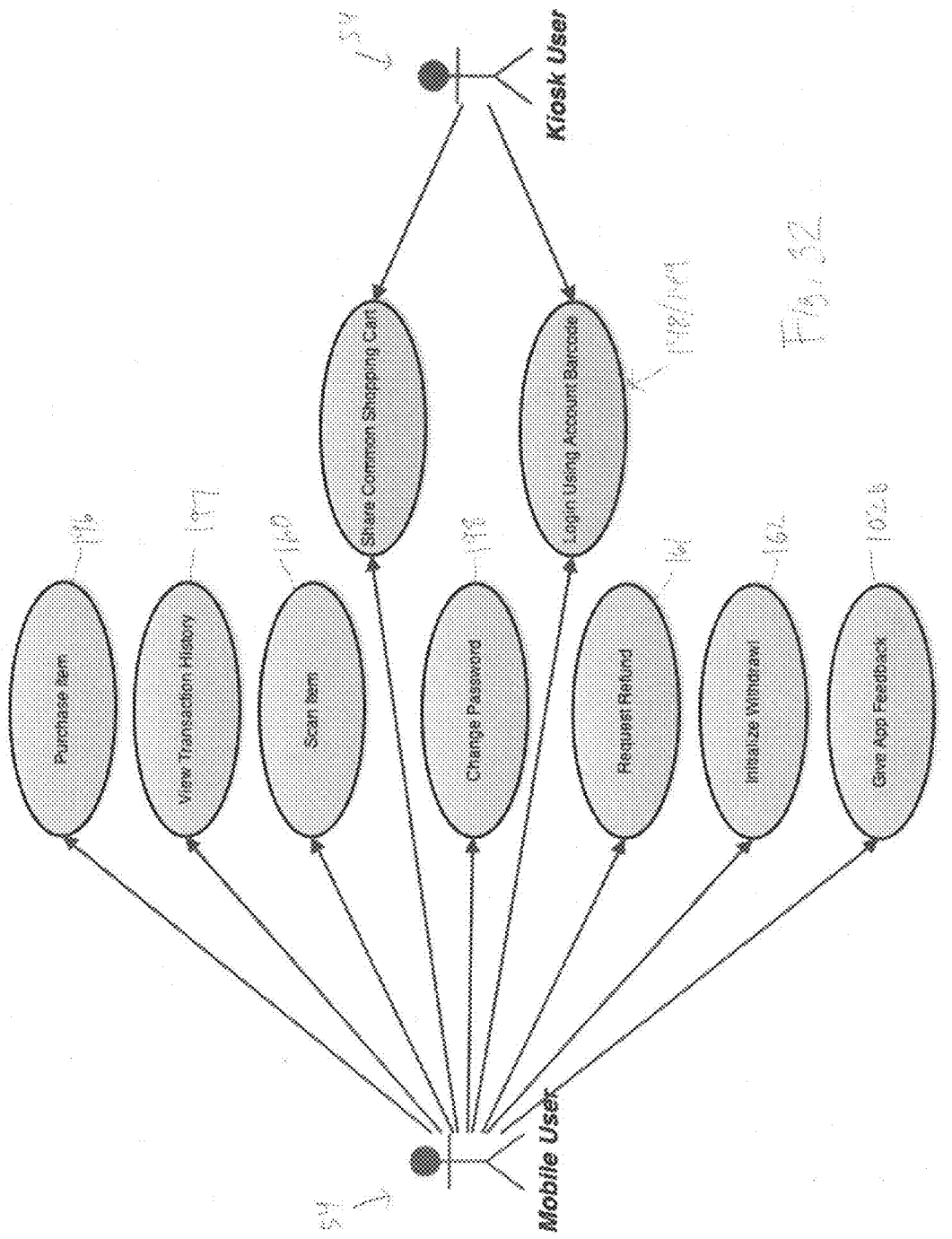
FIG. 32 is a use case diagram of an embodiment of the mobile device app shopping tool of the system.
Figure 33:
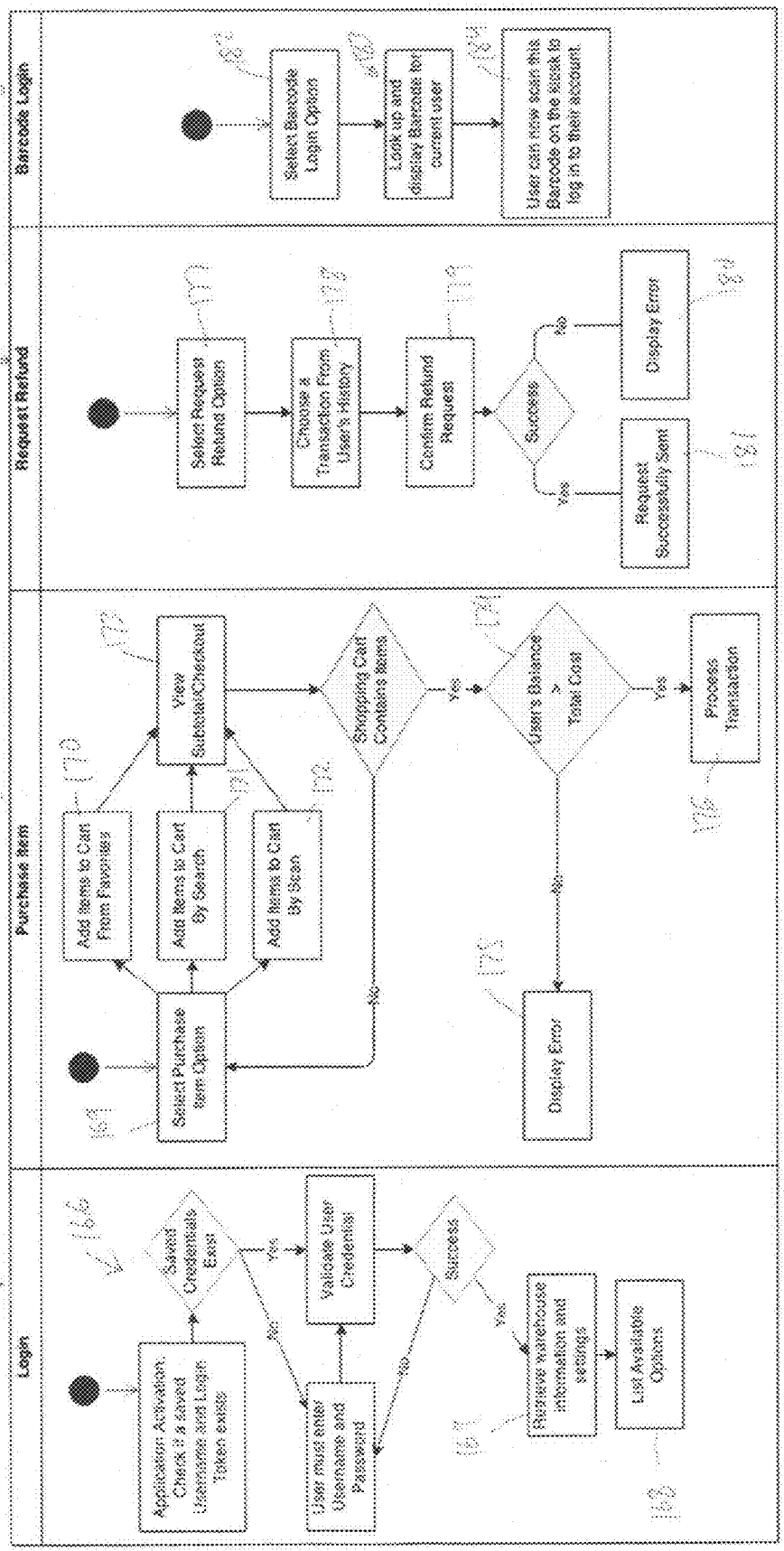
FIG. 33 is an activity diagram of the mobile device app.

The means and method of users 54 to shop and access the system 50 for other purposes via mobile device app access 52 is further shown in FIGS. 32 and 33 which show mobile app access features of the system 50. Referring first to the use case diagram of FIG. 32, the user 54 can checkout to purchase items 196, view purchase history 197, change their account password 98, suggest 102B items or the like to be added, deleted or changed to the market, scan items 160, request a refund 161 and initialize a withdrawal 162. Referring to the activity diagram of FIG. 33, for a user 54 to login 165, the system determines whether a user name and password input are valid 166. If not valid, re entry is required. If valid, warehouse information and settings are retrieved 169 and available options are listed 168. For purchasing 169, purchase item option is selected 169 by the user whereupon items may be added to a cart from favorites 170, by search 171 and by scan 172. A subtotal can be viewed or checkout may occur thereafter 173. If the shopping cart does not contain items, the user is routed bay to select purchase item 169. If the shopping cart contains item 174 the user's account balance is compared to determine whether it is greater than the total cost of the shopping cart. If not, then an error is displayed 175. Of sufficient funds exist in the account to cover the purchase, the transaction is processed 176. For requesting a refund 161, the option is selected 177, a transaction is chosen from a history list. 178, and a refund request is confirmed 179. If not confirmed, and error is displayed 180, and if confirmed the request is sent 181. For bar code login 148/149, the option is selected 182, the bar code is looked up and displayed 183, and user then holds the bar code displayed on their mobile device for scanning by the kiosk 189, whereupon they are logged in to their account.

Figure 158:
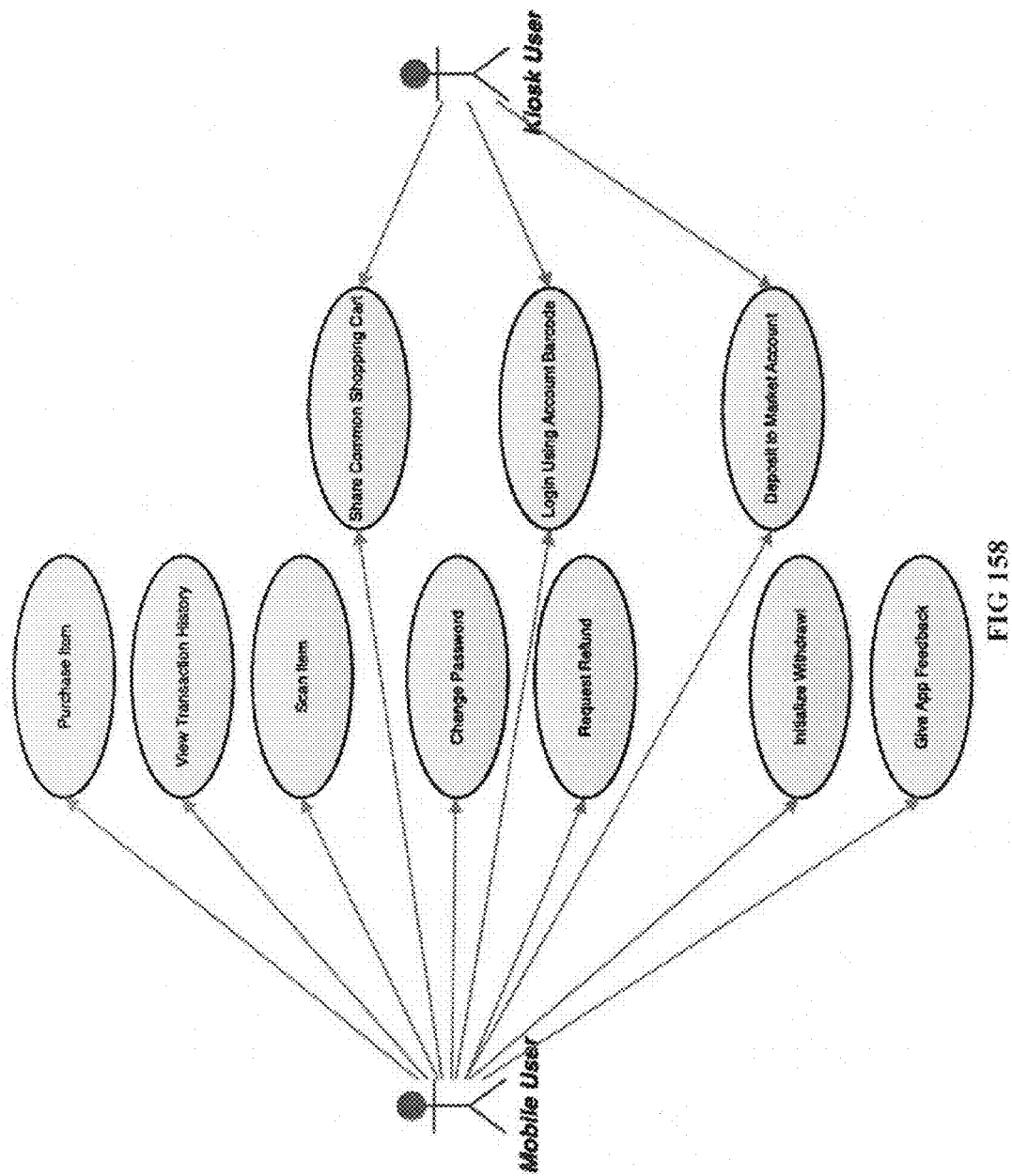
FIG. 158 is an alternative embodiment of use case diagram relative to the embodiment of FIG. 32 for users using either a mobile device or a kiosk, including a deposit to account feature.
Figure 159:
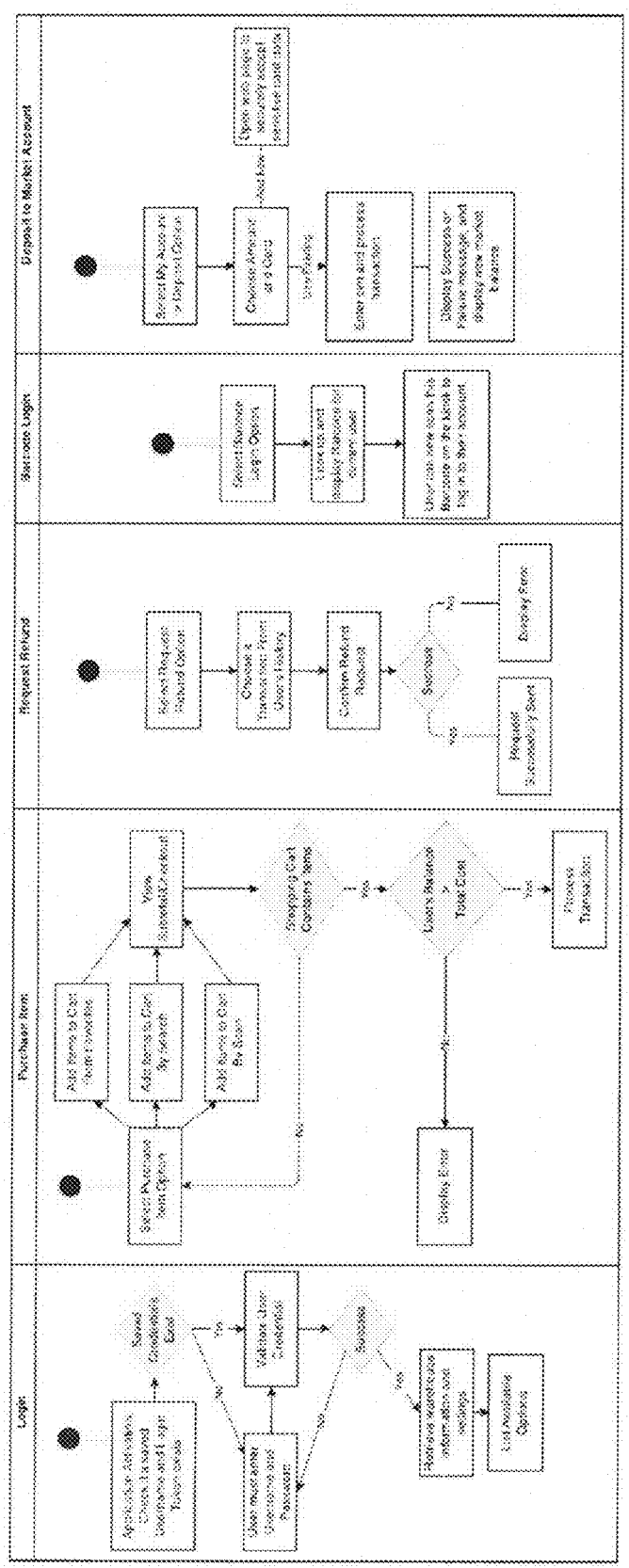
FIG. 159 is an alternative embodiment of a mobile application activity diagram relative to the embodiment of FIG. 33, including a deposit to account process steps.
Figures 160, 161:
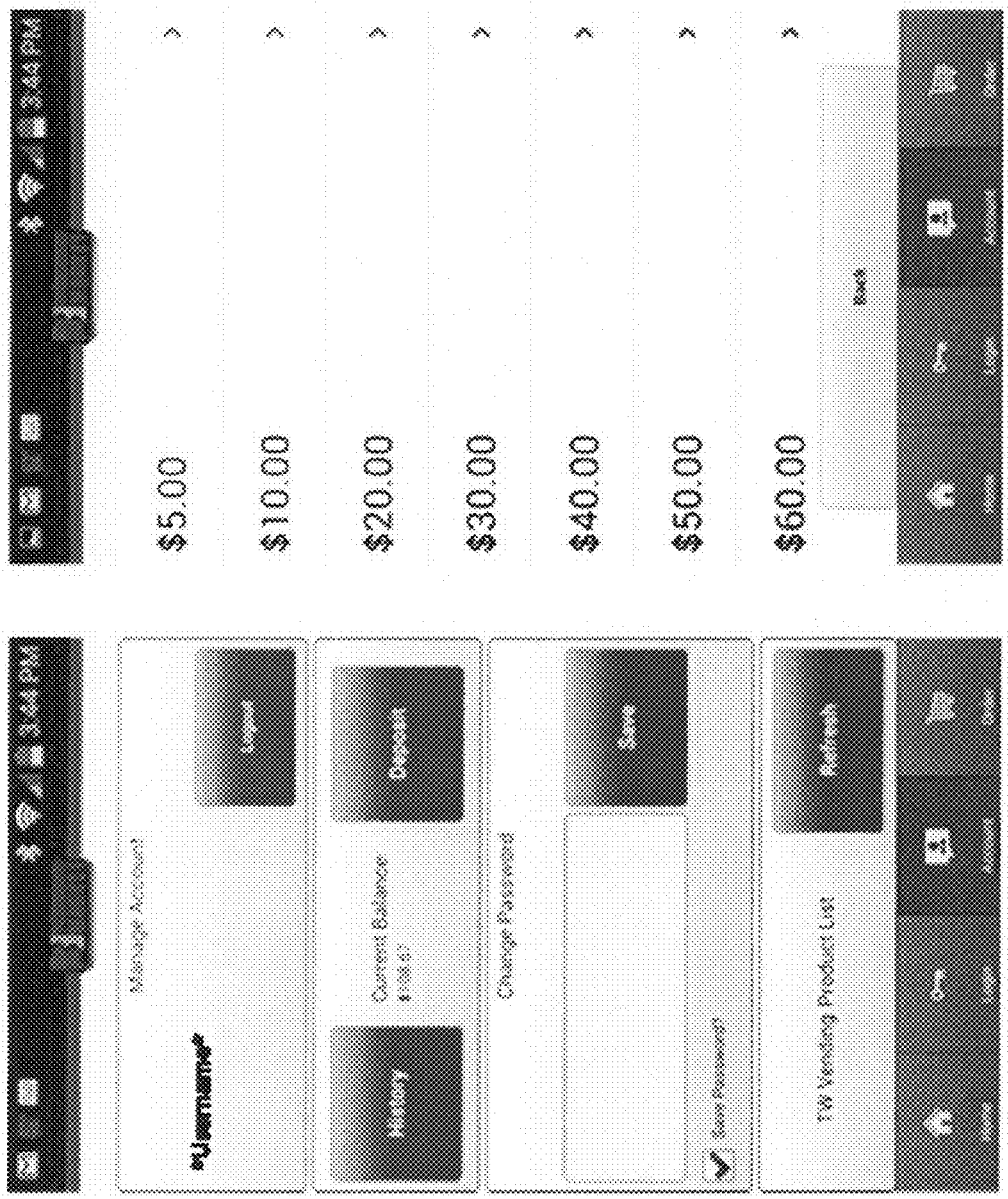
FIG. 160 shows an embodiment of an alternative embodiment of mobile app Account Screen, relative to the screen shown in FIG. 90, including a deposit funds key.
FIG. 161 shows an embodiment of a deposit selection screen following the screen of FIG. 160, including several predetermined deposit amounts.
Figure 163:
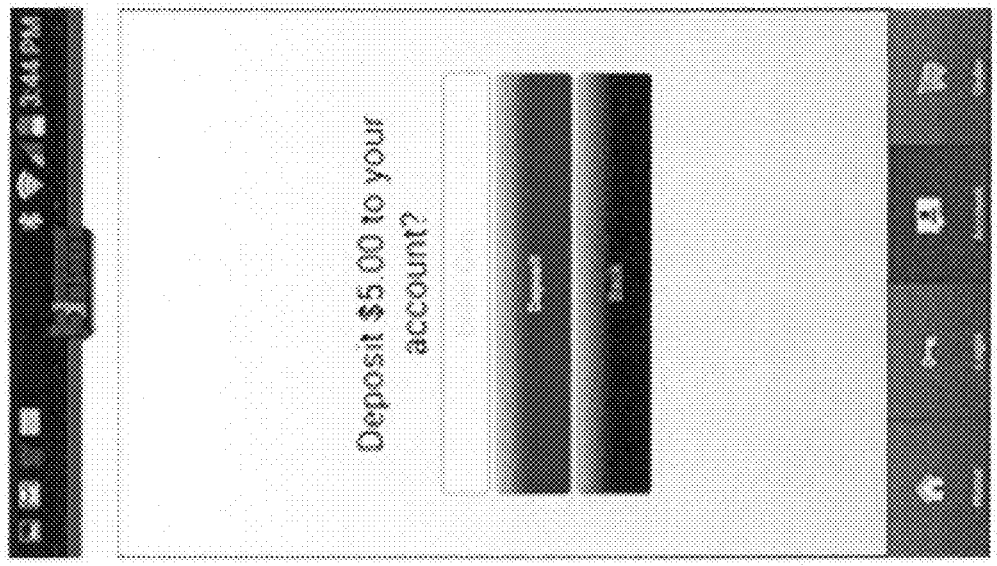
FIG. 163 shows an embodiment of a deposit finalization screen following the screen of FIG. 162.
Figure 162:
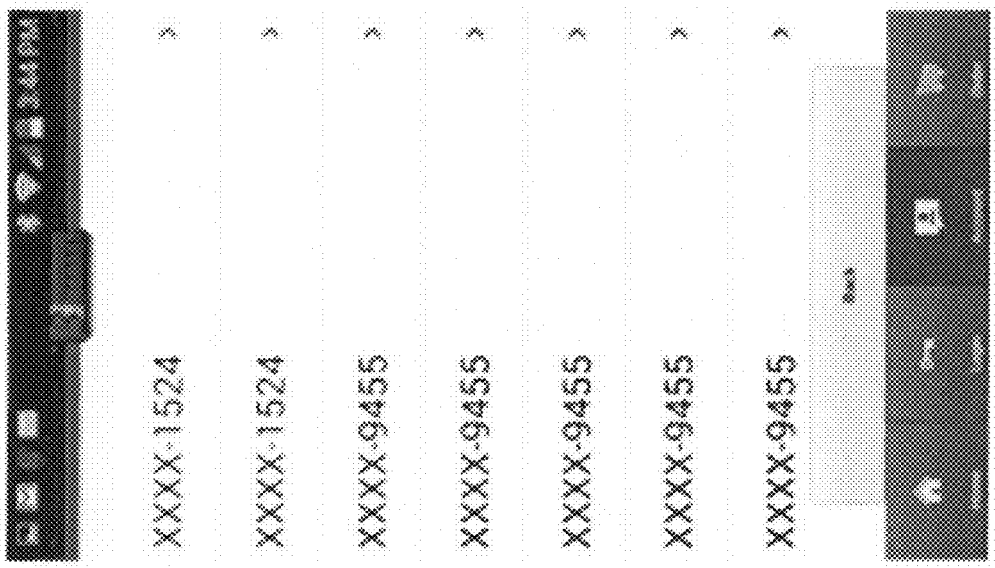
Figure 164:
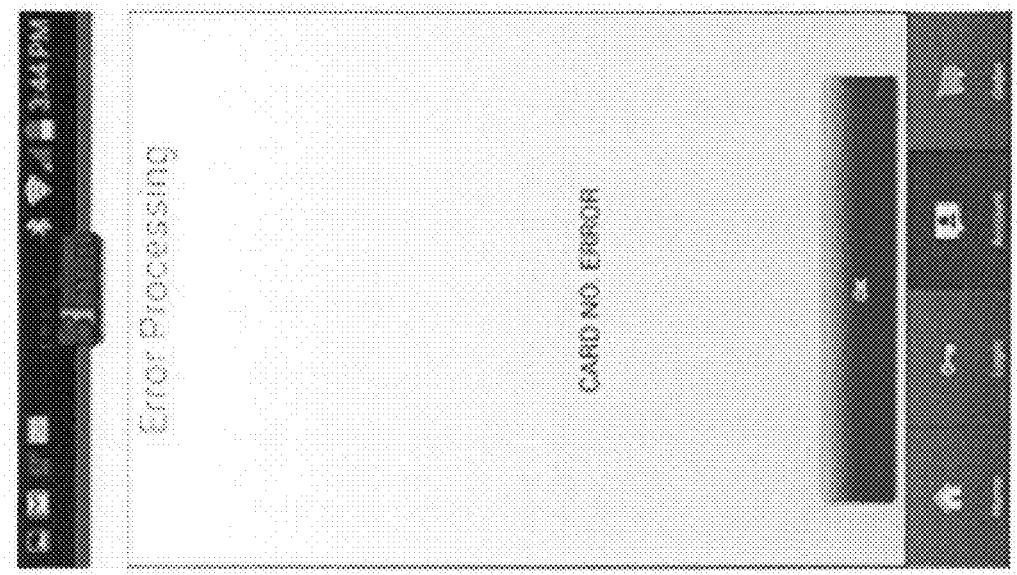
FIG. 164 shows an embodiment of a deposit confirmation or receipt screen following the screen of FIG. 163.

FIGS. 158 and 159 show an alternative of the system including an additional feature whereby the user can deposit funds to his or her account via a mobile device or the kiosk. FIGS. 160-164 show embodiments of screens implementing the deposit to account feature on a mobile device.

Figure 34:
FIG. 34 shows an embodiment of a user interface home screen for managing a user account by a user/customer or for monitoring the market by a market administrator.

FIG. 34 shows an embodiment of a user interface home screen for managing a user account by a user/customer or for monitoring the market by a market administrator.

Figure 35:
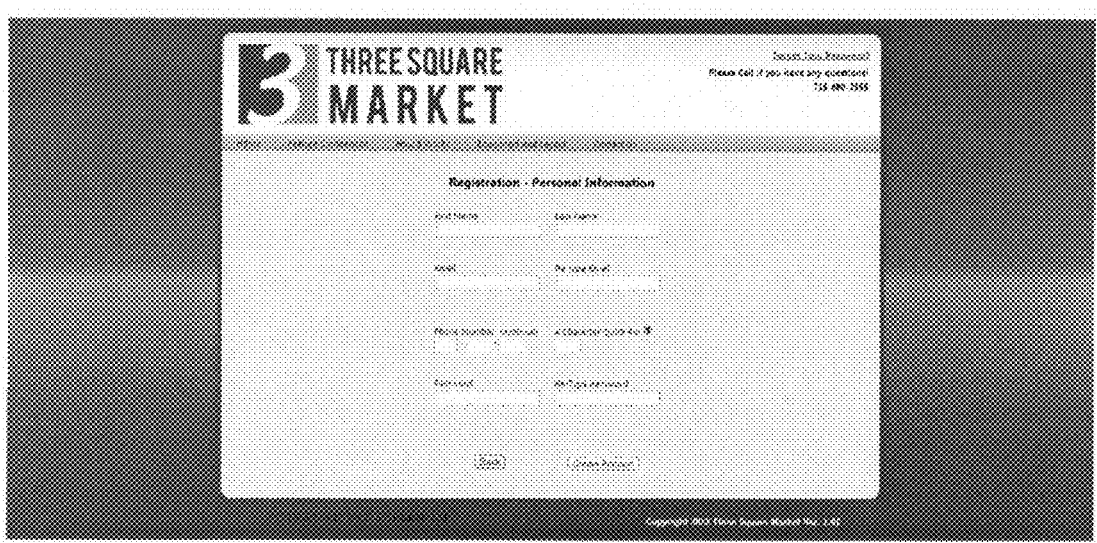
FIG. 35 shows an embodiment of an account registration user interface therefor.

FIG. 35 shows an embodiment of an account registration user interface therefor.

Figure 36:
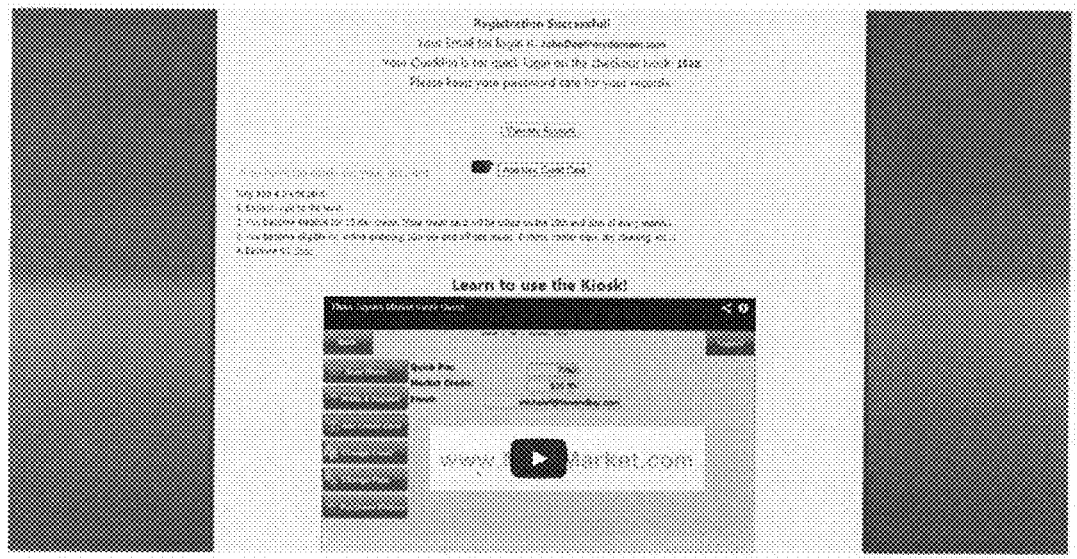
FIG. 36 shows an embodiment of a user interface for confirming registration of an account and for viewing the account and adding other information such as a link to a credit card.

FIG. 36 shows an embodiment of a user interface for confirming registration of an account and for viewing the account and adding other information such as a link to a credit card.

Figure 38:
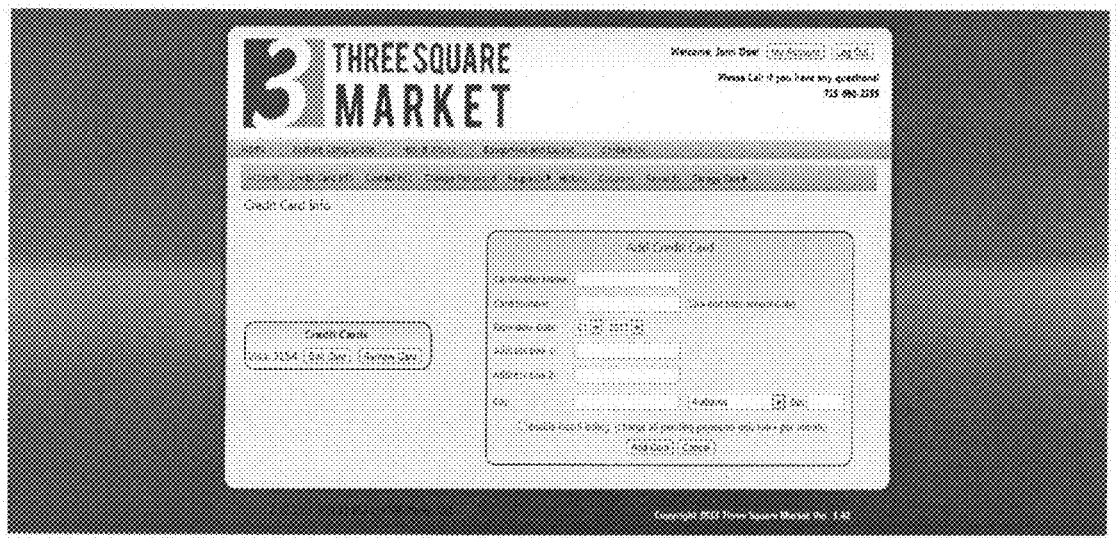
FIG. 38 shows an Account—Credit Card Information screen therefor.
Figure 39:
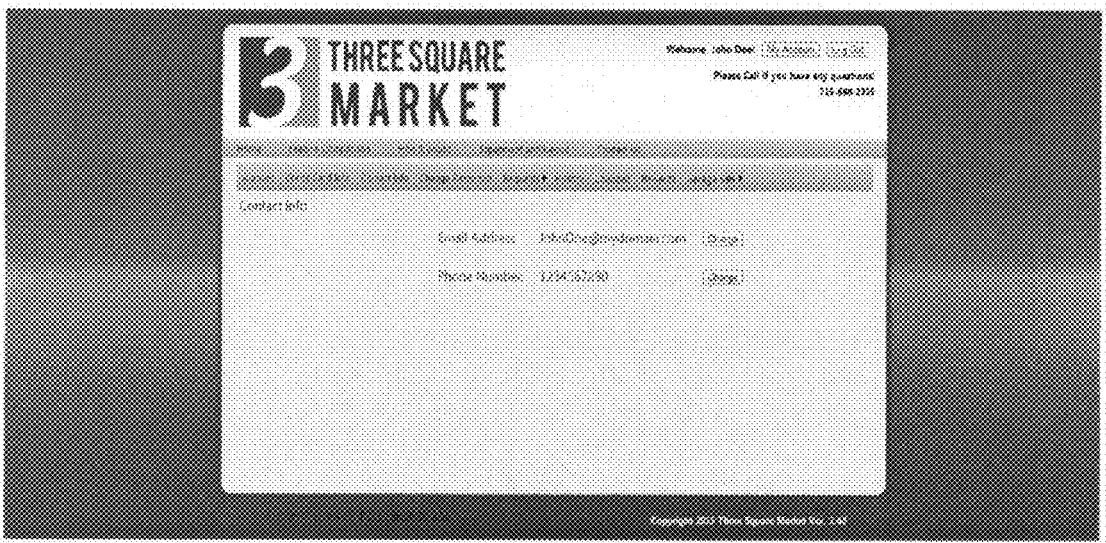
FIG. 39 shows an Account—Contact Information screen therefor.
Figure 40:
FIG. 40 shows an Account—Change Password screen therefor.
Figure 41:
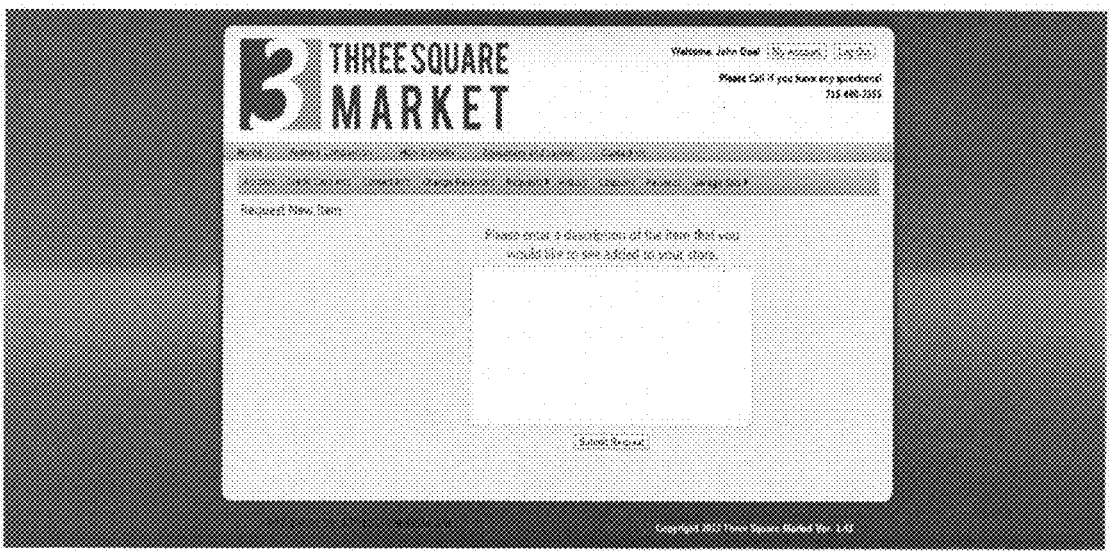
FIG. 41 shows a Request—New Item screen therefor.
Figure 42:
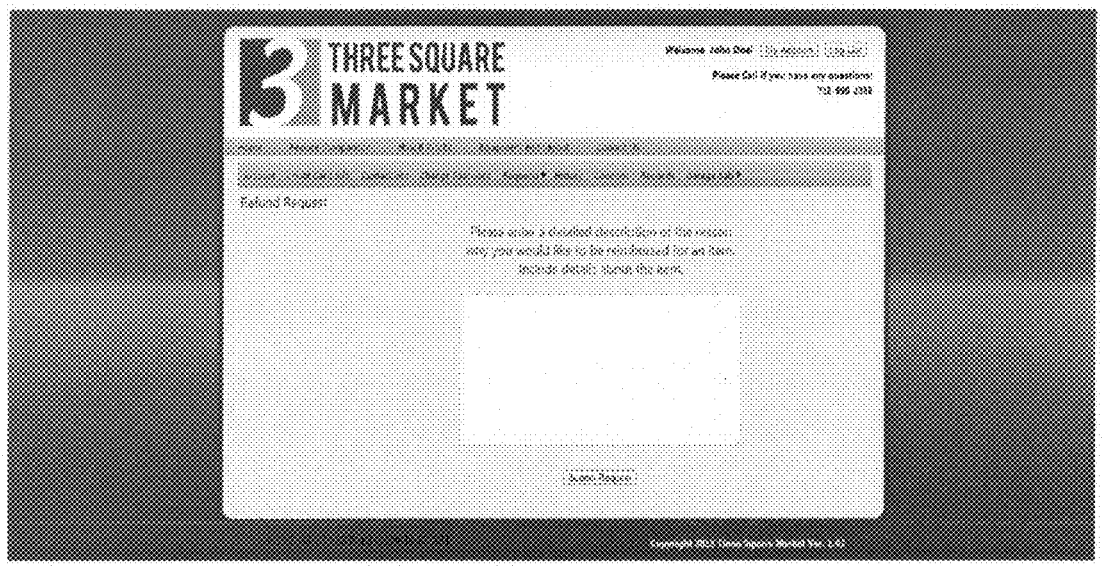
FIG. 42 shows a Request—Refund screen therefor.

FIGS. 37-41 show account management tools whereby the user of a market can create and manage an account, purchase items, and perform other tasks. FIG. 34 shows an embodiment of an Account—Home/Account screen or user interface for use by a market user/customer, the screen or page including links to Credit Card Info, Contact Info, Change Password, Requests, History, Coupons, Rewards and Garage Sale screens or pages. FIG. 38 shows an Account—Credit Card Information screen therefor. FIG. 39 shows an Account—Contact Information screen therefor. FIG. 40 shows an Account—Change Password screen therefor. FIG. 41 shows a Request—New Item screen therefor. FIG. 42 shows a Request—Refund screen therefor.

Figure 43:
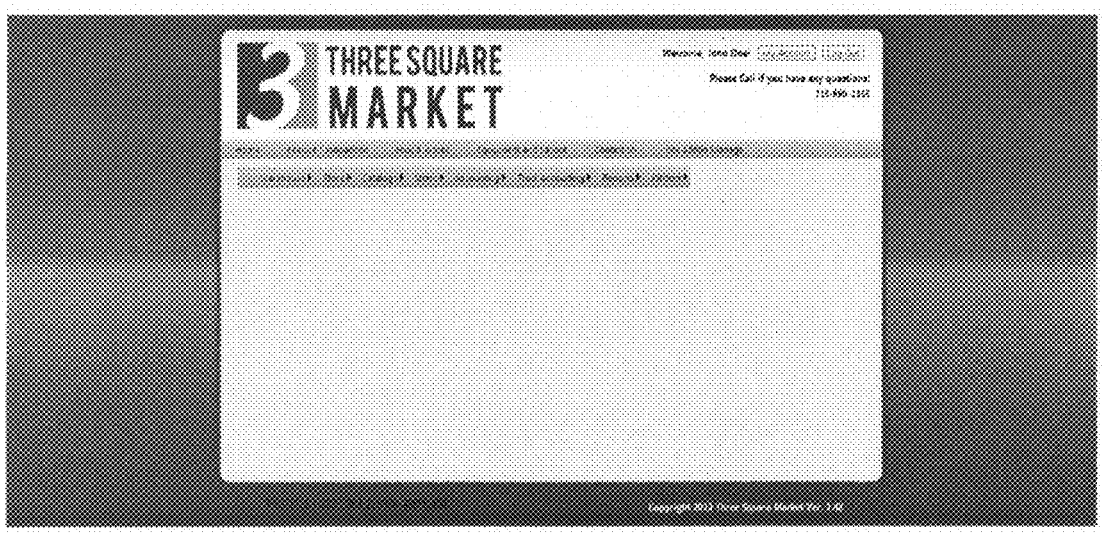
FIG. 43 shows an embodiment of an Administrative Management Home screen for managing a market site for use by a market/sit administrator, the screen including links to Warehouse, Store, Catalogs, User, Accounting, Trust Accounting, Reports and Kitchen pages or groups.

FIG. 43 shows an embodiment of an Administrative Management Home screen for managing a market site for use by a market/sit administrator ("vendor"), the screen including links to Warehouse, Store, Catalogs, User, Accounting, Trust Accounting, Reports and Kitchen pages or groups. In the exemplary embodiment shown and described the Store is identified as "Demo".

Figure 44:
FIG. 44 shows an embodiment of a Warehouse—Manage Warehouse Items page.
Figure 45:
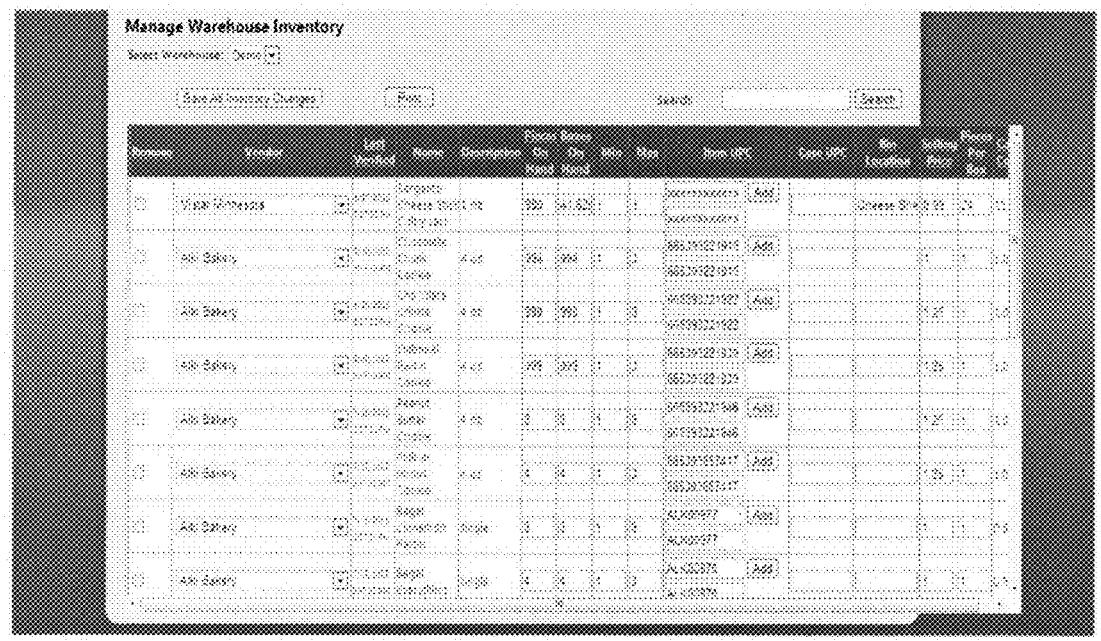
FIG. 45 shows an embodiment of a Warehouse—Manage Warehouse Inventory page.
Figures 46, 47:
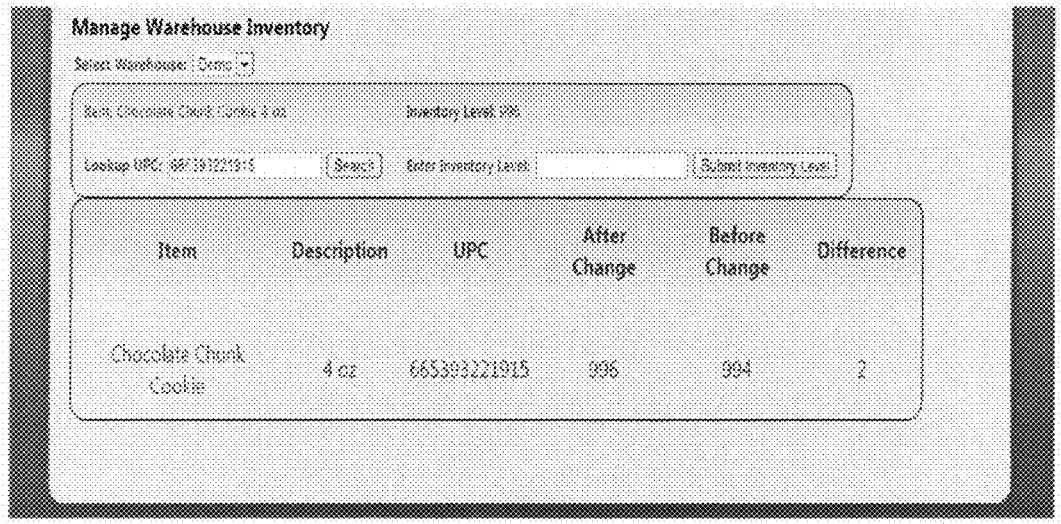
FIG. 46 shows an embodiment of an Item Look Up dialog box therefor.
FIG. 47 shows an embodiment of a Warehouse—Import Catalog Items to Warehouse page.

FIGS. 44-55 disclose the Warehouse management tools whereby a vendor can select a warehouse from which to order items for their store (in this case store "Demo") and administer warehouse functionality. FIG. 44 shows an embodiment of a Warehouse—Manage Warehouse Items page. FIG. 45 shows an embodiment of a Warehouse—Manage Warehouse Inventory page. FIG. 46 shows an embodiment of an Item Look Up dialog box therefor. FIG. 47 shows an embodiment of a Warehouse—Import Catalog Items to Warehouse page. FIG. 48 shows an embodiment of a Create/Edit Warehouse Categories dialog box therefor. FIG. 49 shows an embodiment of an Edit Item Categories for the Store "Demo" dialog box therefor. FIG. 50 shows an embodiment of a Warehouse—Create Warehouse Order page. FIG. 51 shows an embodiment of an Order Submitted Confirmation page therefor. FIG. 52 shows an embodiment of a Warehouse—View Warehouse Orders page. FIG. 53 shows an embodiment of a Warehouse—Receive Warehouse Order at Store "Demo" page. FIG. 54 shows an embodiment of a Catalog—Add Item To Test Catalog page. FIG. 55 shows an embodiment of a Scan To Add Items to Store page.

Figures 68, 69:
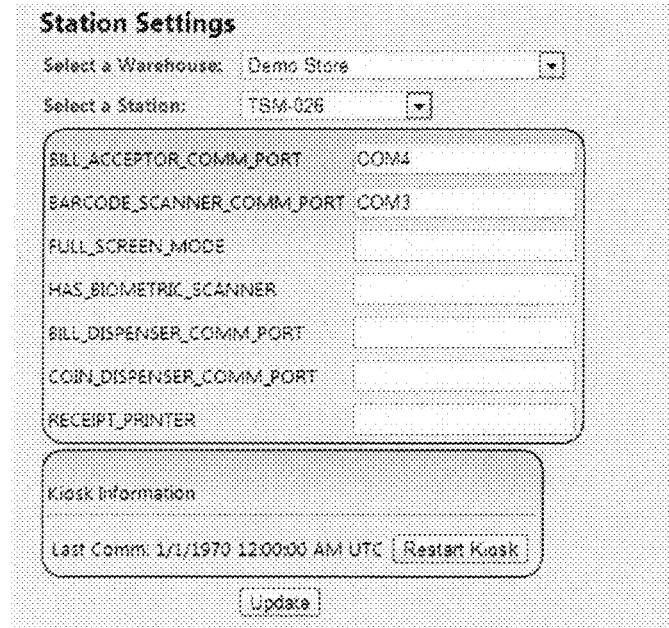
FIG. 68 shows an embodiment of a Store—Station (or Kiosk) Settings page.
FIG. 69 shows an embodiment of a User—User Management page.

FIGS. 56-68 show Store management tools for use by a vendor to manage their particular store. FIG. 56 shows an embodiment of a Store—Manage Store Items page. FIG. 57 shows an embodiment of a Store—Manage Store Inventory page. FIG. 58 shows an embodiment of a Store—Scan To Add Items to Demo Store page. FIG. 59 shows a Store—Verify Store Inventory page. FIG. 60 shows an embodiment of a Store—Import Items to Store page. FIG. 58 shows an embodiment of a Store—Create/Edit Store Categories page. FIG. 62 shows an embodiment of a Store—Edit Demo Store Item Categories page. FIG. 63 shows an embodiment of a Store—Create Store Order page. FIG. 61 shows an embodiment of a Store—Change Existing Order page/dialog box. FIG. 65 shows an embodiment of a Store—Receive Demo Store Order page. FIG. 66 shows an embodiment of a Store—View Store Item Information page. FIG. 67 shows an embodiment of a Store—Store Settings page. FIG. 68 shows an embodiment of a Store—Station (or Kiosk) Settings page.

FIG. 69 shows an embodiment of a User—User Management page.

Figures 70, 71:
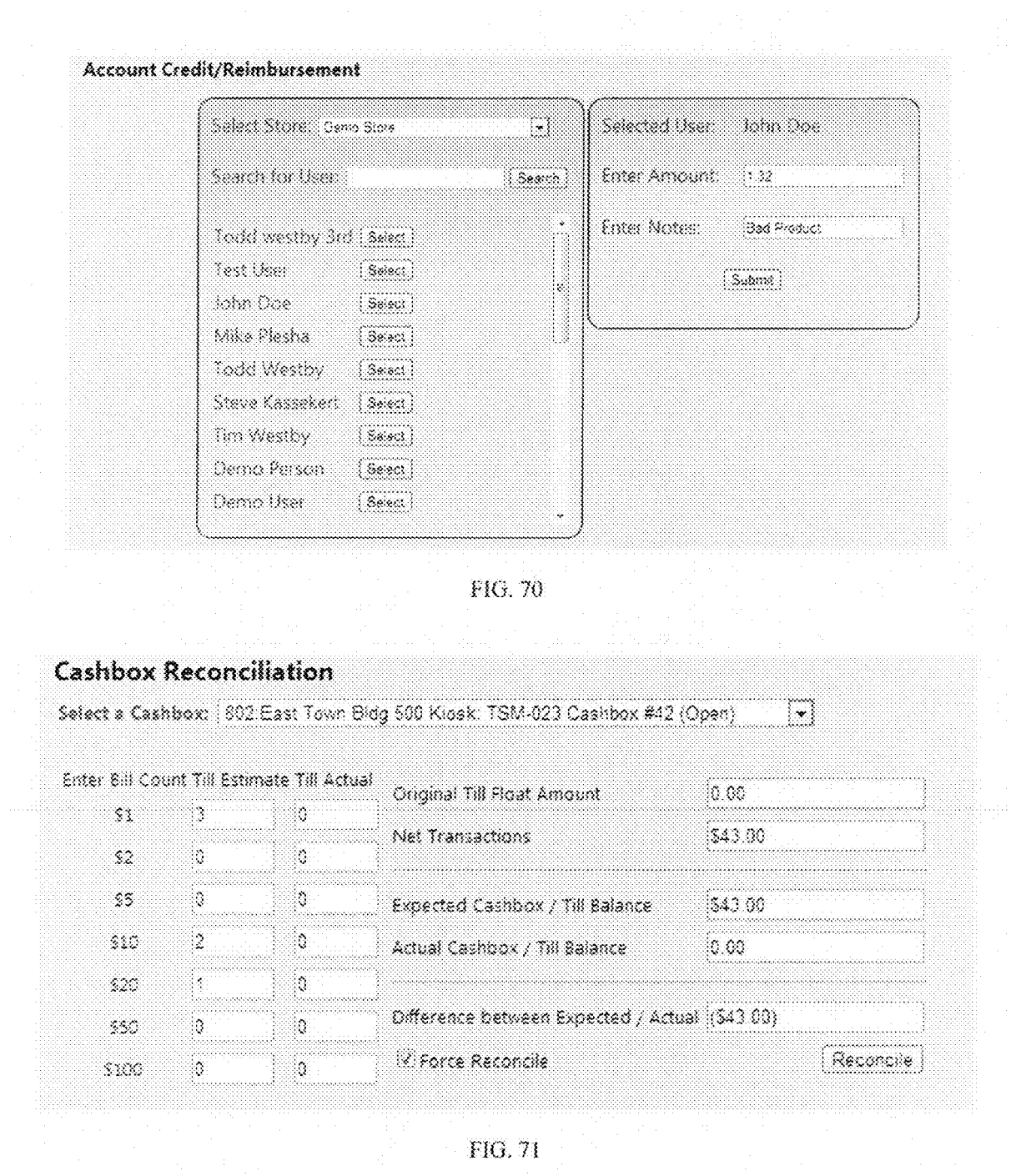
Figures 74, 75:
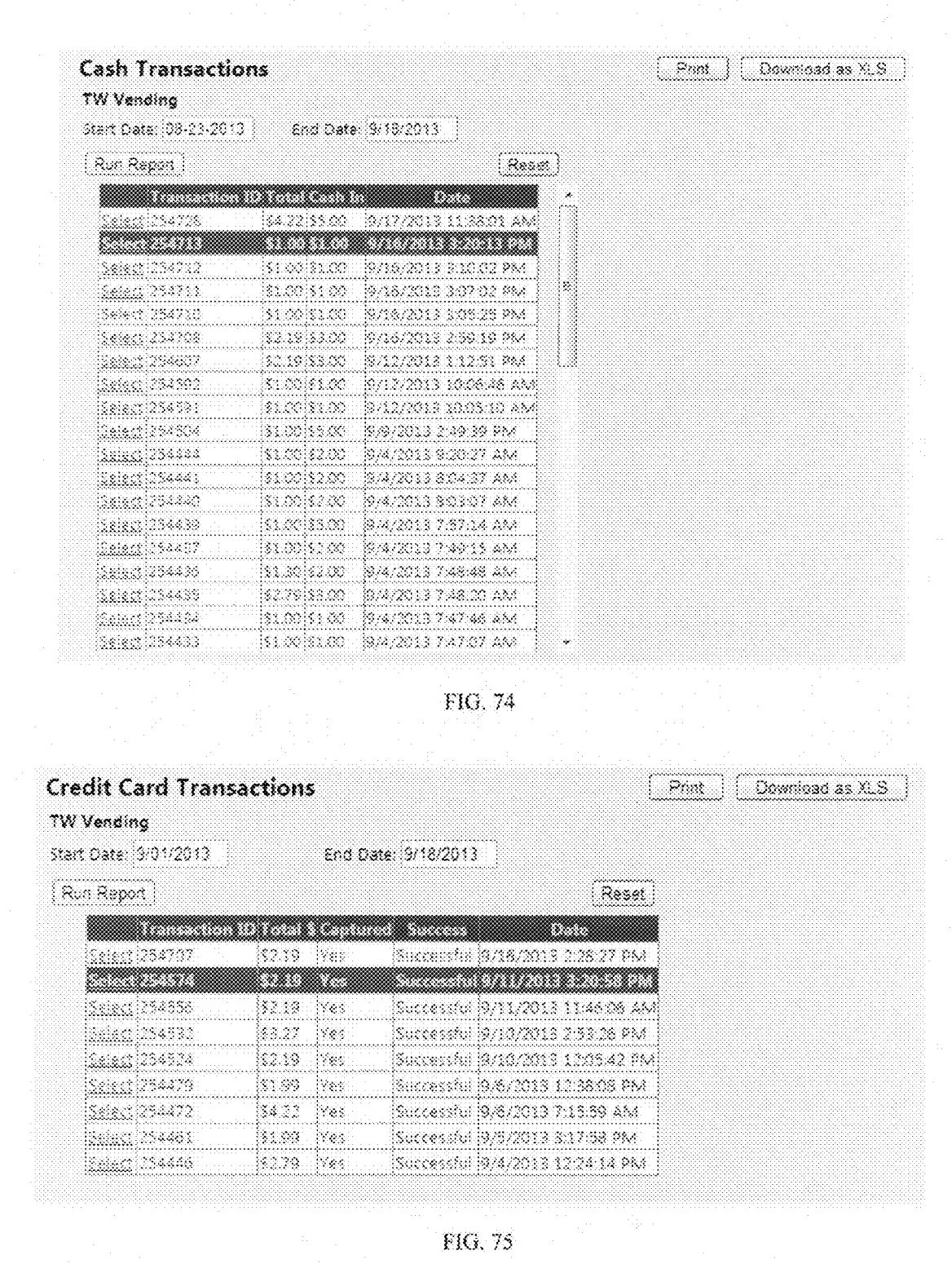

FIGS. 70-72 show Accounting functionality for the vendor/administrator. FIG. 70 shows an Accounting—Account Credit/Reimbursement page. FIG. 71 shows an Accounting—Cashbox Reconciliation page. FIG. 75 shows an embodiment of a Trust Accounting—Tax Collected page.

Figures 76, 77:
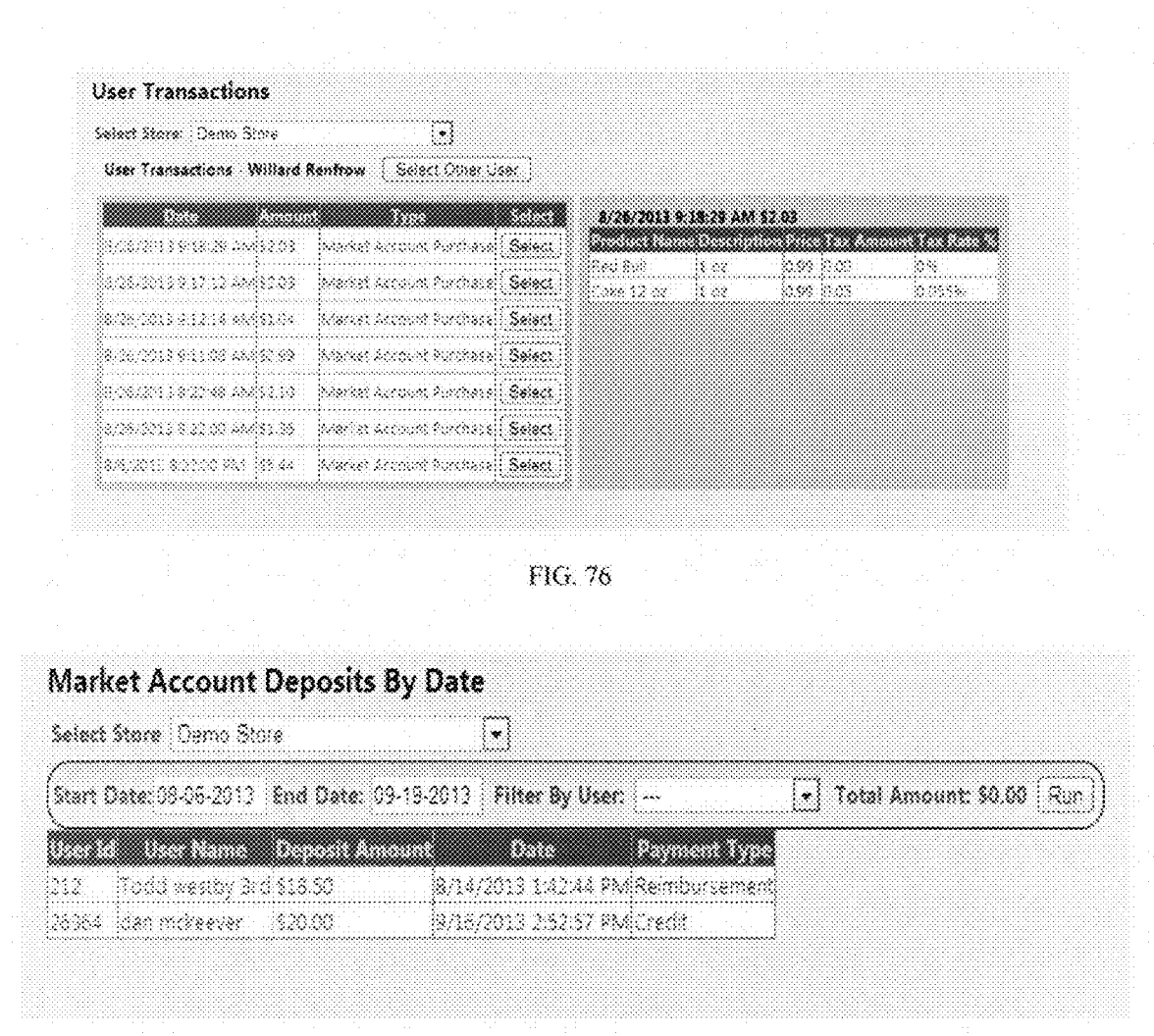
Figures 78, 79:
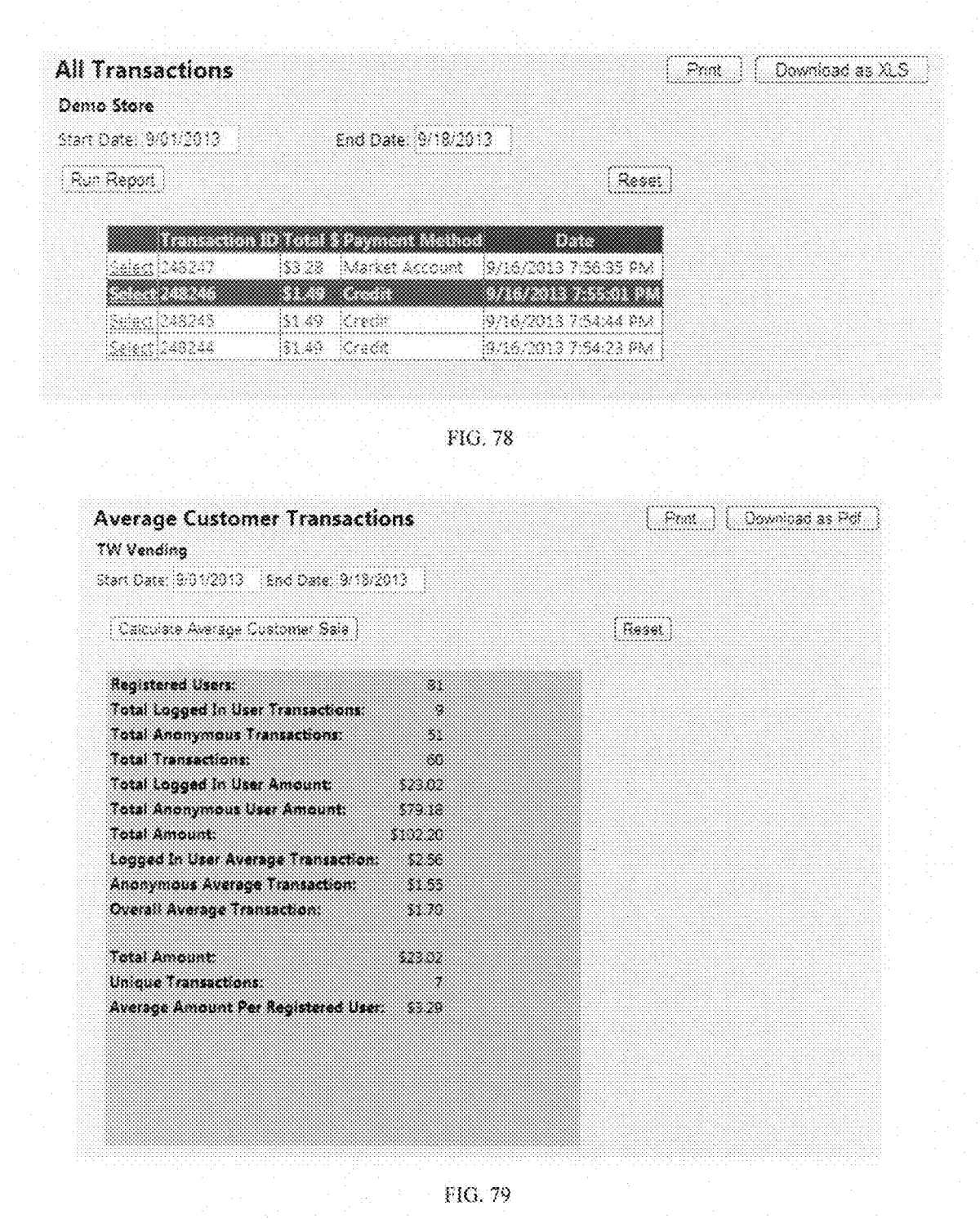
Figure 80:
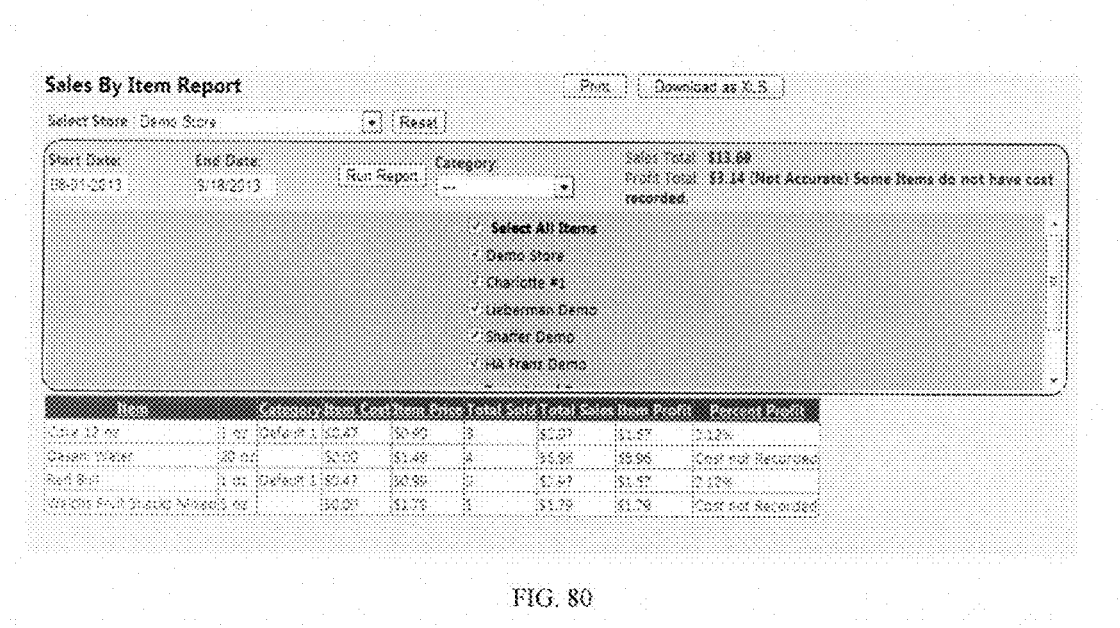

FIGS. 73-80 show various reports functions. FIG. 73 shows an embodiment of a Reports—Cashbox Reconciliation History page. FIG. 74 shows an embodiment of a Reports—Cash Transactions page. FIG. 75 shows an embodiment of a Reports—Credit Card Transactions page. FIG. 76 shows an embodiment of an Accounting—User Transactions page. FIG. 77 shows an embodiment of an Accounting—Market Account Deposits by Date page. FIG. 78 shows an embodiment of a Reports—All Transactions page. FIG. 79 shows an embodiment of a Reports—Average Customer Transactions page. FIG. 80 shows an embodiment of a Reports—Sales By Item page.

Figure 81:
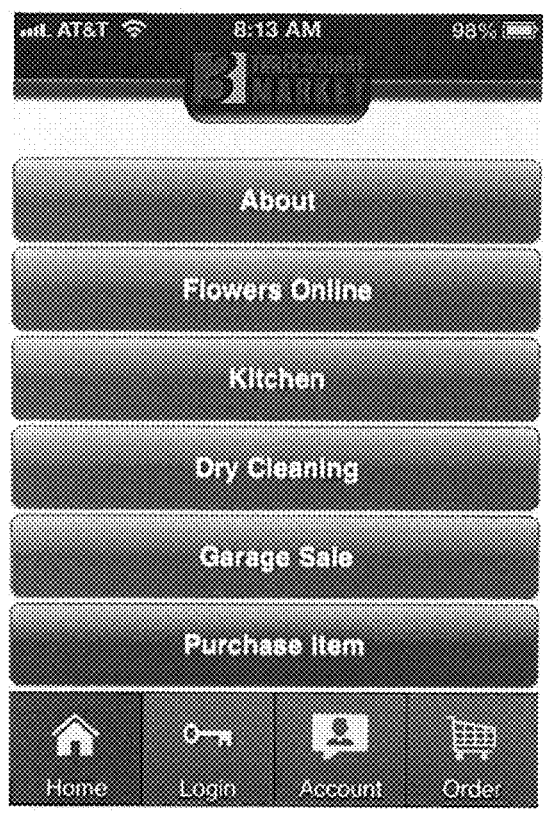
FIG. 81 shows an embodiment of a touch screen user interface for an Apple iPod4 of a Home Screen for the mobile app for use by customers of the market of the invention.
Figure 82:
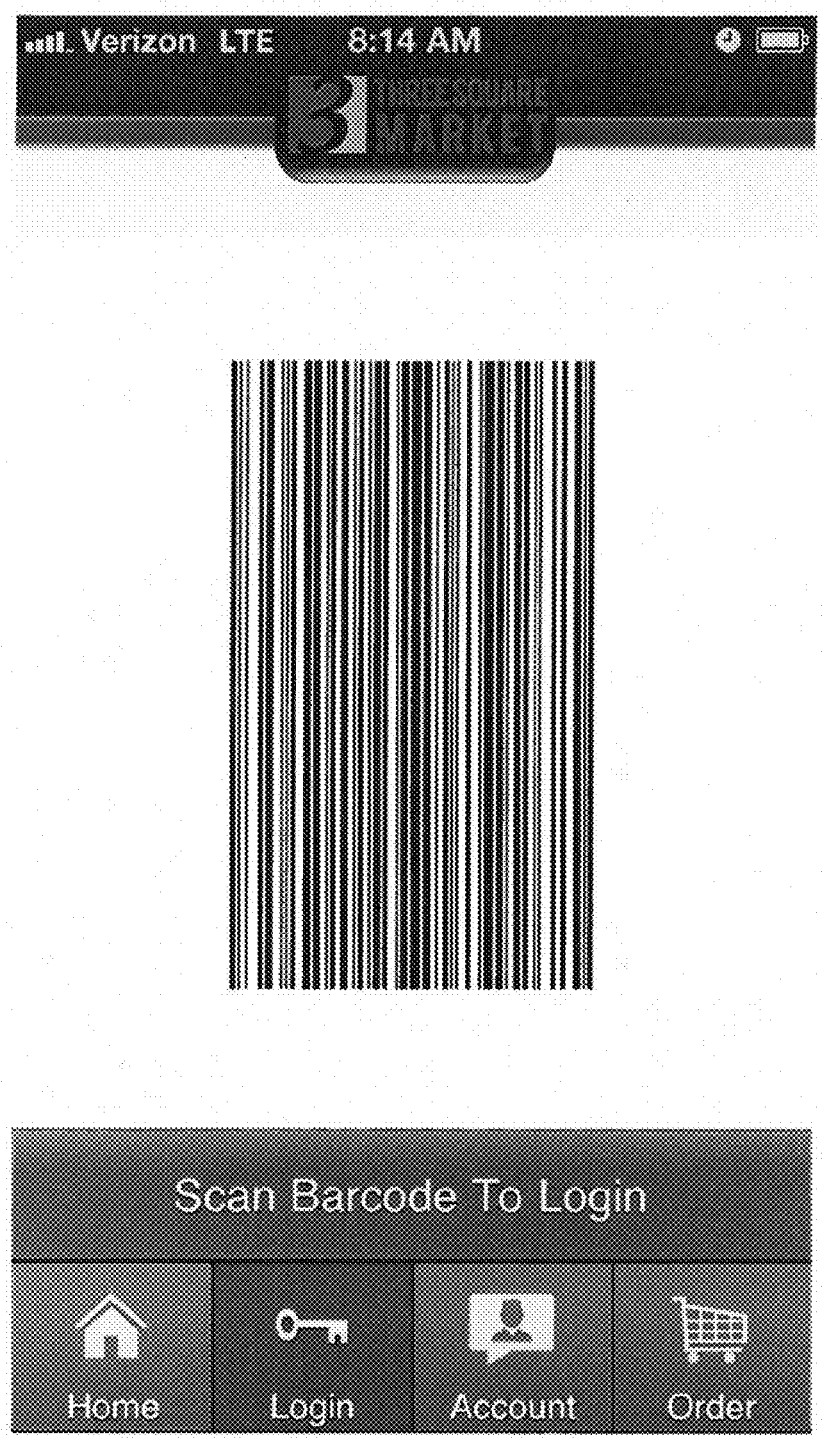
FIG. 82 shows an embodiment of a user interface for Purchase Item for Searching for items or Scanning items.
Figure 83:
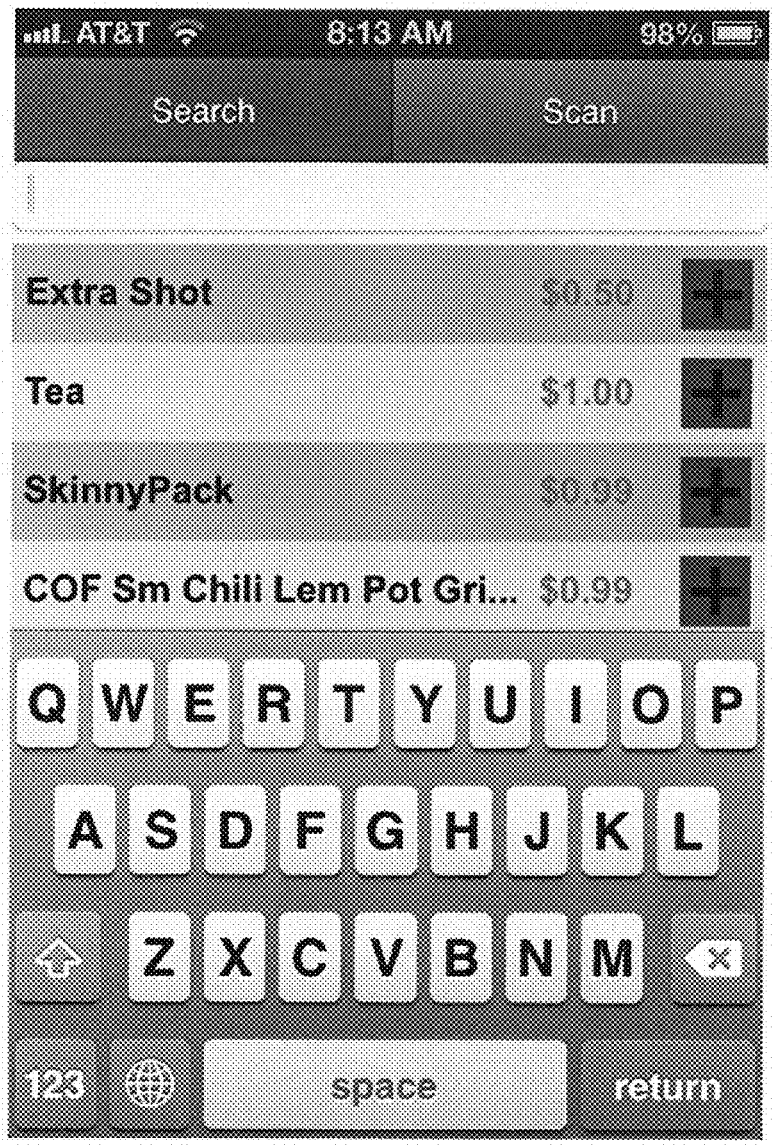
FIG. 83 shows an embodiment of an Add Item via Scan screen following the screen of FIG. x50.
Figure 84:
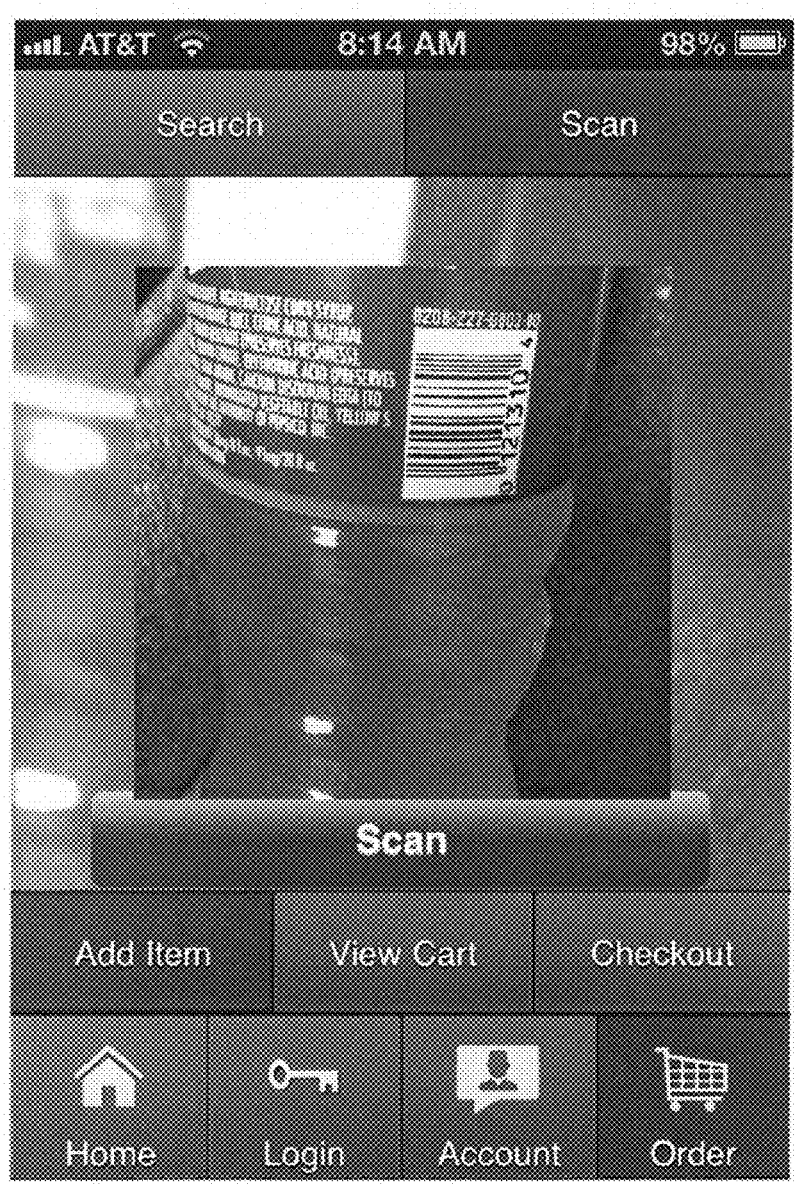
FIG. 84 shows an embodiment of a View Cart screen.
Figure 85:
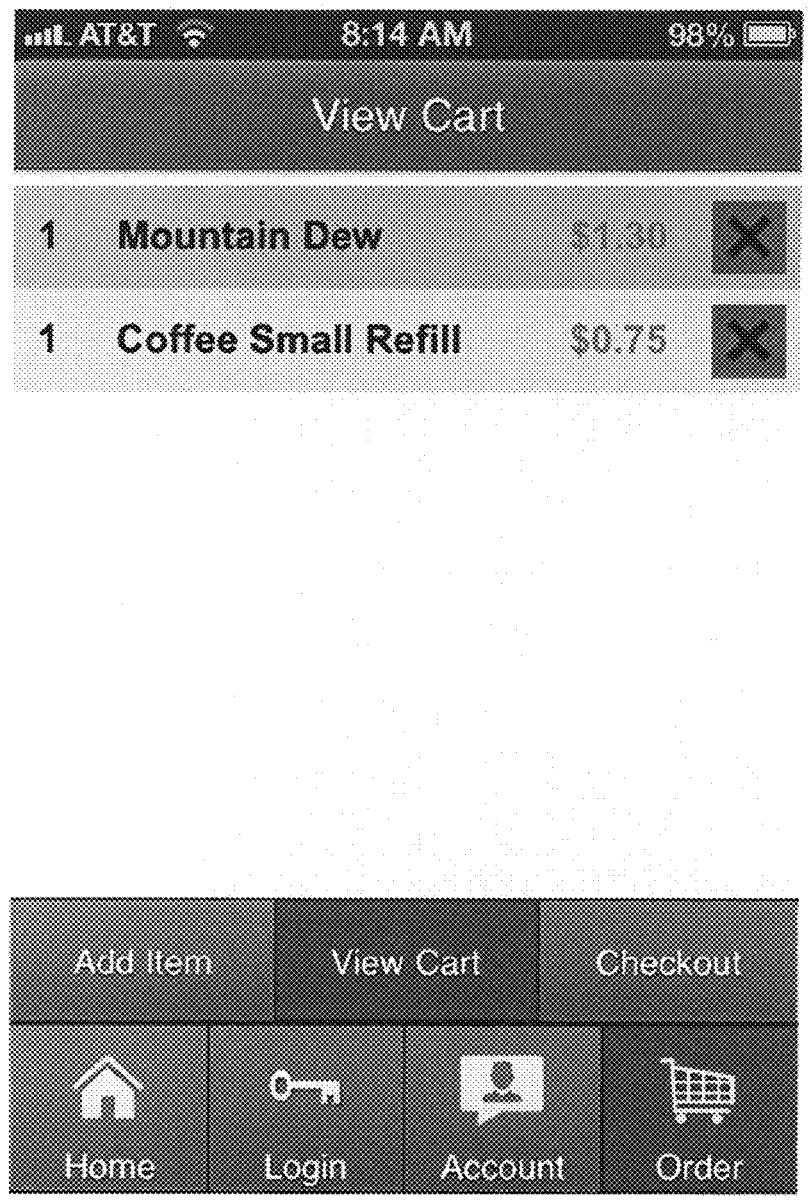
FIG. 85 shows an embodiment of an Initial Checkout screen.
Figure 86:
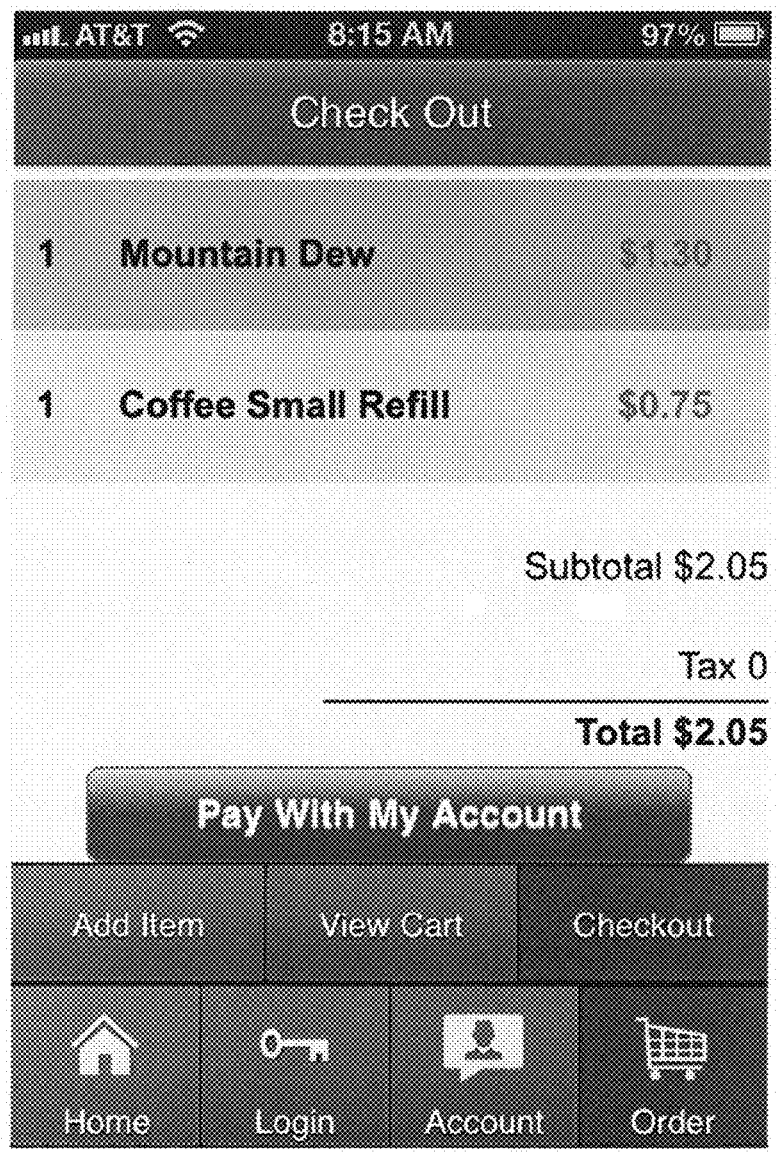
FIG. 86 shows an embodiment of a final, Confirm Checkout screen.
Figure 87:
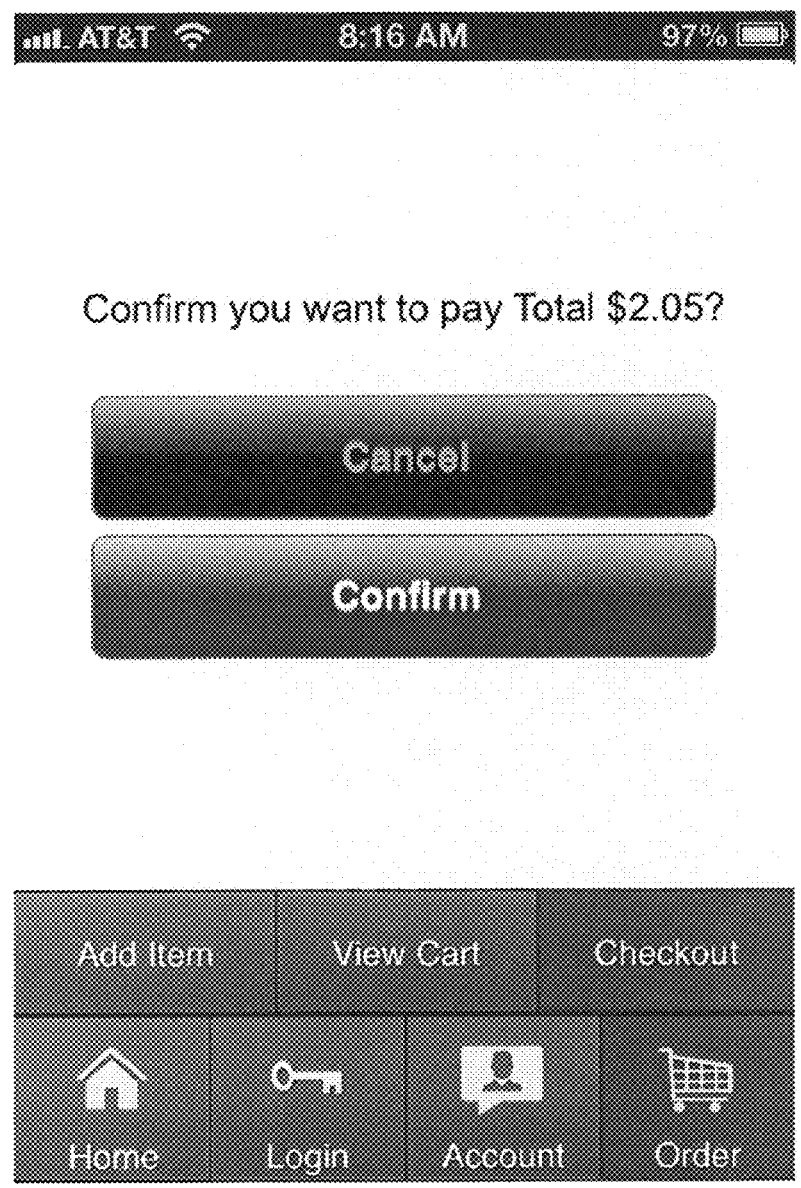
FIG. 87 shows an embodiment of a Final or Transaction Completed screen.
Figure 88:
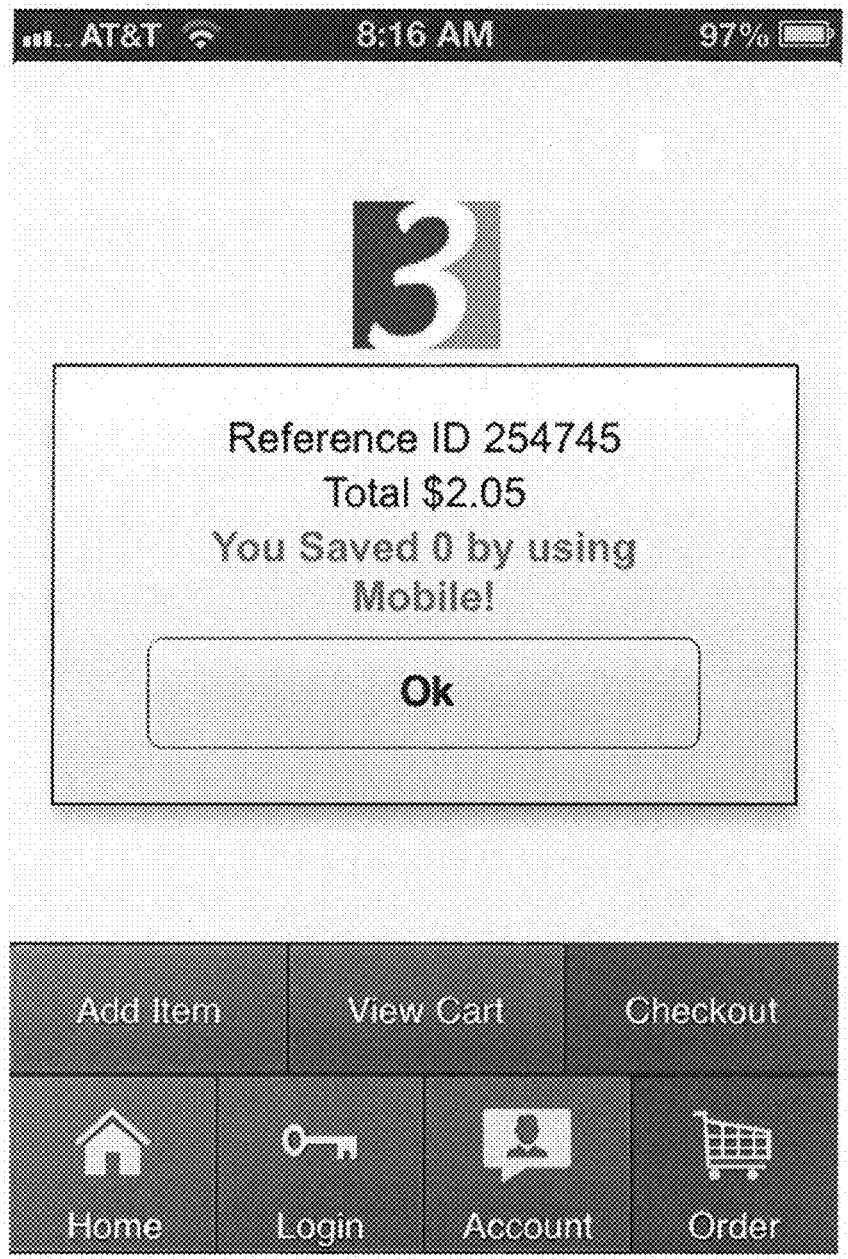
FIG. 88 shows an embodiment of Login screen via scan barcode.
Figure 89:
FIG. 89 shows an embodiment of an About information screen.
Figure 90:
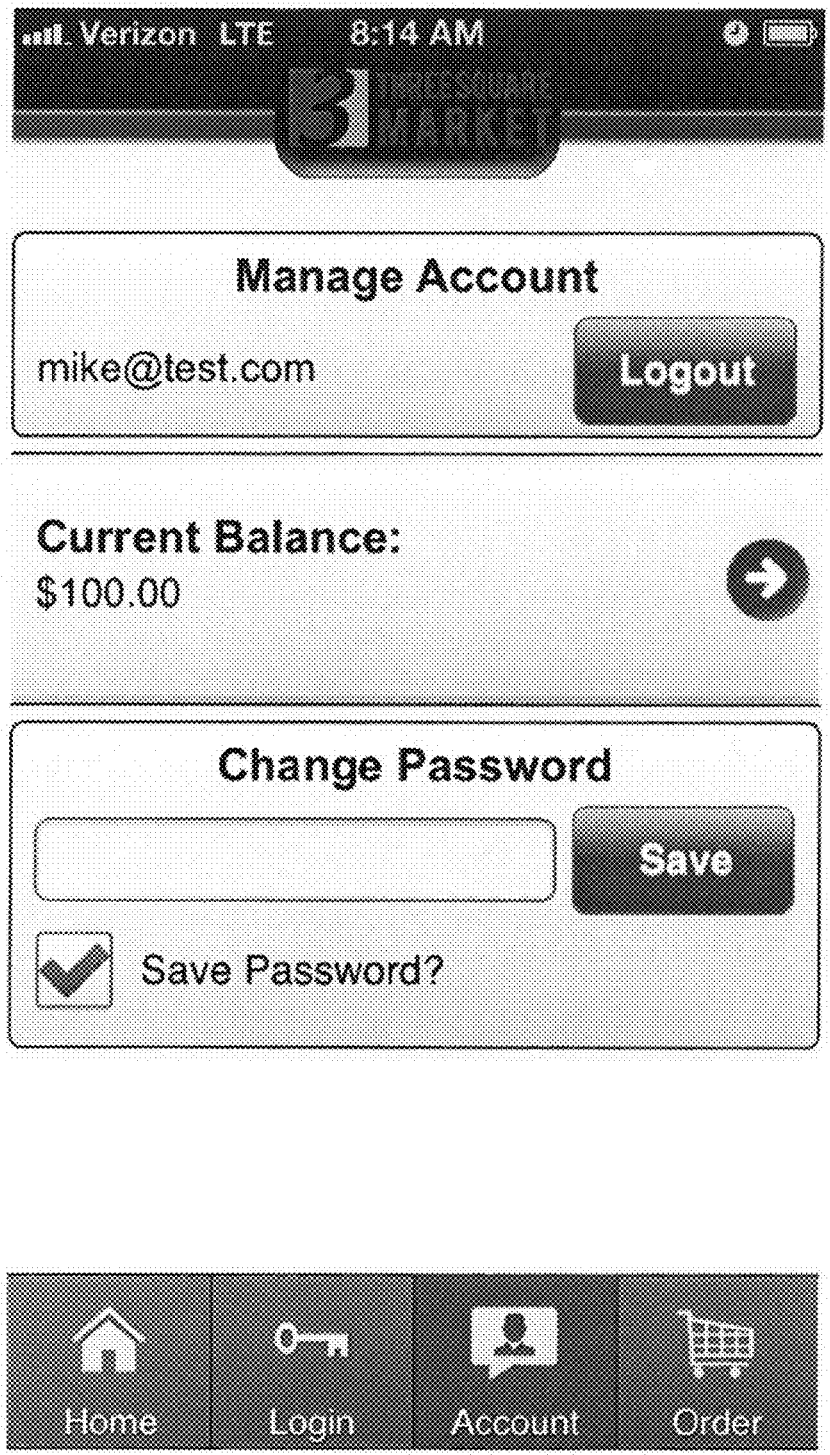
FIG. 90 shows an embodiment of an Account screen.
Figure 91:
FIGS. 91-111 show yet another embodiment of the administrator interface, pages and sub-pages for a vendor to manage their market.
Figure 92:
Figure 93:
Figure 94:
Figure 95:
Figure 96:
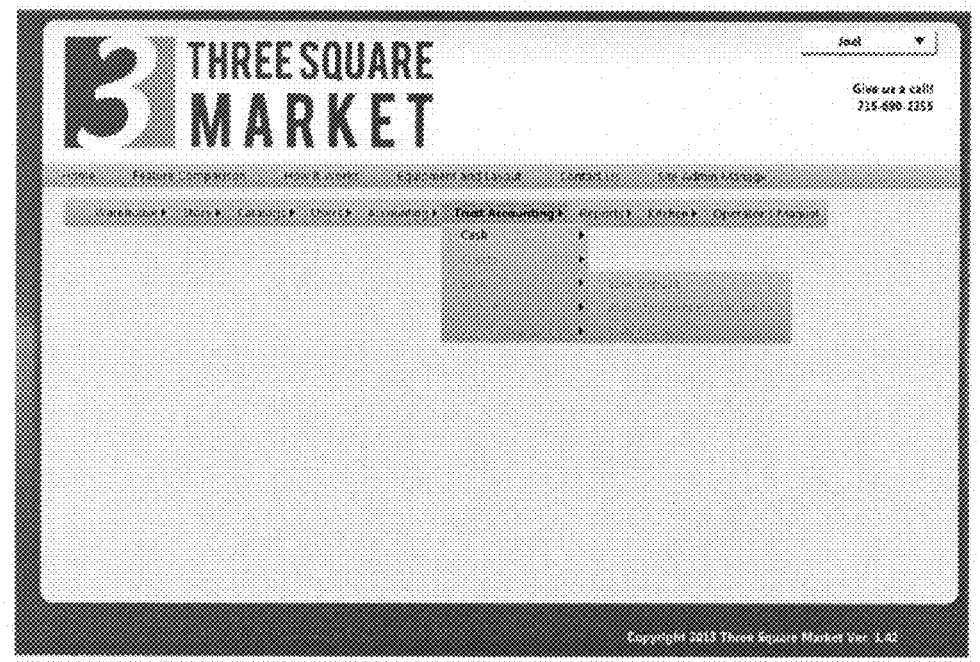
Figure 97:
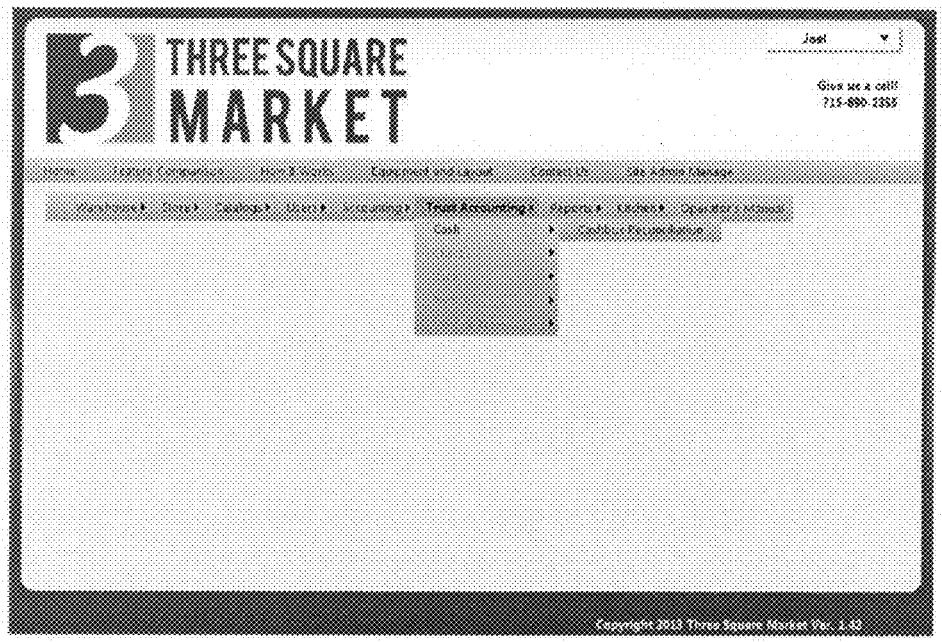
Figure 98:
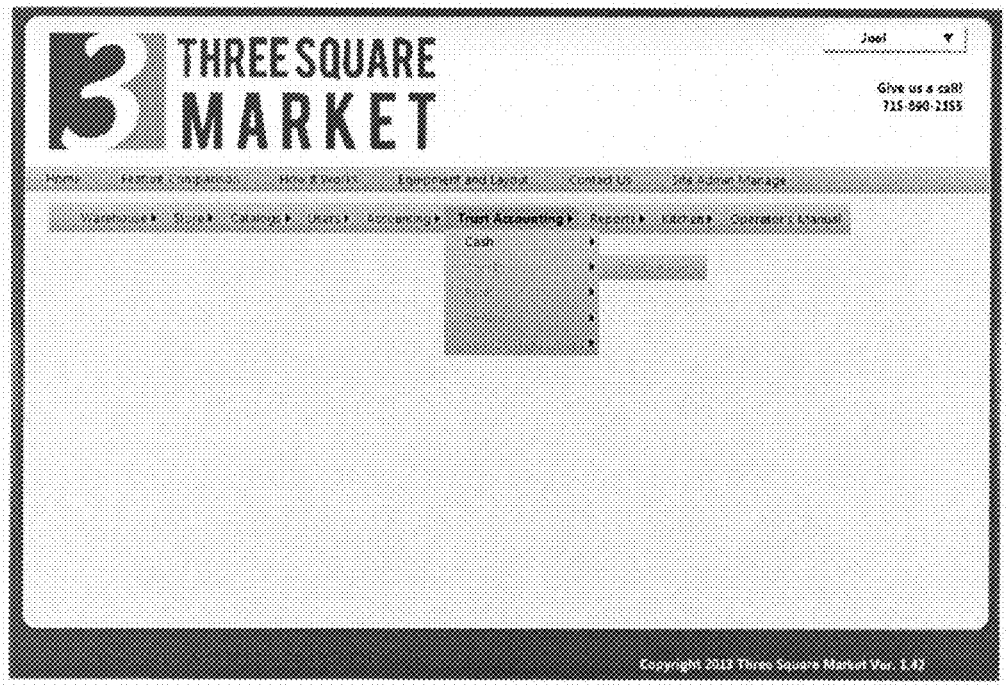
Figure 99:
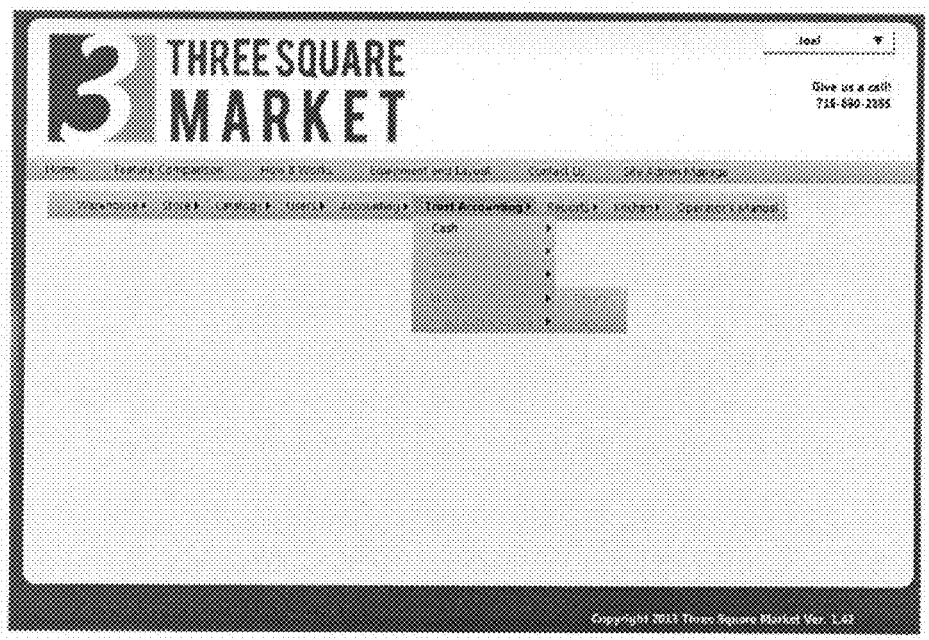
Figure 100:
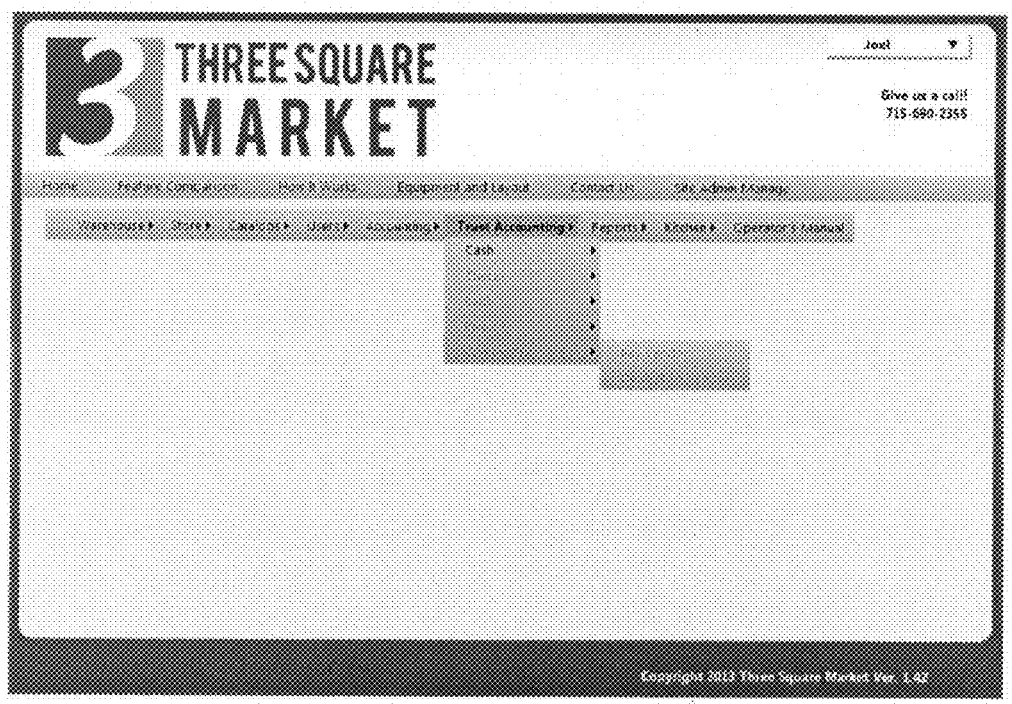
Figure 101:
Figure 102:
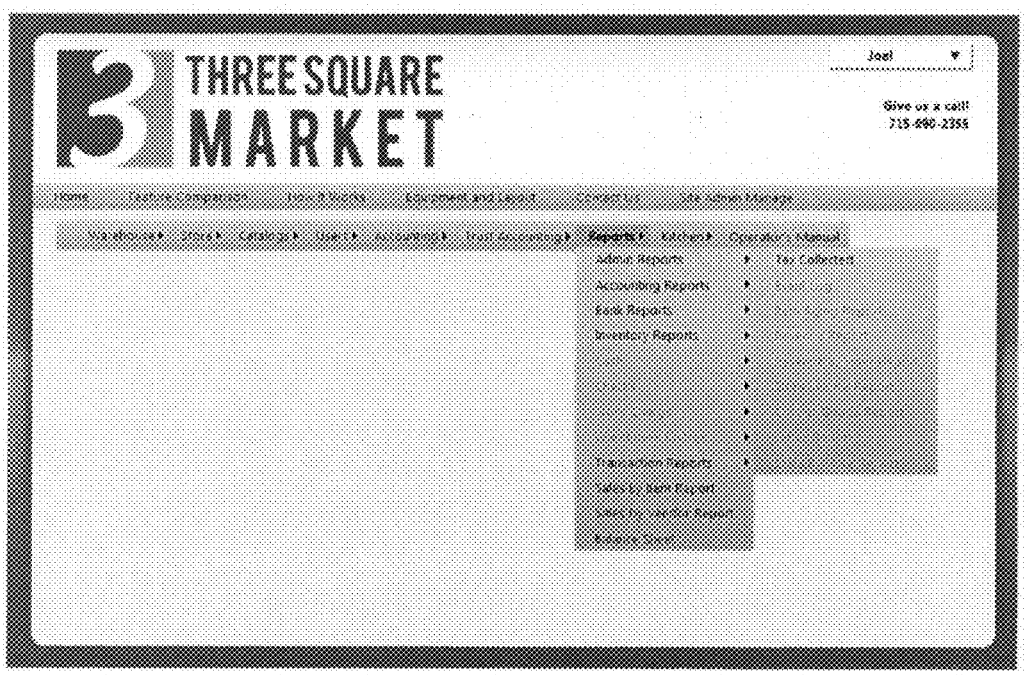
Figure 103:
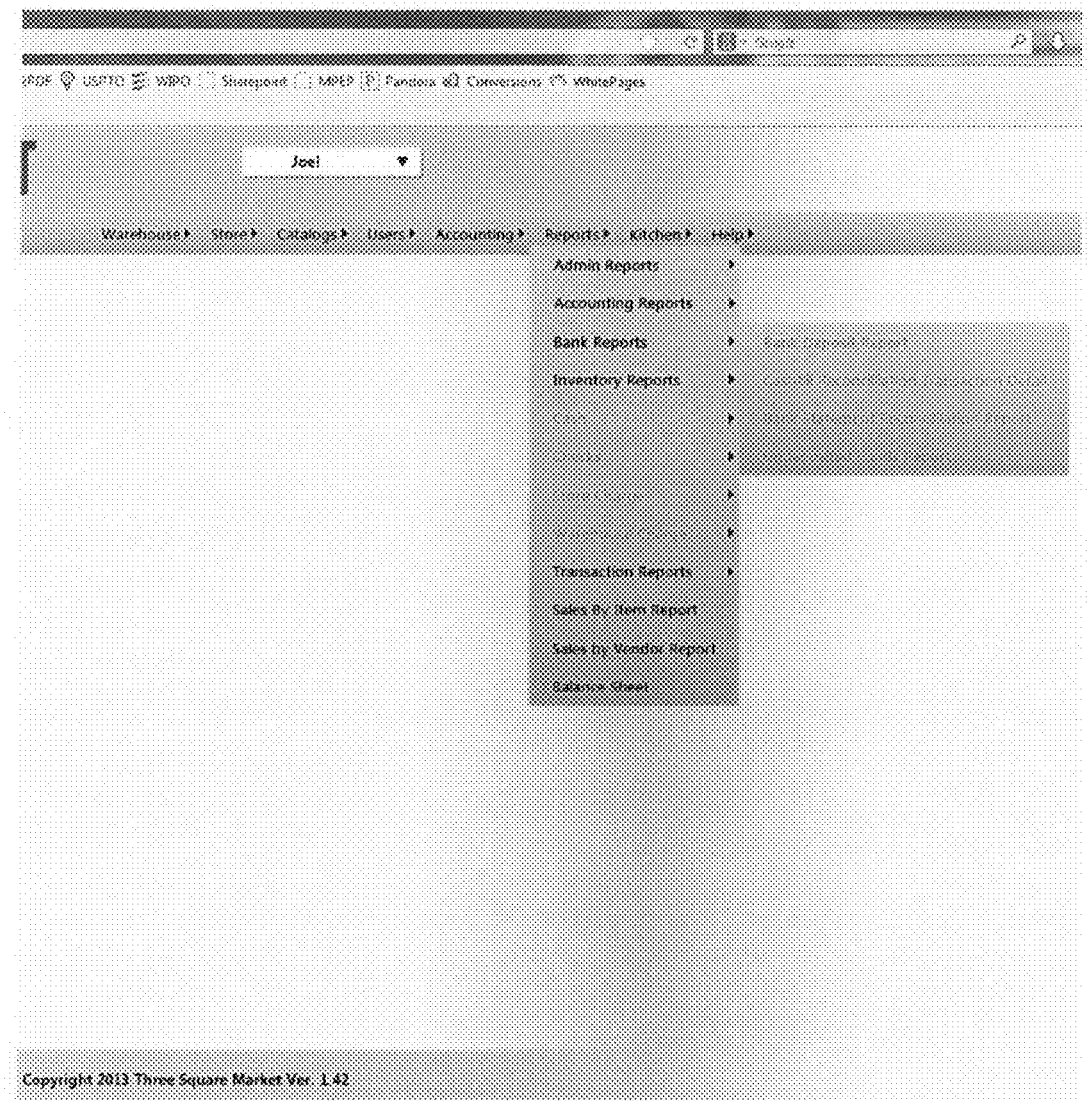
Figure 104:
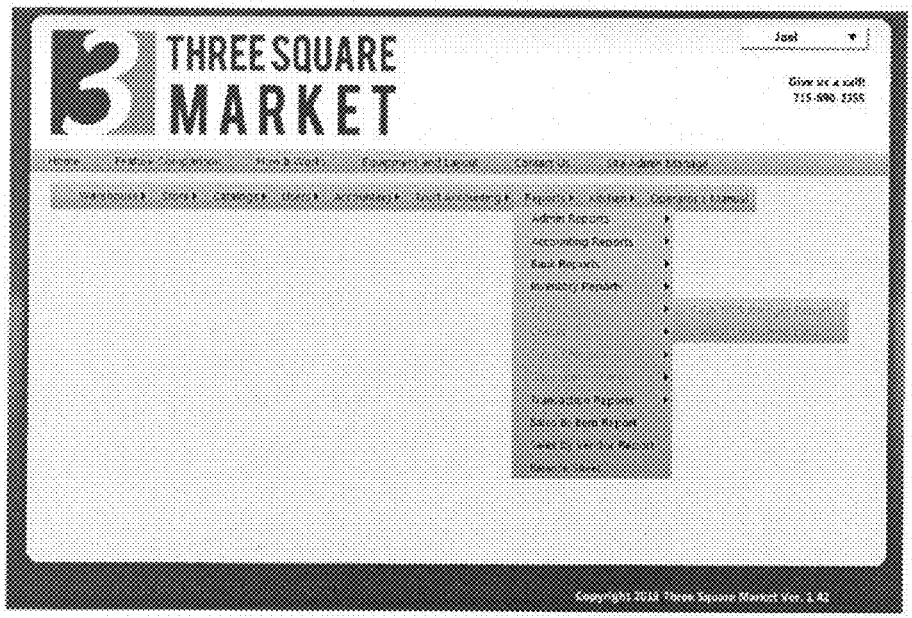
Figure 105:
Figure 106:
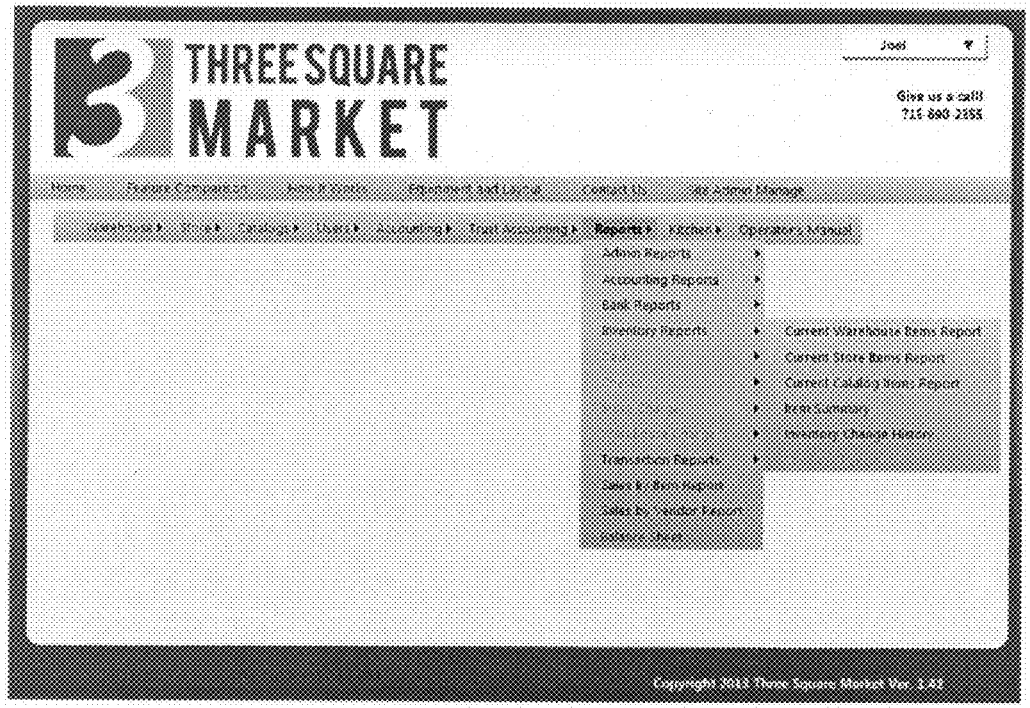
Figure 107:
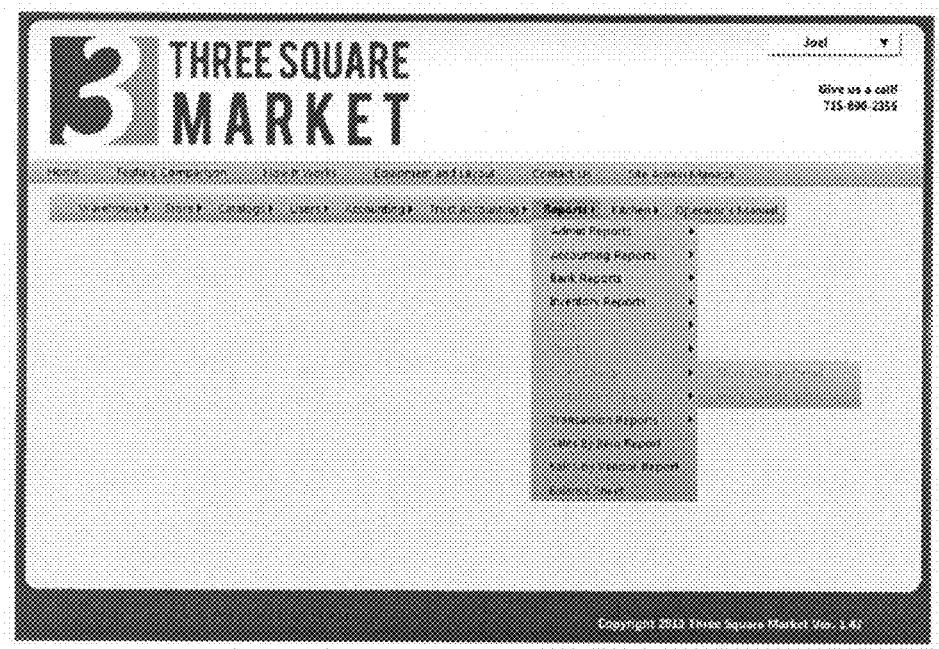
Figure 108:
Figure 109:
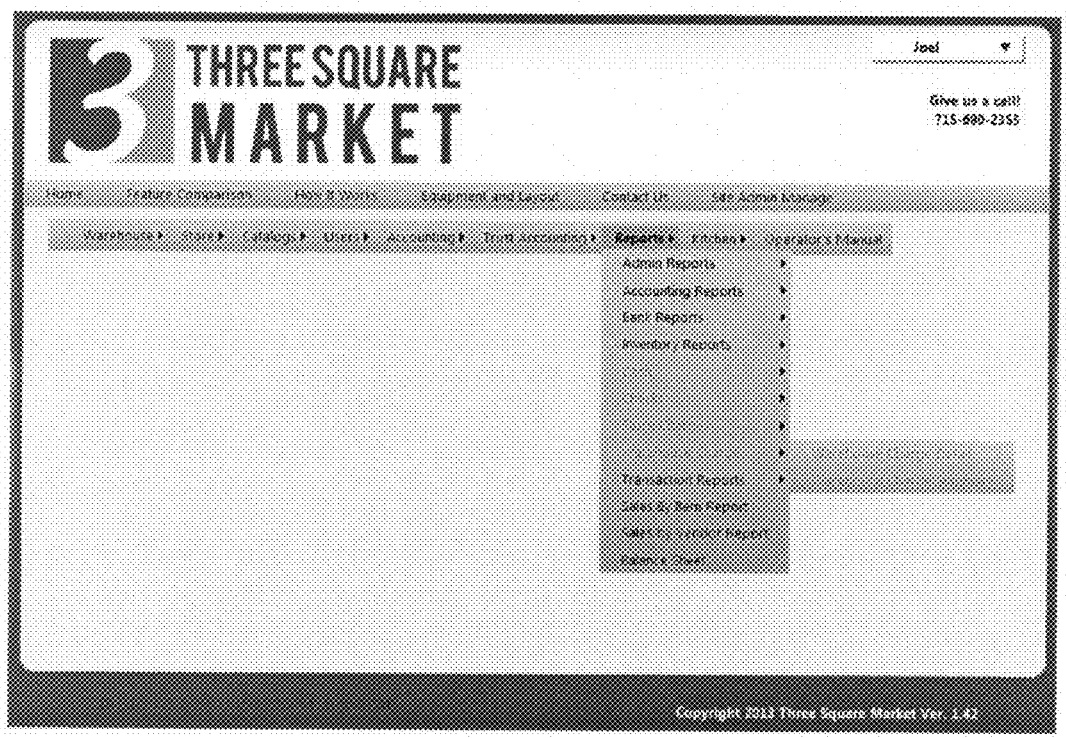

FIGS. 81-90 show embodiments of touch screen user interfaces for Apple iPhone 4-5. FIG. 81 shows an embodiment of a touch screen user interface of a Home Screen for the mobile app for use by customers of the market of the invention. FIG. 82 shows a Scan To Login Screen (via scan barcode) whereby the User/Customer can simply hold their iPhone next to the Market Kiosk and login to their account to purchase items or do other tasks. FIG. 83 shows an embodiment of a user interface for Purchase Item for Searching for items or Scanning items. FIG. 84 shows an embodiment of an Add Item via Scan screen. FIG. 85 shows an embodiment of a View Cart screen. FIG. 86 shows an embodiment of an Initial Checkout screen. FIGS. 87 and 88 shows an embodiment of final, Confirm Checkout screens. FIG. 89 shows an embodiment of an About information screen. FIG. 90 shows an embodiment of an Account screen.

FIGS. 91-111 show yet another embodiment of the administrator interfaces for a vendor to manage and control their market, on-line, via Warehouse, Store, Catalogs, Users, Accounting, Trust Accounting, Reports, Kitchen and Operators Manual screens and sub-screens. A preferred process for setting up accounts for one or more stores and one or more warehouses, using the on-line tools is described below.

Figure 112:
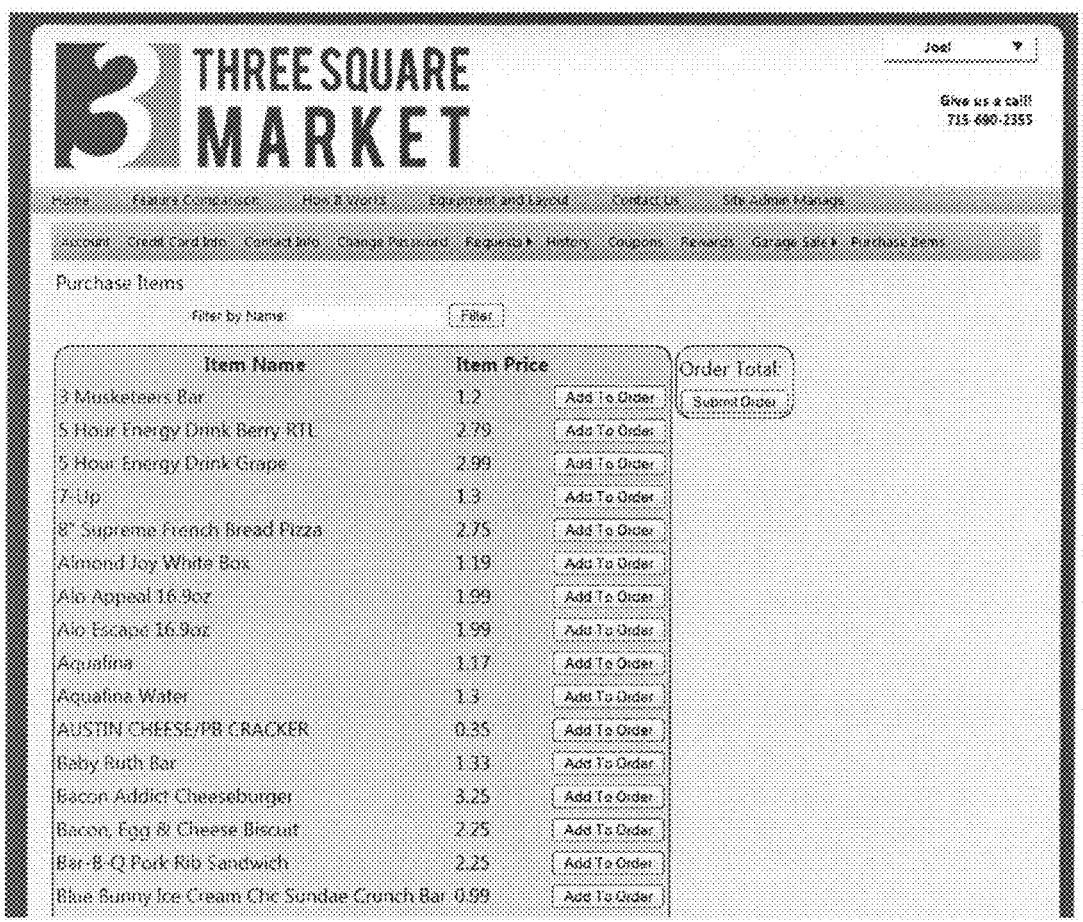
FIG. 112 shows a further embodiment of a Purchase Items page for a User Account.

FIG. 112 shows a further embodiment of an interface for a user account for Purchasing Items.

A preferred process for an administrator/vendor for setting up and administering warehouses and markets/stores is described below.

Setting Up a New Operation

The following information is preferred for setting up a warehouse and market store:
1. Warehouse name, EX: "Three Square Warehouse".
2. First market site name, EX: "Three Square Breakroom".
3. A full list of items currently being purchased by the vendor and which is desired to be made a part of the market(s). These lists can be provided as either excel file or as a CSV (comma separated value).

Initial Log In

Once the information above is provided, the vendor/administrator can register a user account in the master system of the Super User, for example Three Square Market of Hudson, Wis. USA ("32Market") via a webpage such as www.32market.com, and create a user account associated with a first market location.

Once the user/administrator has created user account the SuperUser (for example, 32Market) grants additional permissions to oversee the warehouse and market sites.

After the elevated your permissions you (administrator/vendor) can elevate your staff permission level by going to 32Markets mobile site (for example www.32market.com/mobile") and finding them in the user menu.

Managing a Warehouse

Import Catalog Items.
　After selecting your (the user/administrator) catalog and warehouse location you are ready to mark items for importing to your warehouse. If you are adding a lot of items it may be easier to use the "Check All" at the top of the screen and then un-check the items you do not need.
　All items require that you specify the minimum and maximum stock level for your warehouse. When setting the minimums and maximums enter values based on the boxes or cases you receive.
　　For example: Orange Soda (case 24) min=0.5 max=1
　　　This means that we want to stock a minimum of 12 bottles and a max of 24.
　To speed up min and max assignment you can use the "Set All" values at the top of the screen and then adjust select items to higher or lower values.
　For those operators that will not be using our warehouse for inventory control we do offer the ability to bypass using the warehouse ordering. Enter any min and max and the Super Administrator will apply the setting once you have items in your warehouse.
Manage Warehouse Items
　This menu allows you to edit product defaults for things not edited on a regular basis. Options include; product names, descriptions, primary UPC, default selling price, default sales tax rate, and re-order point.
　　Name, description, and selling price are the three things your customers see and they can search by name so try not to abbreviate key words.
　　The default selling price is what will import to a new store. You can always adjust the price to something different at the store for store specific pricing.
　　Default sales tax rate is what will import to a new store. You can also adjust the tax rate to a different percent at the store level.
　　Re-order point defaults to "Min" meaning an item will not show up on a store pick list until it is equal to or less than the minimum stock level specified. When set to "Max" the item will show up on all store pick lists whether one item is needed or the maximum stock level specified. "Max" is recommended for use on items that are customer sensitive and must "always be available".
Manage Warehouse Inventory
　This menu allows you to edit products in your warehouse, some things you may change on a regular basis such as stock level minimums and maximums.
　　Using the check box on the far left side of any item and then saving will remove all checked items from your warehouse. You can re-add them from the catalog if you wish.
　　In the event that you change who you order a product from you can change which vendor supplies the product. Setting the vendor specifies to the system which items should show up when you create a warehouse order to a vendor.

You can make manual adjustments to the inventory by adjusting the pieces on hand value or by adjusting the boxes on hand value. *Caution* it is only necessary to change one of the two on hand values, the other will update automatically once the save all inventory button is pushed.

Verify Warehouse Inventory

This function can be performed on site using an Opticon handheld Bluetooth scanner and a mobile phone or tablet device.

To access visit (32market.com/mobile) select The Warehouse then Verify Warehouse Inventory. Scan each item and enter the value on hand, submit to start the next item. The mobile or tablet device must have internet access.

This function can also be performed on a laptop computer with a wired or wireless scanner; the laptop must have internet access and be logged into 32market.com or 32market.com/mobile.

Create/edit Warehouse Categories

Through this menu you can create new categories or edit the names of existing categories and disable existing categories.

Edit warehouse item categories

Through this menu you can assign categories to your warehouse items. Each item can have up to 4 categories assigned for items that are tracked separately from their standard category.

Warehouse Expiration Management

First, select your warehouse. If you have not yet marked items as expirable you will see the phrase "There are no close dated items!" To mark items as expirable click the blue "Mark Items as Expirable" button. This will bring up a list of every item in your warehouse. You may click the button next to each item to Mark Item as Expirable. When receiving these items on future orders you will now be prompted to input the expiration date of that product.

To view expirable items that have already been ordered and received you can click the blue "View Item Expirations" button. This will bring up the list of all items that are expirable and their expiration dates of each batch received into the warehouse.

In order for you to print barcodes for your expirable items you will need to click the blue "Print Barcodes" button. This will allow you to print a barcode sticker for each expirable item that was received into the warehouse. These barcodes will include a hidden reference to the expiration date it has in the system.

Create Warehouse Order

Select your warehouse location and vendor then click "Set all items to Recommended" to display an automatically generated pick list based on your current inventory levels and your par settings for each item. You can edit these results further to increase or decrease certain items before creating the order with the "Create Order" button.

If you do not click the "Set all items to Recommended' you can create an order manually by viewing the entire list. Once you have entered all desired items click the "Create Order" button to save the order in the system.

Viewing a Warehouse Order

Select the order you want to review. You can now view the order, print the order, or email the order depending on how you submit your order.

Receiving a Warehouse Order

Select your warehouse location and then select the vendor and order you want to receive. On this screen you have the ability to edit the received quantities before finalizing the delivery in the event product was short, damaged, or otherwise unable to be received into inventory. Click "Receive Items" at the bottom of the screen.

Warehouse Maintenance

Product count audit

We recommend auditing the warehouse product inventory at least once per month with a handheld Opticon scanner and a mobile phone or tablet. This will ensure accurate warehouse inventory information for store picks and for warehouse orders to re-supply the warehouse.

If you are not using our warehouse feature this is not required.

Product expiratory audit

We recommend checking fresh food items weekly to bi-weekly. We recommend all operators check their shelf stable product monthly. Frozen items can be checked bi-monthly to quarterly.

Managing A Market

Import Items to Store

Select your warehouse and target store. Check the box next to any item you want to import to the store, an item without a box is already in the target store. Once all items have been selected click "Copy Warehouse Items to Store." If you are adding many items it may be more efficient to check the "Select All Items" at the top and uncheck the items not needed. Note that when you are editing your min/max pars at the store level that these are based on unit counts. A min and max of 3/6 means you stock a minimum of 3 units and a maximum of 6 units.

Create Store Order

Select your market location and click "Set to Recommended" to display an automatically generated pick list based on your current inventory levels and your par settings for each item. You can edit these results further to increase or decrease certain items before creating the order with the "Create Store Order" button.

If you do not click the "Set to Recommended' you can create an order manually by viewing the entire list. Once you have entered all desired items click the "Create Store Order" button to save the order in the system.

View Store Order/Editing a Store Order

Select your market location and then select the order you want to view, print, or edit. On this screen you can print the order with the "Print" button. You can edit how many units of each item will be sent to the store (in the event of a shortage or sending extra). If you do make changes, click the "Saves Order Changes" button at the top.

Receiving a Store Order

Select your market location and then select the order you want to receive. On this screen you have the ability to edit the received quantities before finalizing the delivery in the event product was short, damaged, or otherwise unable to be left at the market. Click "Receive Items" at the bottom of the screen.

General Maintenance
  Inventory Spot Checks
    We recommend route drivers complete an inventory spot check at least once a week to get a 10 item random sampling to check to for inventory count inaccuracies.
  Verify Store Inventory
    We recommend operators complete a full inventory count of their markets on a monthly-quarterly basis. Utilizing a Bluetooth type handheld scanner and a mobile phone or tablet counting a section or a store can be completed during business hours with real-time updating of the inventory. Customers can purchase items while you count. In a medium or large sized market you may wish to do sections of the market during each visit to make the task more manageable or if you have limited availability to access the location.
  Facing Merchandise
    Route drivers should recover the store on each visit by doing the following:
      Front products by making sure the product face is towards the customers.
      Bring shelved or pegged items forward to maintain a full store image with an un-shopped look. This is especially important for theft prevention where it is much easier to identify a missing item on video footage if the shelves are neatly arranged and fully stocked.
  Expiration Checks
    In a micro market environment requests for refunds are rare. When they do happen it is most likely related to a customer purchasing an expired product. Expirable inventory should be checked regularly to prevent a negative customer image and to prevent unnecessary refund requests.
  Equipment Cleaning and Maintenance
    Air filters should be cleaned, water filters replaced, coffee brewers cleaned, and coolers/freezers temperatures checked at least monthly to maintain a safe environment.

Reporting

Admin
  Tax Collected—Pick a date range and check the box for each store you want to total tax.
Accounting Reports
  Balance sheet (See below)
  Cashbox Reconciliation History
    Select store location
    Select date range
    Resulting list will show each reconciliation, date, and amount.

Example Balance Sheet

Figure 110:
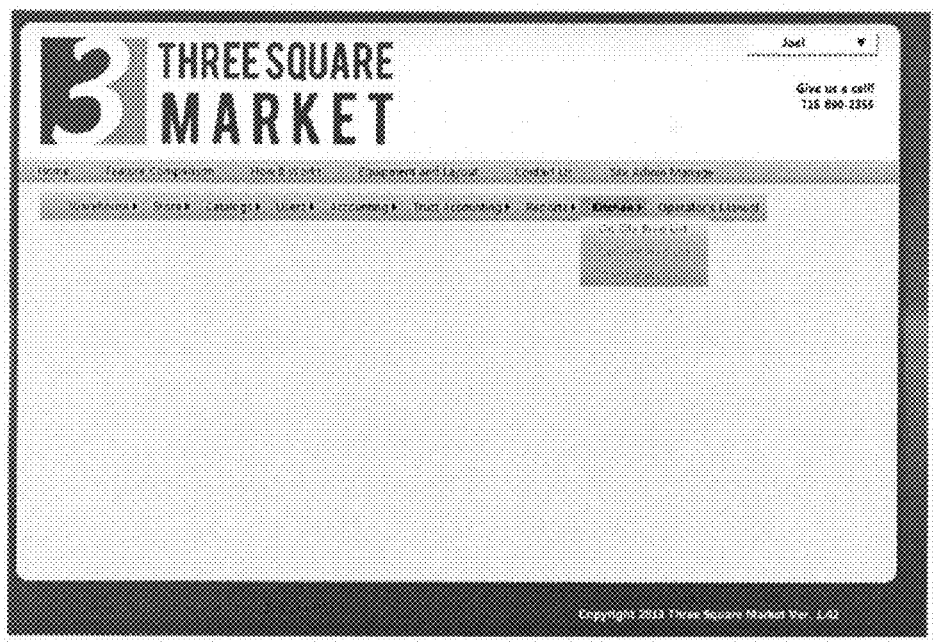
Figure 111:
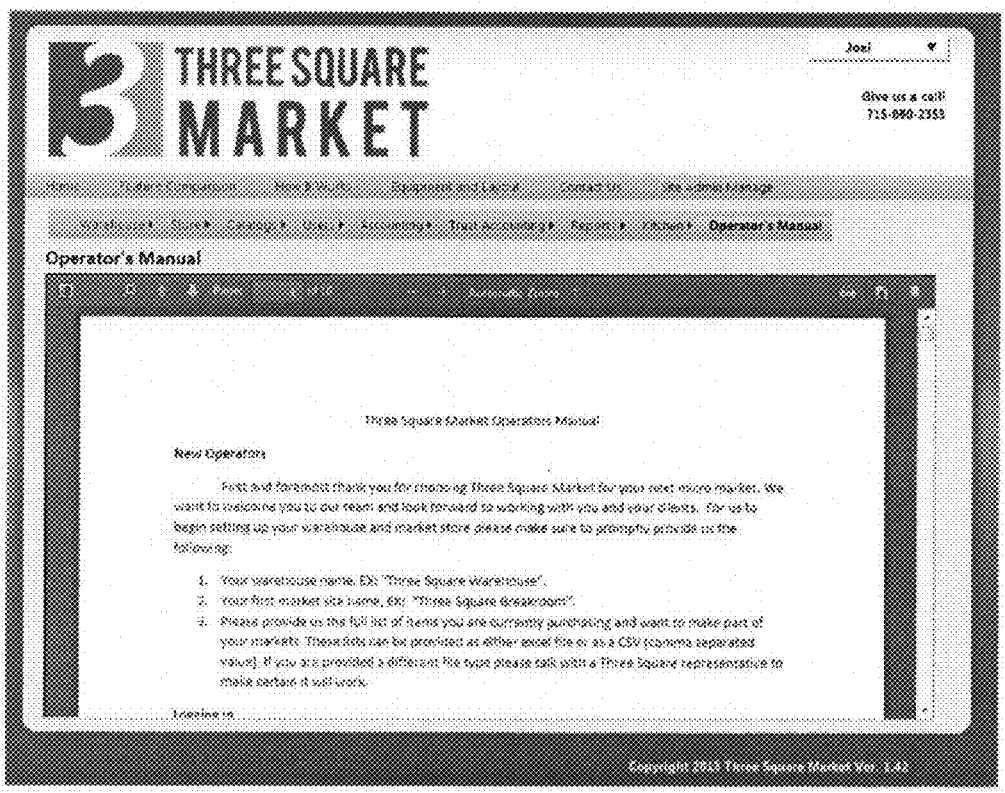

Referring also to FIG. 110, Select a Location and Date Range.
Assets
  Credit—Total credit card transactions.
  Undeposited—Cash removed from the kiosk but not yet brought to the bank.
  Adjusting—Reimbursements and credits issued during the date range specified.
Liabilities
  Cashtill—Amount of cash collected by the kiosk.
  Market Acct—Final balance of customer market accounts (stored customer credit).
  Payroll—Amount of uncollected payroll purchase revenue.
  Sold Product—Total value of sold products during date range.
  Unclaimed Funds—Final value of unclaimed funds not yet claimed from non-account cash customers.
Adjusting—Reimbursements and Credits Issued During the Date Range Specified.
  Inventory Reports (Store and Warehouse)
    Current Warehouse Items Report
      A list of all warehouse items becomes available for printing or export.
    Current Store Items Report
      A list of all store items (one store) becomes available for printing or export.
    Current Catalog Items Report
      Search, print, or export one of your catalogs.
  Transaction Reports
    Cash Transactions
      Select a store and date range, Use the "select" button to see more detail.
    Credit Card Transactions
      Select a store and date range. Use the "select" Button to see more detail.
    User Account Transactions
      Select a store and date range. Displays each market user purchase with detail.
    Market Account Deposits
      Select a store and date range. Displays only cash and credit card transactions that specifically added to a market account (does not display "change" added to accounts).
    All Transactions
      Select a store and date range. Displays all kiosk sales (cash, credit, and market account) and shows the method of payment with item details.
    Average Customer Transactions
      Select a store and date range. Displays many store sales figures including number of market account holders and averages based on user status.
    View Recently Sold Items
      Select a store and date range. Shows sales historically with reference to purchasers.
    Sales by Item
      Select a store and date range. Results can be sorted to view sales by highest sellers and will calculate proceeds. Can be sorted by category.
    Sales by Vendor
      Select a vendor, store, and date range. Results show sales volume based on vendor selected.

Creating a New Market

Registering the Site Name
  Contact the Super Administrator, preferably 3-4 weeks before the scheduled install to allow time to build the stores in the system, set min and max, and configure tax percentages.

Store Settings

Min CC Trans Fee (Minimum Credit Card Transaction Fee)
: Allows the operator to specify a minimum purchase amount that will allow a credit card to be accepted. Example: If 5.00 is input, $5.00 minimum will be required on a purchase to allow credit card usage.

Show Create Account
: Entering a value of "true" will enable the "New Account" button the kiosk for customers to use. This can be disabled by entering a value of "false".

Default email button for new sites
: Under "Store Settings" you can set a value for "Default_Email_Domain" to create a new button for your users to speed up email entry. For example, if you input; @32market.com a button will show on all screens asking for email with "@32market.com" on it. Users can click that button instead of typing out their email extension. Once you have created this setting it will require a kiosk reboot to show the new email button.

Show Add Dog Tag
: Entering a value of "true" will allow market customers to pair key ring dog tag barcodes to their account for quick login access.

Kiosk Background Image
: Speak with your Three Square Market representative to get us a copy of your logo or custom background. We can load this image onto our server and provide you the web address to customize your deployed kiosks. Reminder, the kiosk must be rebooted to display the newly assigned image.

Kiosk Background Color
: The backdrop color of the kiosk screen can be customized using hex color values. You can search Google to find these codes but below are some common color codes. Reminder, the kiosk must be rebooted to display the newly assigned color.
Visit www.colorhexa.com to view more color options.

| Blue = #0000ff | Grey = #eeeeee |
| Red = #ff0000 | Black = #000000 |

New Account Discount Percent
: Enter the discount percent value. Example; a value of "5" input equals a 5% discount to the mobile phone app customer who purchases using their phone app.

New Account Discount Period
: Enter the number of days a new user can receive the "New Account Discount Percent" described above. Example; a value of 30 would allow the new customer 30 days of getting a discount for making purchases using their mobile phone app.

Quick Pick Category Image
: This item pairs an image with the "Category for Button on Kiosk" which allows you to create a customizable button on the kiosk linked to a category of your choosing. If you provide an image as a .jpg or .png to your Three Square Market representative for your custom buttons we can provide you the web address to link the button with the image provided. Remember, the kiosk requires a reboot to display the new image.

Category for Button on Kiosk
: Select from the drop down list the category you want displayed on the kiosk as a button. The most common use of this feature is to add a "Fruit" or "Coffee" button. Once the kiosk is rebooted the new button will display and any item assigned to the category "Fruit" will show in that list. This is very useful for items that do not have barcodes or are purchased very frequently.

Show QuickPIN on Kiosk
: Entering a value of "true" will display the user's quick pin on the kiosk screen after successfully logging in. By default this is disabled to prevent someone from trying to steal a quick pin and password from a user. Entering a value of "false" will hide the quick pin value after log in.

Ignore Warehouse Inventory
: By entering a value of "true" in this field your store orders will generate with all items needed regardless of your warehouse supply. This feature is for those operators that choose to not track inventory through the Super Administrator (for example Three Square Market) system. Entering a value of "false" will disable this feature.

Show Suggestion Button
: Entering a value of "false" will disable the suggestion button from showing on the kiosk screen. You can enter a value of "true" if you want the button to show again. Remember, it requires a kiosk reboot to make these changes take effect on the kiosk.

Kiosk Auto Payment
: Entering a value of "true" will eliminate the need for the customer to touch the "Pay" button after swiping a credit card or after inserting enough money to complete a cash purchase. Select market locations have customers who do not touch the "Pay" button.

Kiosk Font Color
: The text color of the on screen text can be customized using hex color values. You can search Google to find these codes but below are some common color codes. Reminder, the kiosk must be rebooted to display the newly assigned color.
Visit www.colorhexa.com to view more color options.

| Blue = #0000ff | Grey = #eeeeee |
| Red = #ff0000 | Black = #000000 |

Customer Service Recommendations For Supporting a Market

Personnel
: Route staff should maintain good personal hygiene and will only visit sites when wearing clean attire.

Equipment Maintenance
: At least monthly check cooler drain hoses, evaporator grates, and temperature of equipment.
Coffee brewers should be cleaned as should fountain soda machines at least every other week to maintain good cleanliness.

Product Management
: Inventory Spot Checks
Through this mobile site feature a route driver can confirm the on hand value of 10 random items in the store. A great way to identify theft or inventory issues on items not in your top 10 sellers.

Verify Inventory

Through this mobile site feature a route driver can use their handheld scanner to scan the barcode of each item and enter the current store count in real-time. This allows for a full inventory of a store with minimal interruption to your customers and less room for errors resulting from product being purchased during the inventory.

Expiration Checks

Monthly checks are recommended of all perishable merchandise at each location. This will minimize refund requests for this reason and maintain a strong market image with the customers.

Product Rotation Check

Every quarter we recommend a site supervisor visit the market and check the date codes on random items not in your top 10 sellers to verify route drivers are properly rotating stock.

Slow Sellers

Review your expired product lists, sales by item list, and expired fresh food items reports.

FIGS. 115 to 118 are views of select mobile app interfaces for an Apple iPad. FIGS. 119 to 125 are views of select mobile app user interfaces for an iPhone 5. FIGS. 126 to 133 are view of select website user interfaces.

Figure 134:
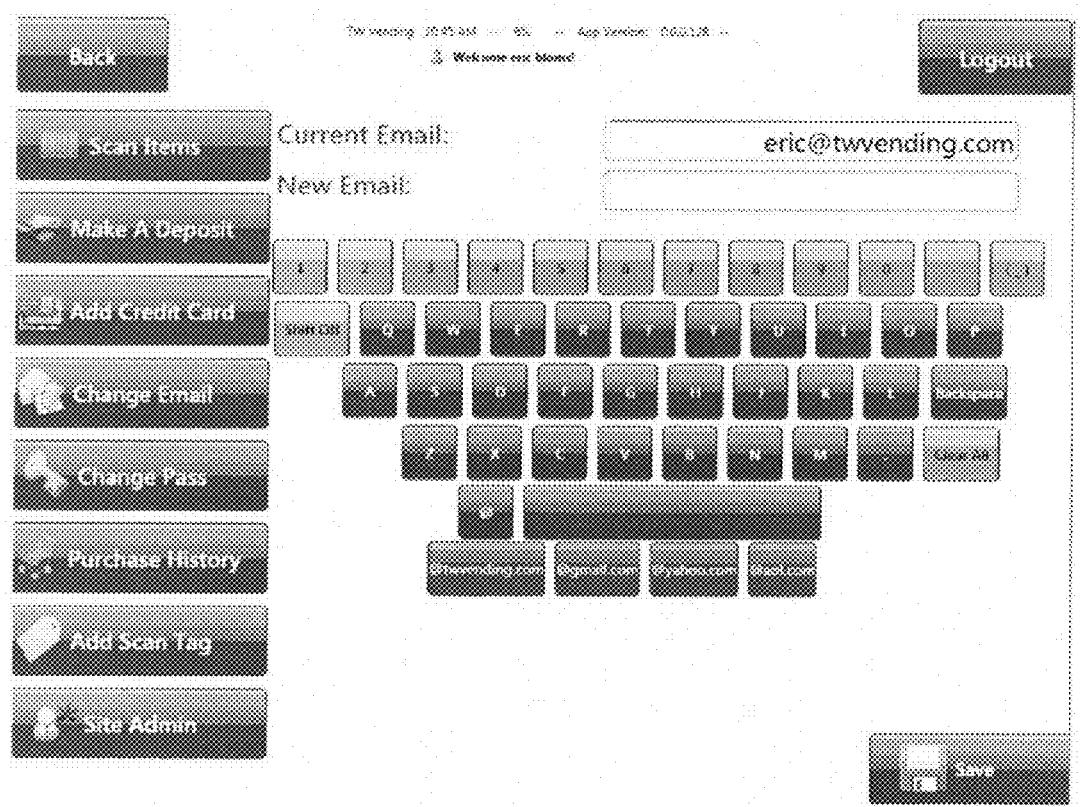
FIGS. 134 to 139 are views of select kiosk user interfaces.
Figure 135:
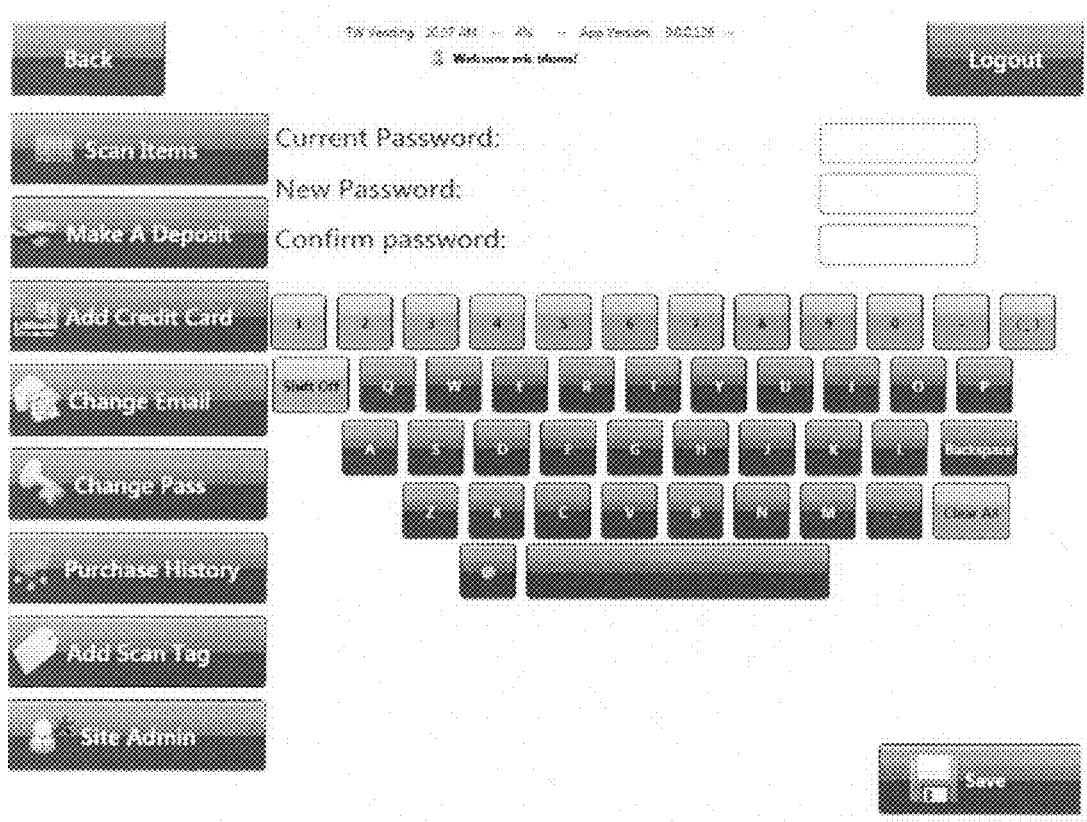
Figure 136:
Figure 137:
Figure 138:
Figure 139:
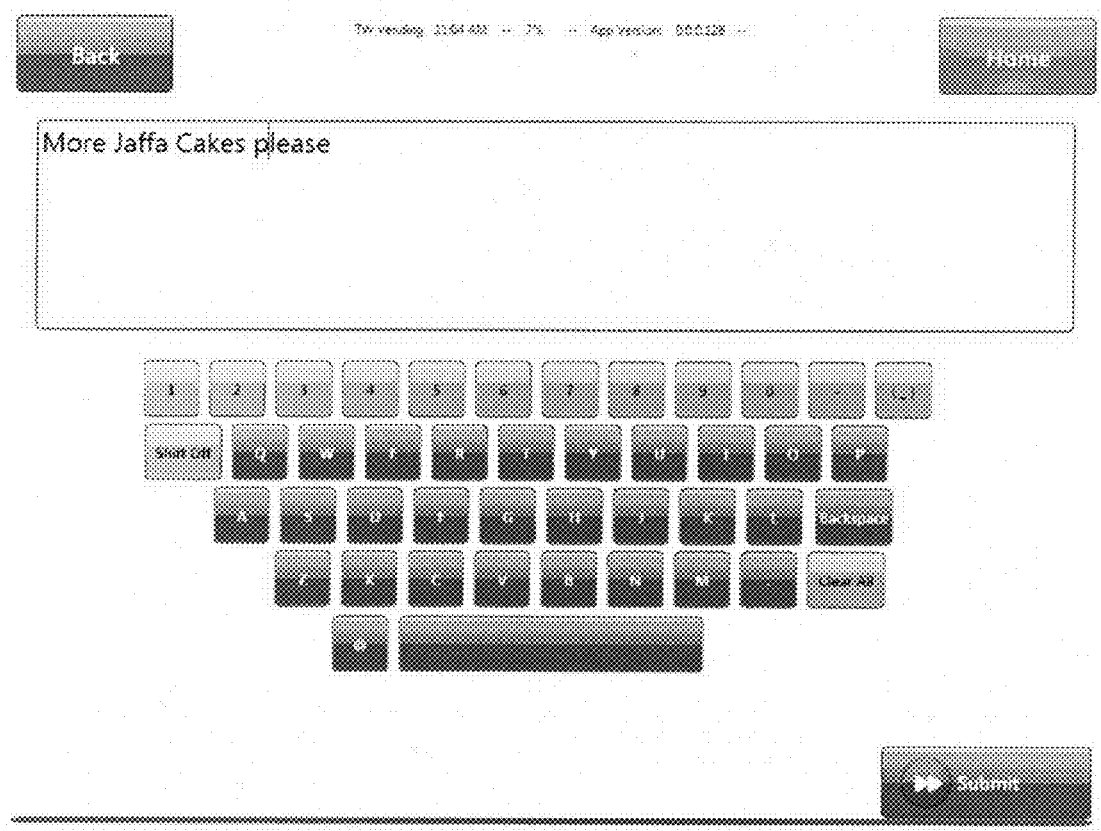

FIGS. 134 to 139 are views of select kiosk user interfaces. FIG. 134 is for changing email address. FIG. 135 is for changing account password. FIG. 136 is for credit card deposit. FIG. 137 is for purchase history. FIG. 138 is for scan tag. FIG. 139 is for suggestions.

Figure 140:
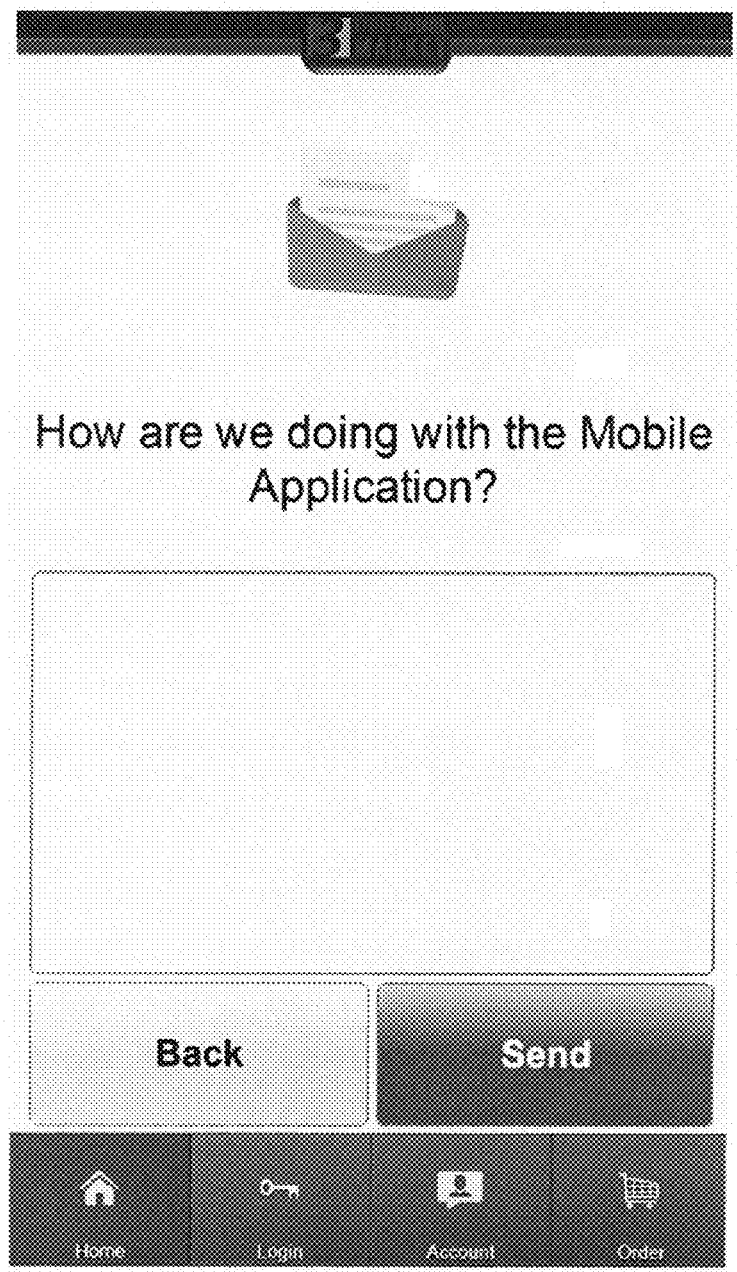
FIGS. 140 to 143 are views of select mobile app interfaces.
Figure 141:
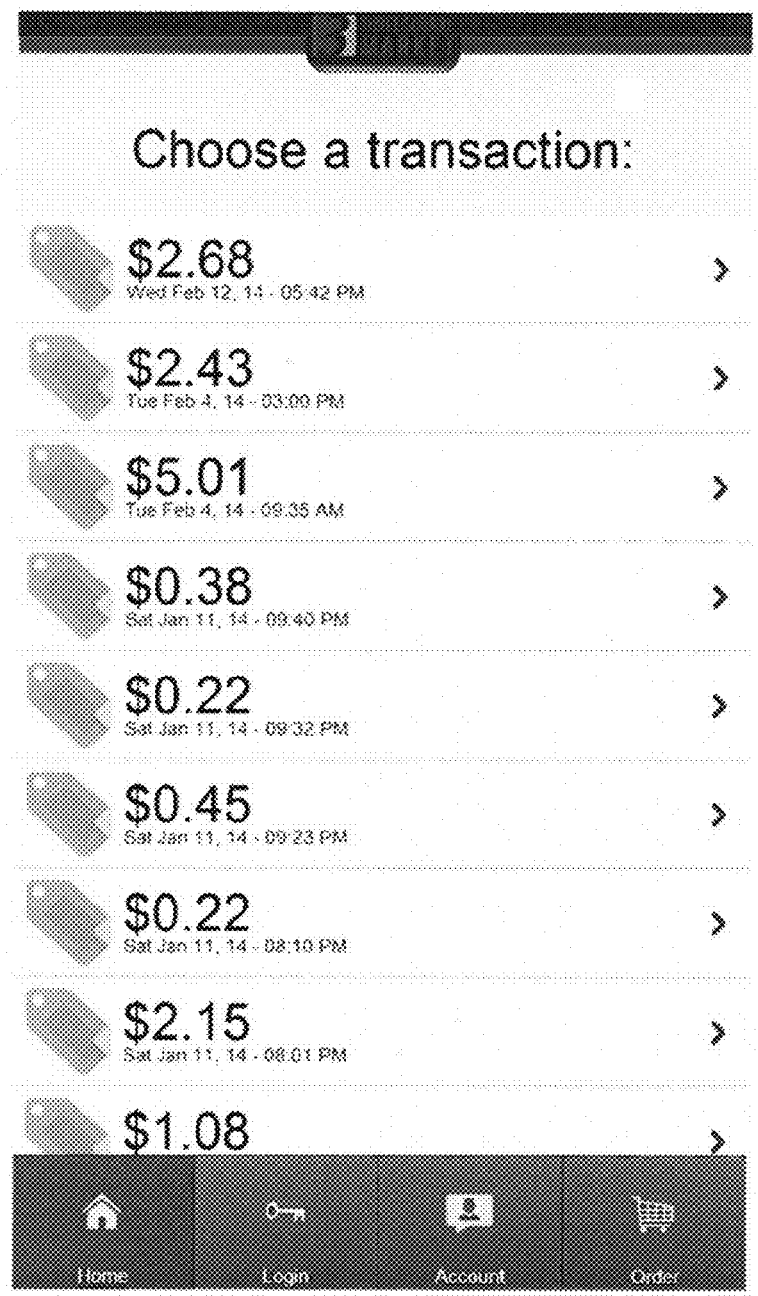
Figure 142:
Figure 143:
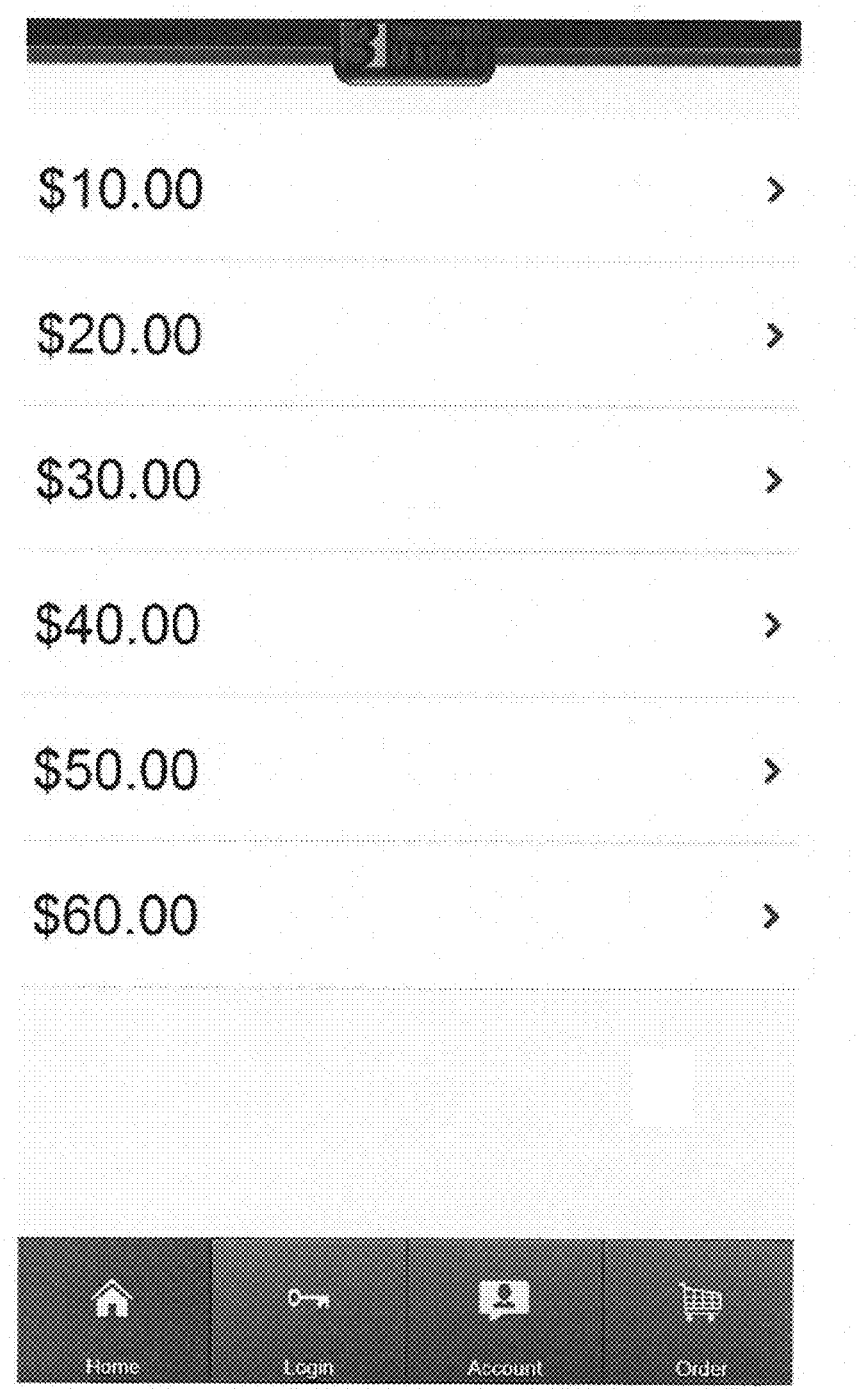

FIGS. 140 to 143 are views of select mobile app interfaces. FIG. 140 is for feedback. FIG. 141 is to request a refund. FIG. 142 is to view transaction history. FIG. 143 is for withdraw funds.

Figures 144, 145:
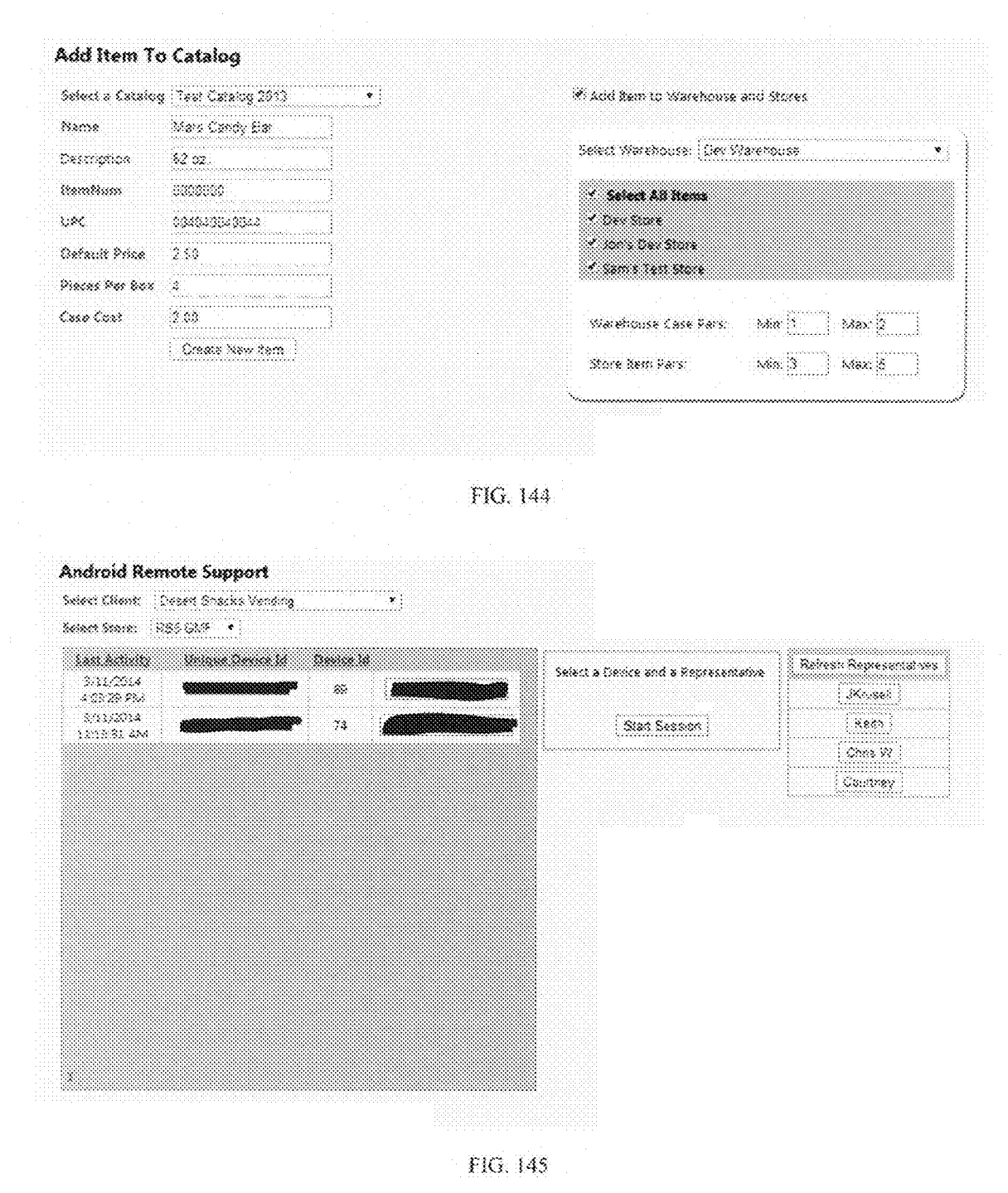
Figures 146, 147:
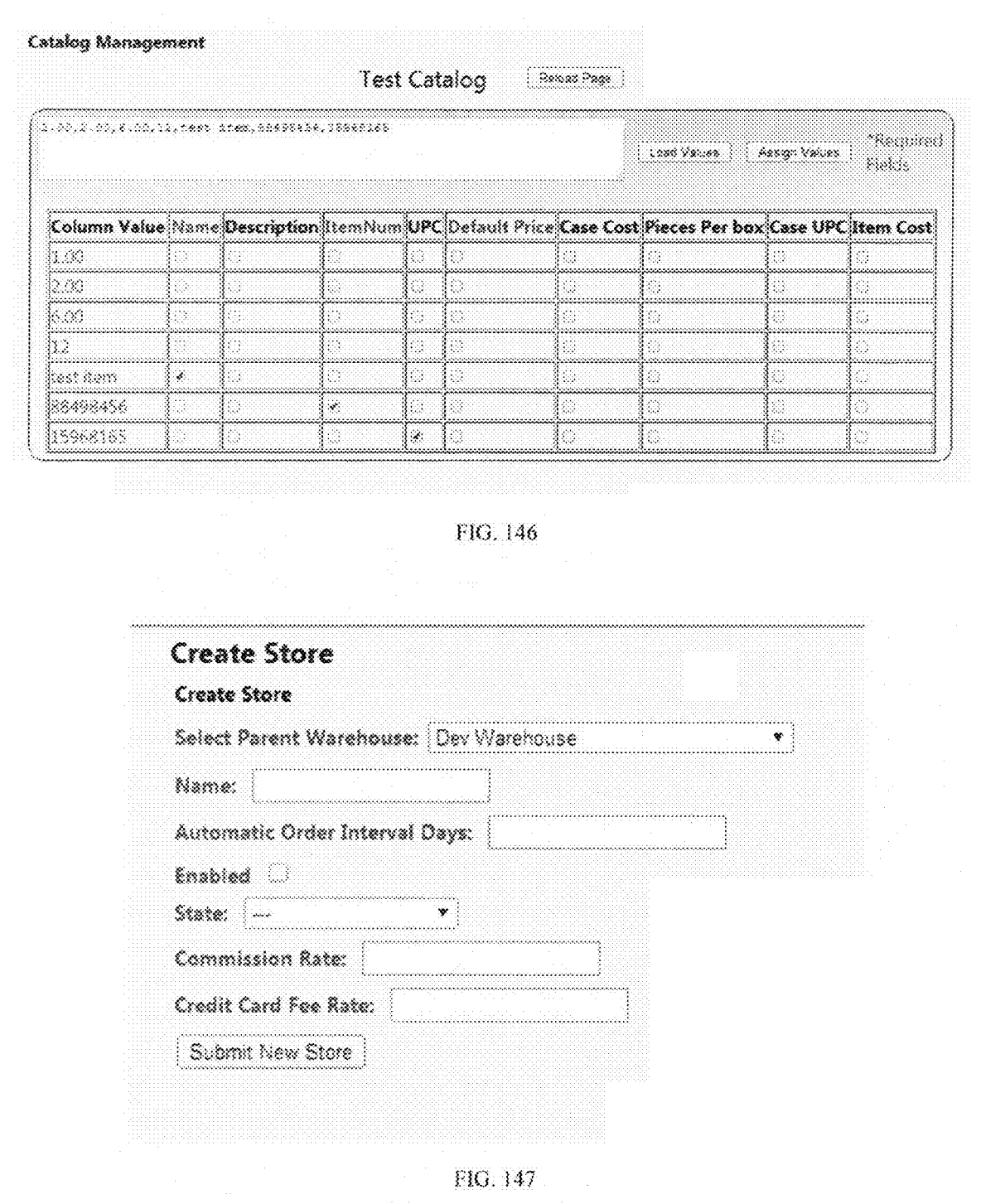
Figures 150, 151:
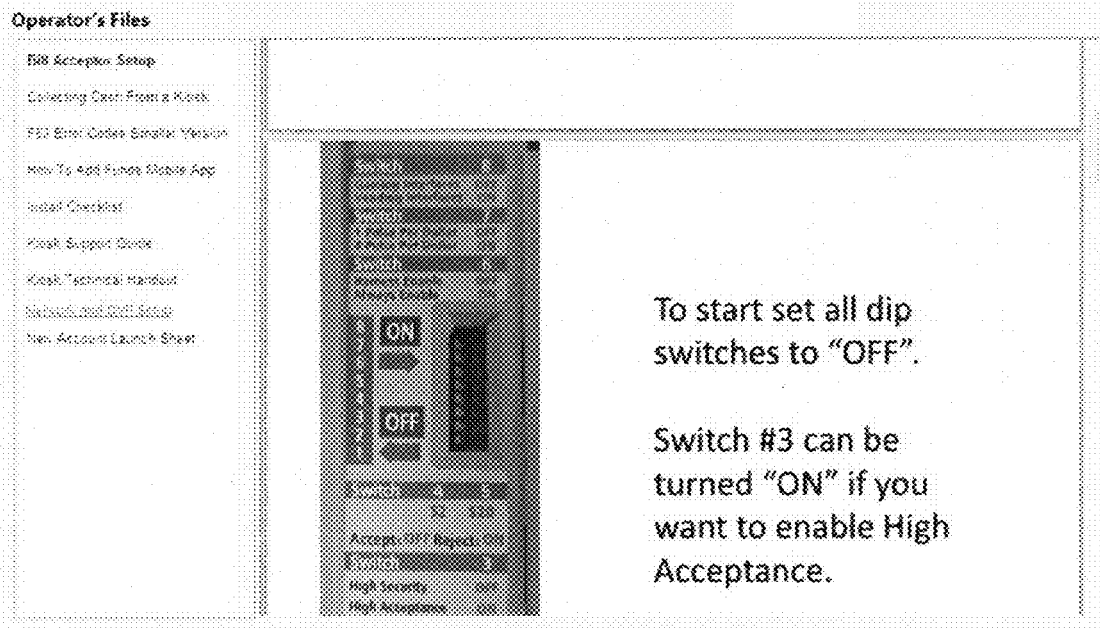
Figures 152, 153:
Figure 154:
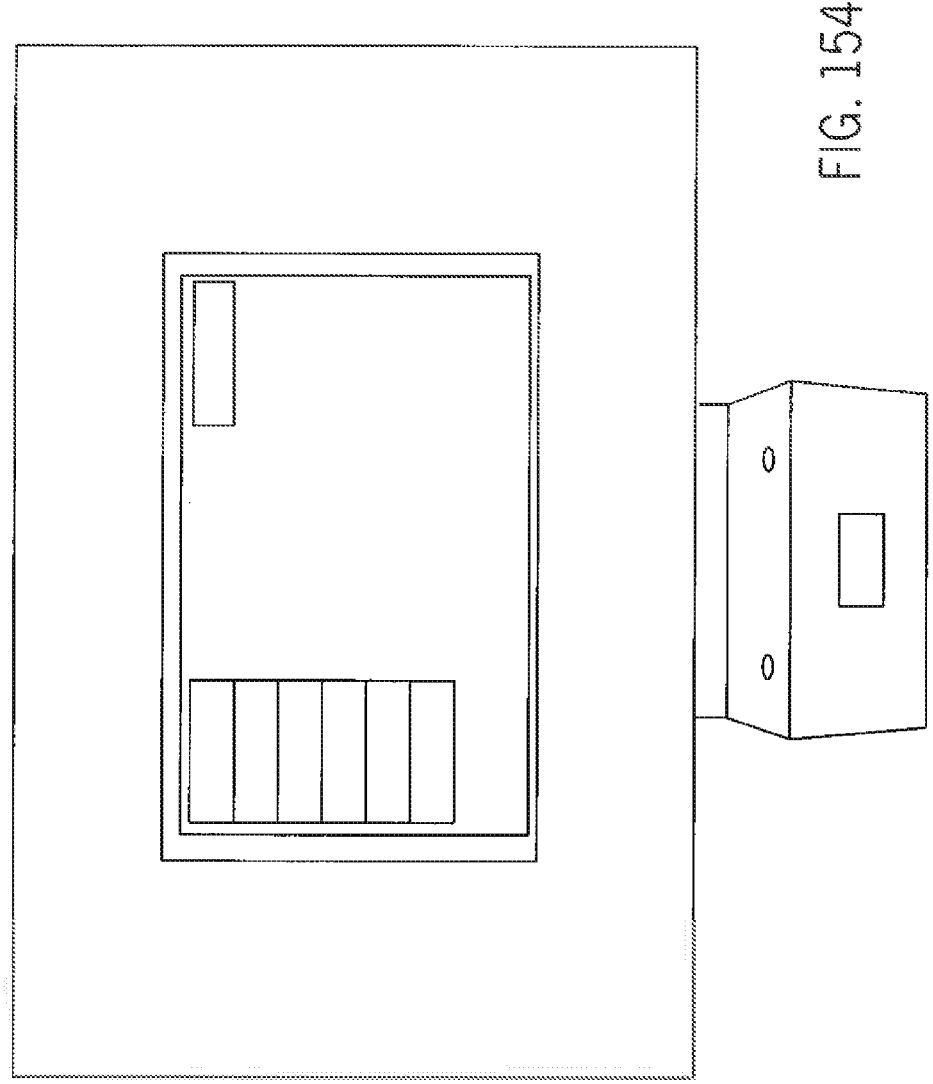
FIG. 154 is a front view of an alternative embodiment of a kiosk, which utilizes a tablet PC.
Figure 155:
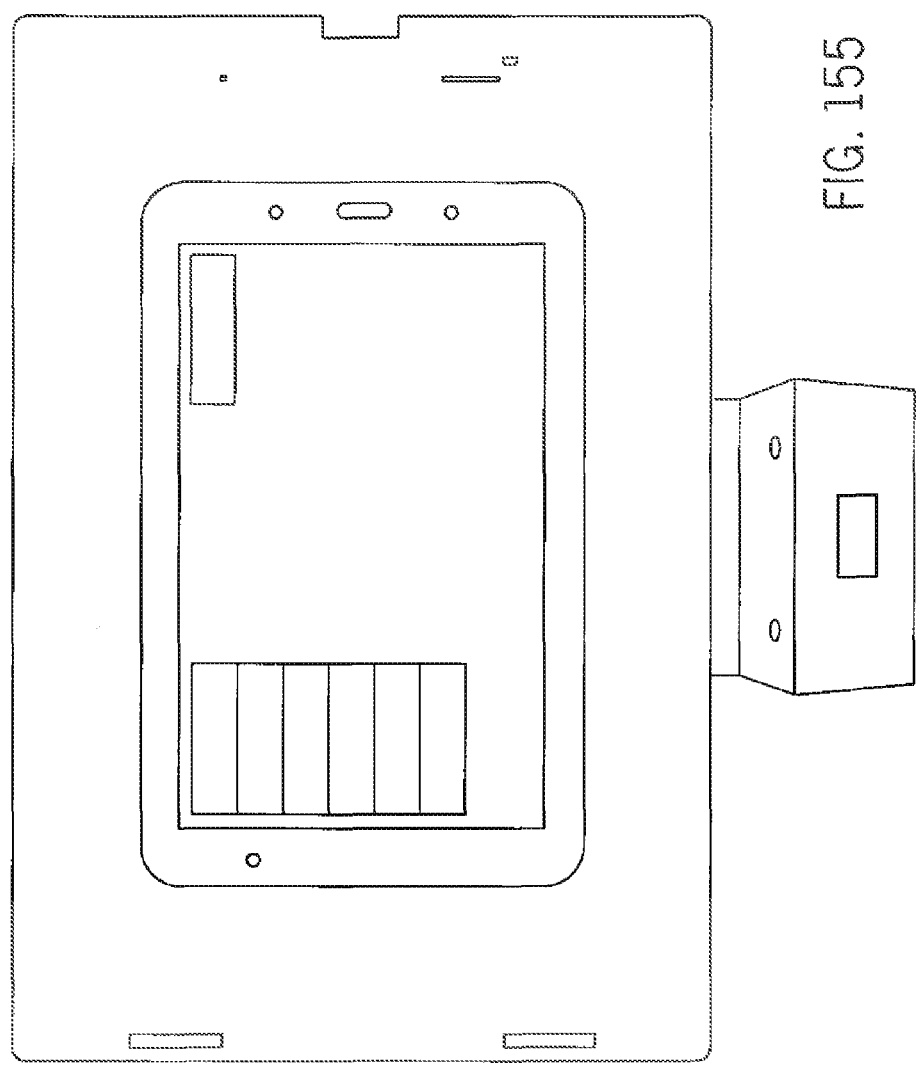
FIG. 155 is a front view of the alternative kiosk with its front cover removed and showing a tablet PC embedded in a frame.
Figure 156:
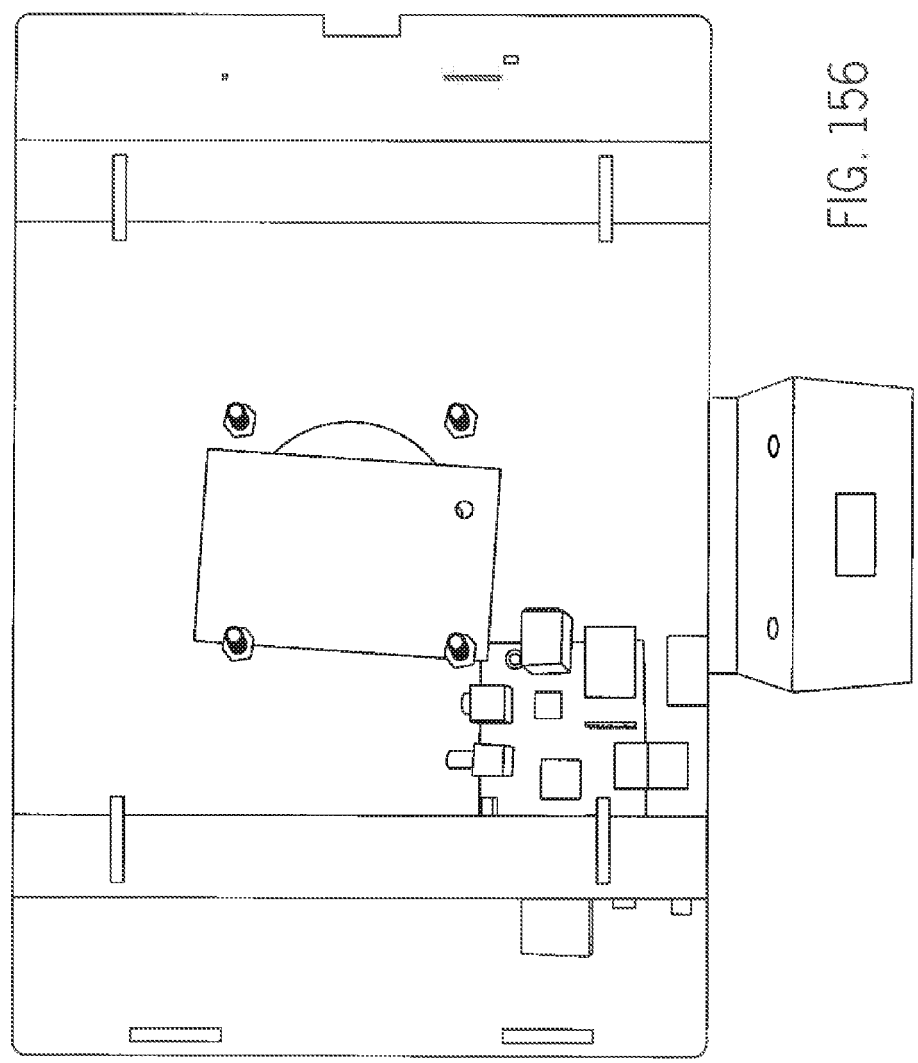
FIG. 156 is a front view of the alternative kiosk with the table PC removed.
Figure 157:
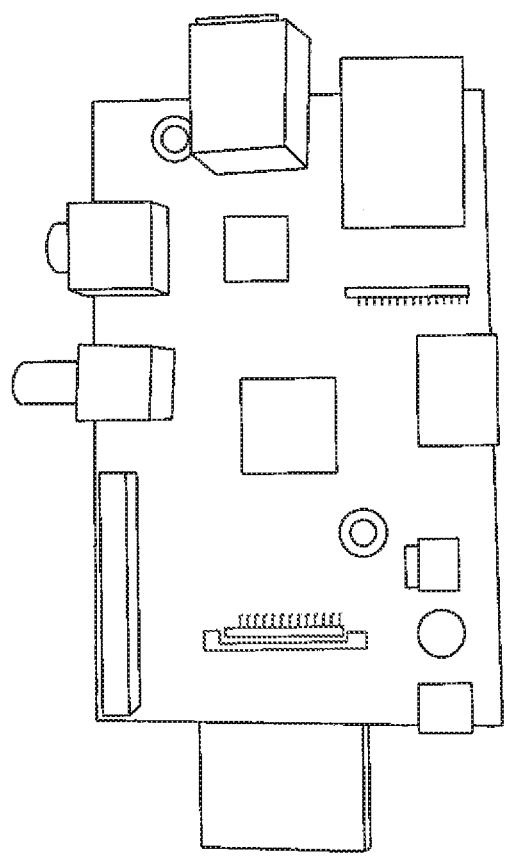
FIG. 157 shows a Raspberry Pi type ARM GNU/Linux box that communicatively connects the table PC to a scanner module.

FIGS. 144 to 153 are view of select website administrator interfaces. FIG. 144 is for add item to catalog. FIG. 145 is android remote support. FIG. 146 is catalog management. FIG. 147 is create store admin. FIG. 148 is create vendor admin. FIG. 149 is device management. FIG. 150 is invoice report. FIG. 151 is operator's files. FIG. 152 is operators manual view. FIG. 153 is to access training videos.

Figure 114:
FIG. 114 is another view of the kiosk login screen.
Figure 115:
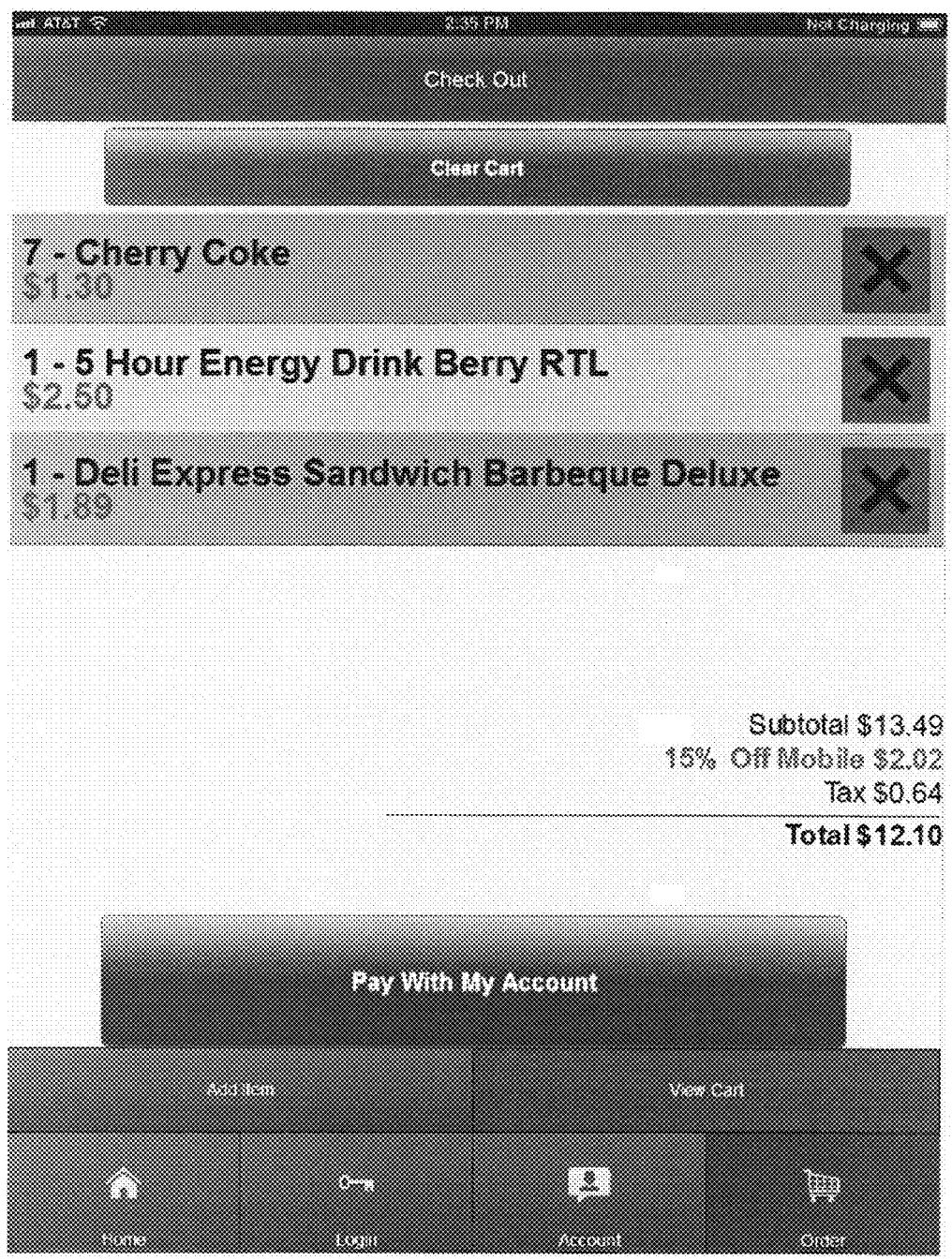
Figure 116:
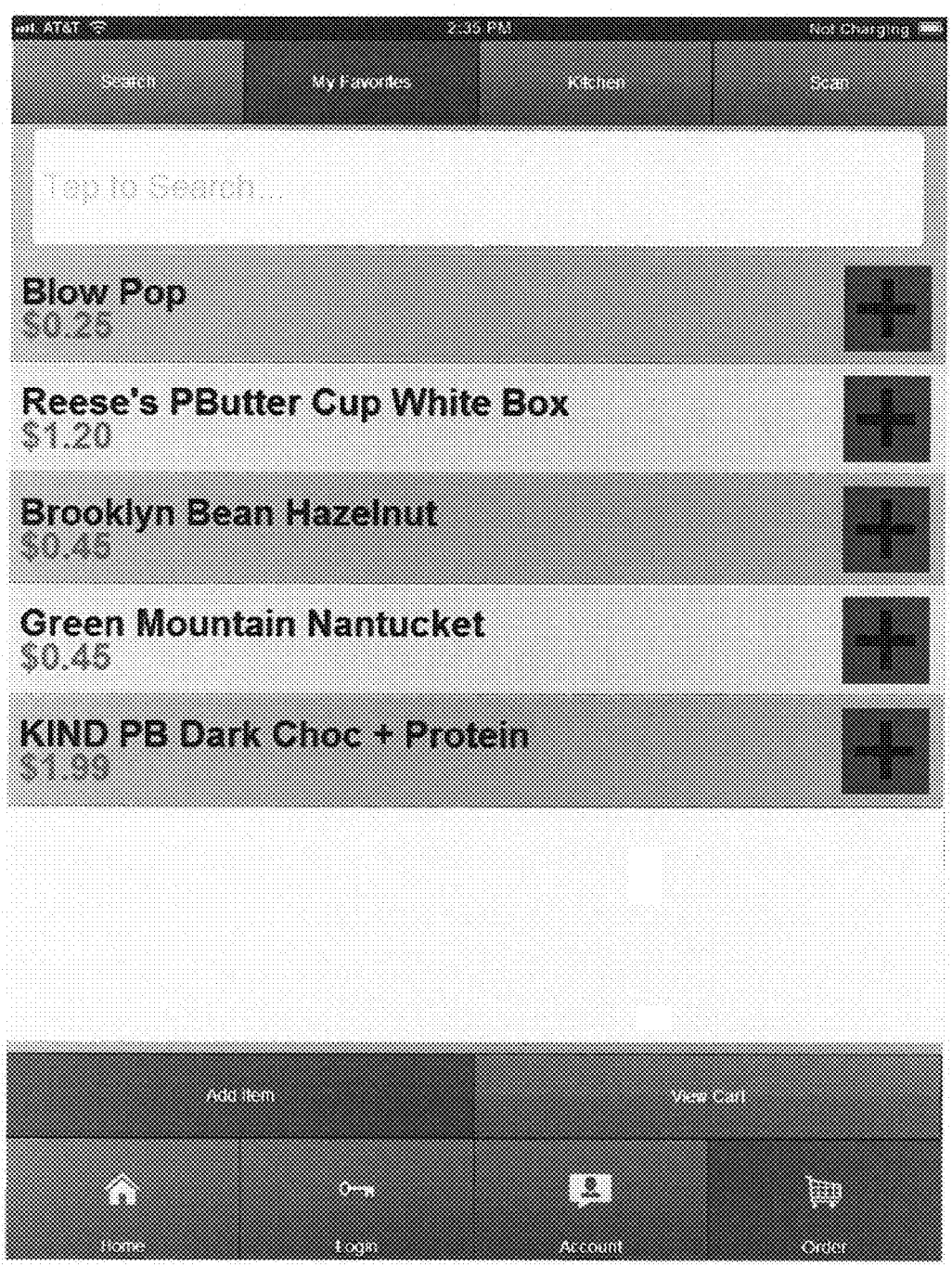
Figure 118:
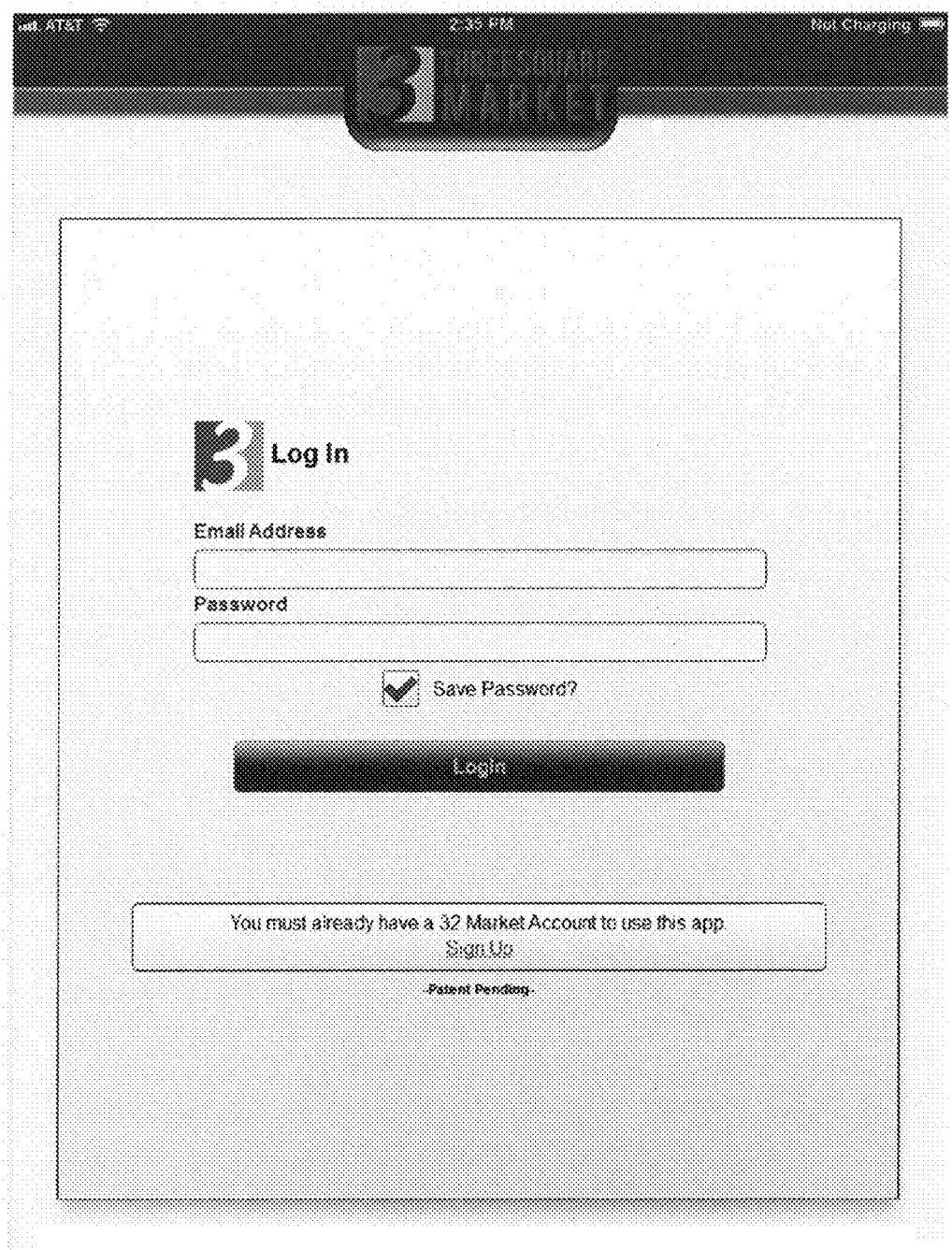
Figure 119:
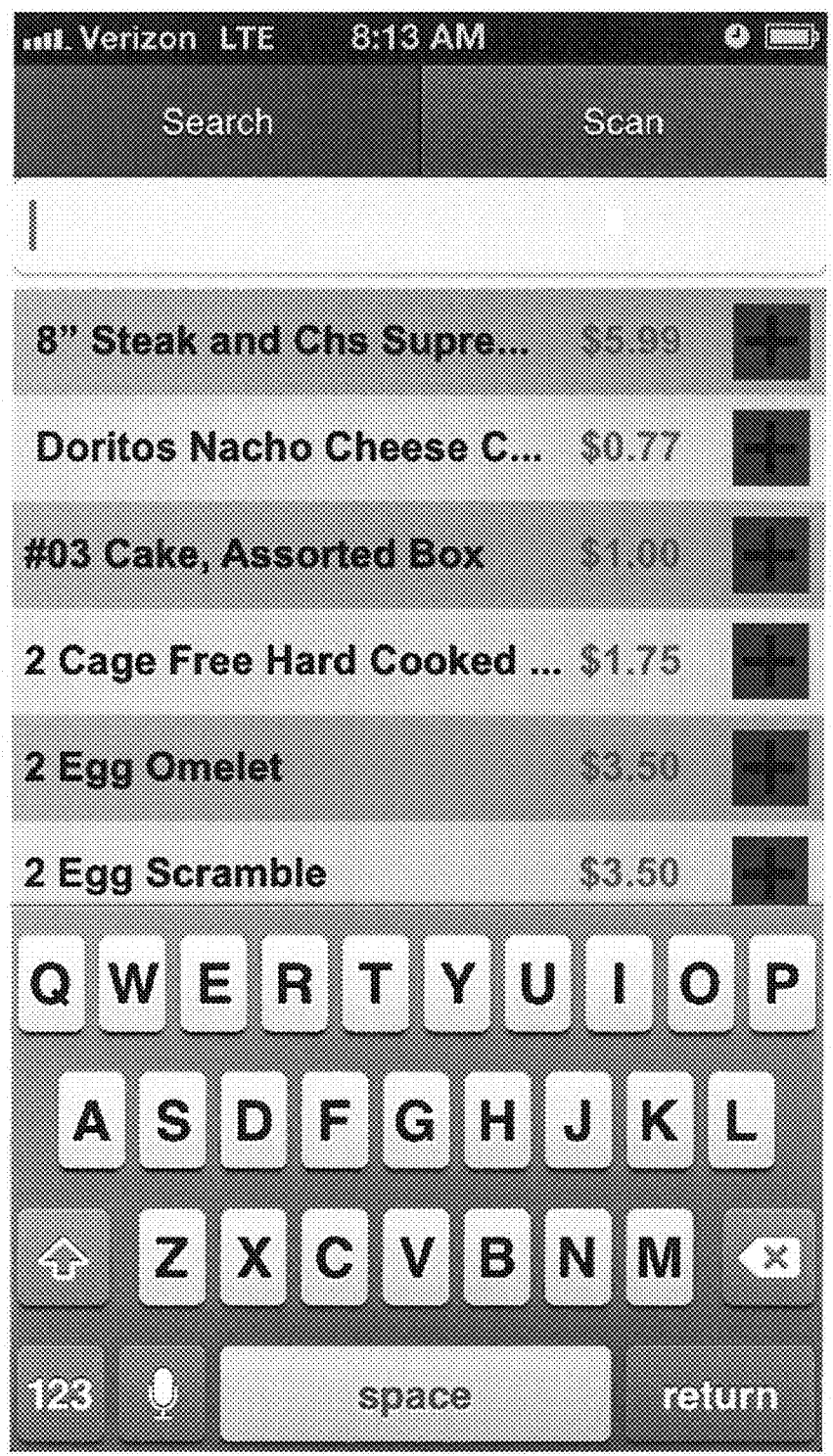
Figure 120:
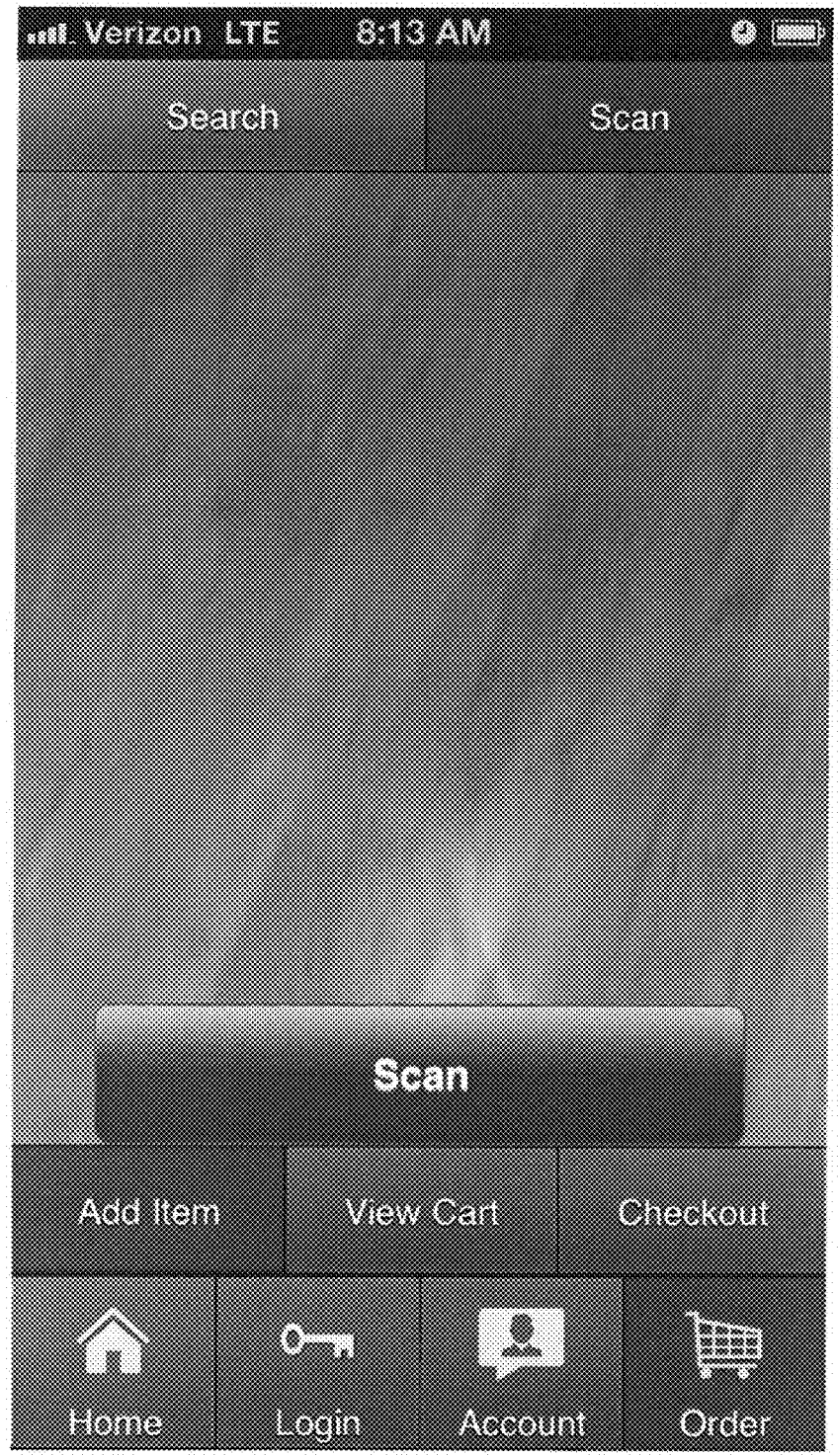
Figure 122:
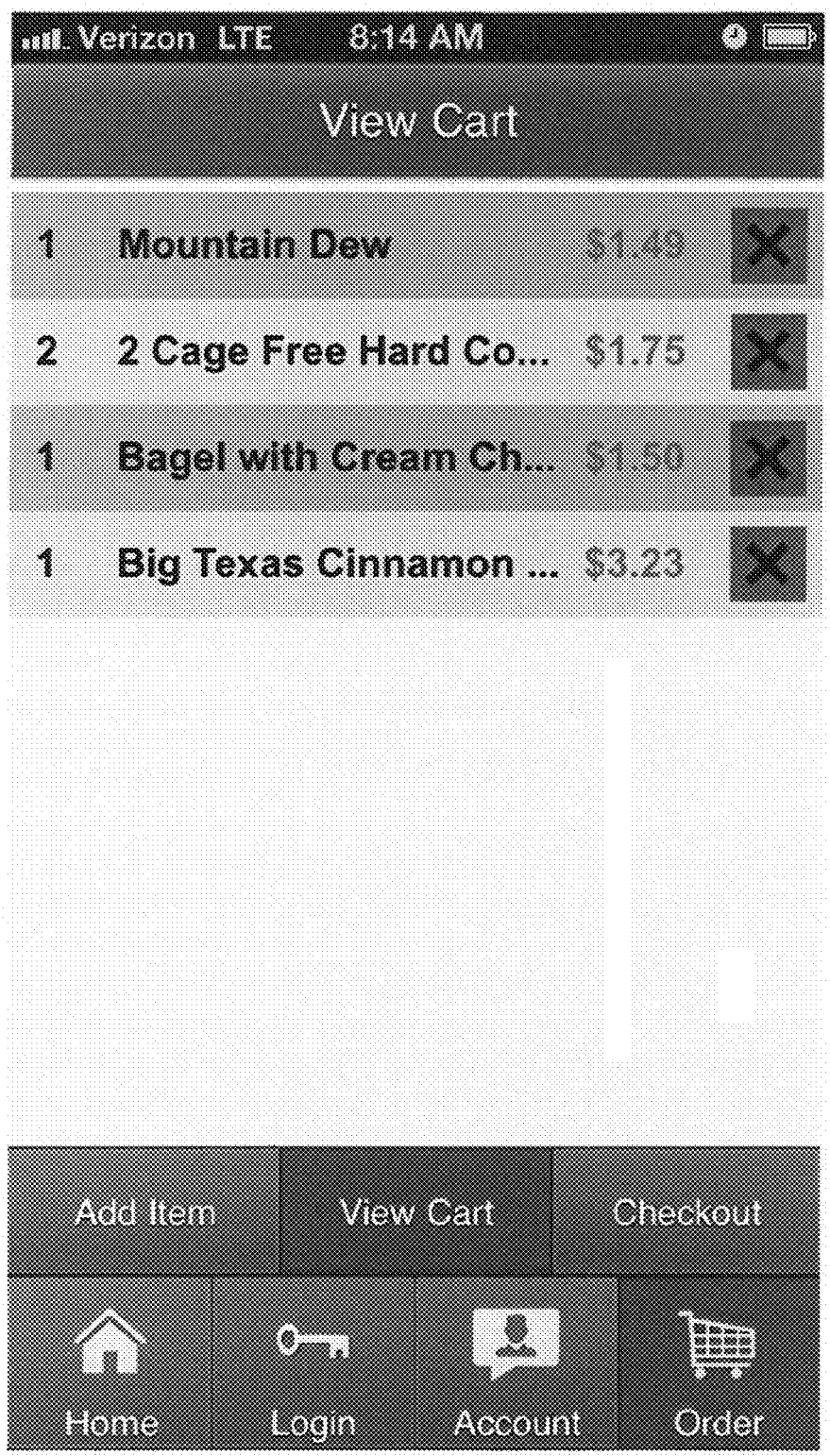
Figure 123:
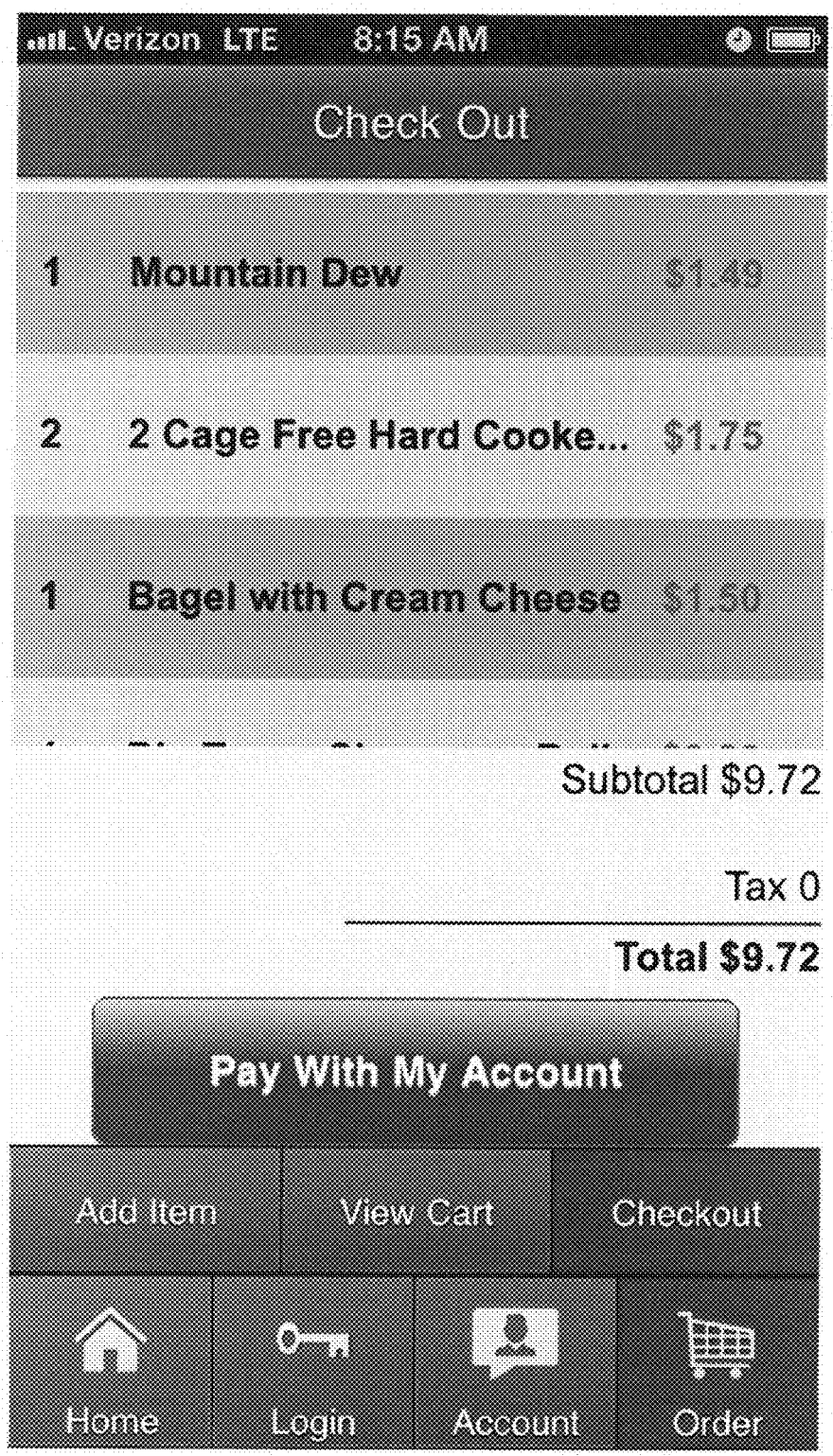
Figure 125:
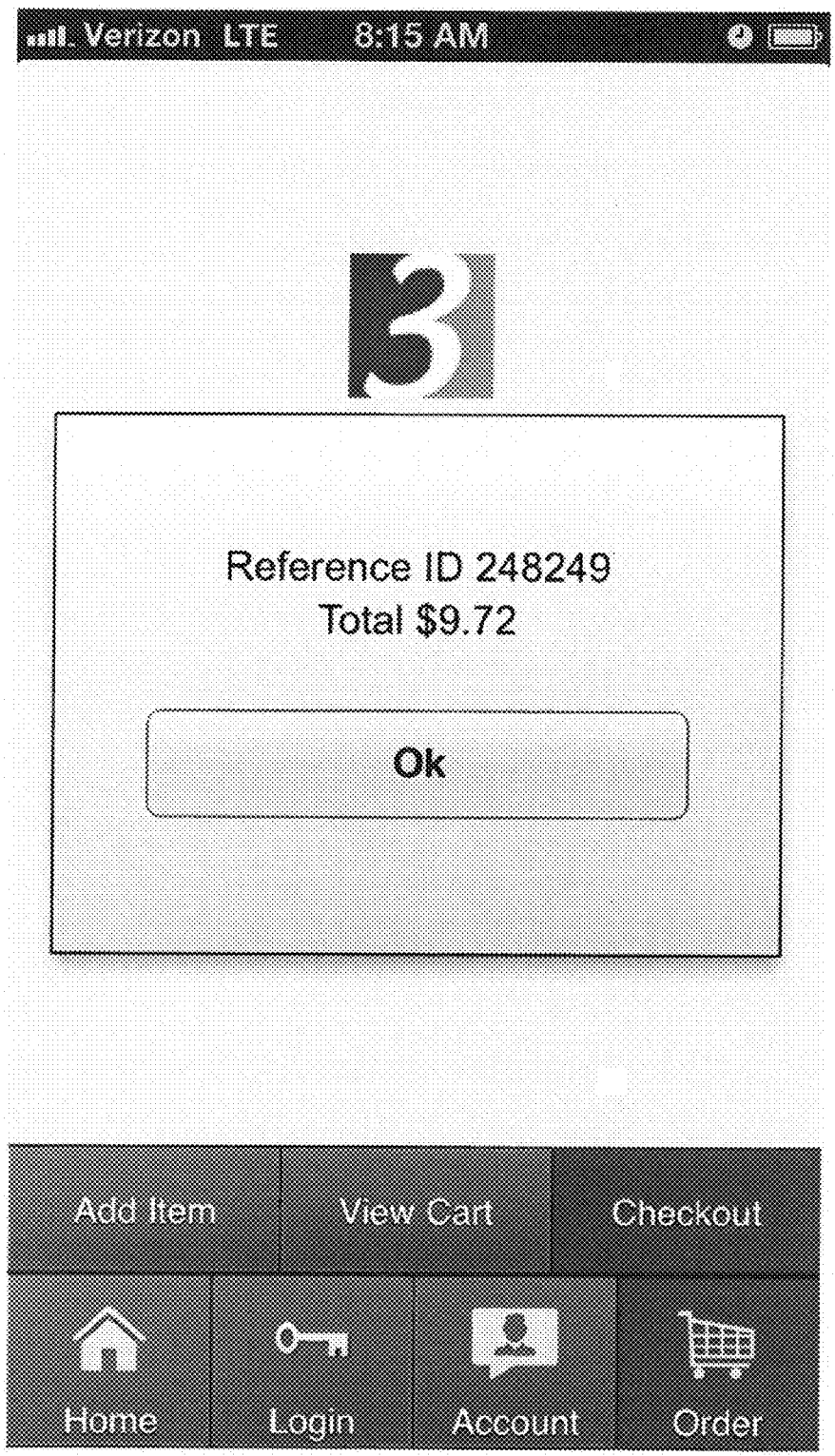

FIGS. 154-157 show an alternative embodiment of a kiosk, which utilizes a tablet PC. FIG. 112 is a front view of the alternative kiosk with its front cover removed and showing a tablet PC embedded in a frame. FIG. 113 is a front view of the alternative kiosk with the table PC removed. FIG. 114 shows a Raspberry Pi type ARM GNU/Linux microcontroller that communicatively connects the table PC to a scanner module.

The embodiments above are chosen, described and illustrated so that persons skilled in the art will be able to understand the invention and the manner and process of making and using it. The descriptions and the accompanying drawings should be interpreted in the illustrative and not the exhaustive or limited sense. The invention is not intended to be limited to the exact forms disclosed. While the application attempts to disclose all of the embodiments of the invention that are reasonably foreseeable, there may be unforeseeable insubstantial modifications that remain as equivalents. It should be understood by persons skilled in the art that there may be other embodiments than those disclosed which fall within the scope of the invention as defined by the claims. Where a claim, if any, is expressed as a means or step for performing a specified function it is intended that such claim be construed to cover the corresponding structure, material, or acts described in the specification and equivalents thereof, including both structural equivalents and equivalent structures, material-based equivalents and equivalent materials, and act-based equivalents and equivalent acts.

The invention claimed is:

1. A small market kiosk system for selling articles for disposition at a location where substantially all users are members of or affiliated with an organization such that users are trusted to shop and checkout with substantially no supervision by the market administrator, comprising:
   (a) at least one display for storing and displaying articles for sale, wherein the display comprises a plurality of display members that are disposed within a predetermined building and are accessible to users with substantially no supervision by the administrator, and wherein there are no locks on any display member;
   (b) a kiosk disposed adjacent to the display for checking out articles which are purchased by a user from the display, wherein the kiosk comprises a touch screen interface, a bar code scanner, an electronic card reader, a cash deposit mechanism, and a bagging station;
   (c) a control server communicatively connected to the control server via the Internet, and a web interface communicatively connectible to the control server and the kiosk via the Internet, and wherein a user, a site administrator and a system administrator can access the control server via the Internet to establish, view and edit user, site administrator, and system administrator accounts stored at the control server associated with the market, the user having control over a set of user account management tools, the site administrator having control over the set of user account management tools and a set of site administrator account management tools, and the system administrator having control over the set of user account management tools, the set of site administrator account management tools and a set of system administrator account management tools;
   (d) wherein the control server comprises a master application server for DNS and data transfer communicatively connectible to at least one database server;
   (e) wherein:
      (i) the user account management tools include the following: view and edit contact information, request articles for the store, request refund, deposit funds into account, view purchase history, and view account balance,
      (ii) the site administrator account management tools include the following: manage warehouse inventory, manage warehouse orders, manage global items, manage store inventory, manage store orders, view and edit store settings, view and edit station settings, remotely support kiosks, create items, manage users, credit and reimburse accounts, create reports for transactions and inventory, and access system user manuals and training resources, and
      (iii) the system administrator account management tools include the following: manage catalogs, manage vendors and administrators, create stores, and create invoice reports; and
   (f) at least one mobile device app for purchasing articles from the display, and wherein the site administrator management tools further include a mobile device management tool.

* * * * *